(12) United States Patent
Fiske

(10) Patent No.: US 12,175,340 B2
(45) Date of Patent: *Dec. 24, 2024

(54) QUANTUM RANDOM SELF-MODIFIABLE COMPUTER

(71) Applicant: Michael Stephen Fiske, San Francisco, CA (US)

(72) Inventor: Michael Stephen Fiske, San Francisco, CA (US)

(73) Assignee: Aemea Inc., Las Vegas, NV (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/899,509

(22) Filed: Aug. 30, 2022

(65) Prior Publication Data

US 2023/0124159 A1 Apr. 20, 2023

Related U.S. Application Data

(63) Continuation of application No. 16/435,500, filed on Jun. 9, 2019, now Pat. No. 11,468,362.

(60) Provisional application No. 62/682,979, filed on Jun. 10, 2018.

(51) Int. Cl.
*G06N 10/00* (2022.01)
*G06F 9/30* (2018.01)
*G06N 20/00* (2019.01)

(52) U.S. Cl.
CPC .......... *G06N 20/00* (2019.01); *G06F 9/3004* (2013.01); *G06N 10/00* (2019.01)

(58) Field of Classification Search
CPC ....... G06N 20/00; G06N 10/00; G06F 9/3004
USPC .......................................................... 706/12
See application file for complete search history.

(56) References Cited

U.S. PATENT DOCUMENTS

| | | | |
|---|---|---|---|
| 8,200,362 B2 * | 6/2012 | Guo ................... | G05B 19/4063 717/129 |
| 11,468,362 B2 * | 10/2022 | Fiske ................... | G06N 10/00 |
| 2008/0172551 A1 * | 7/2008 | Yamashita .......... | G06F 11/2226 712/E9.016 |
| 2009/0204384 A1 * | 8/2009 | Akiba ................. | G06F 11/3652 703/28 |
| 2012/0198560 A1 * | 8/2012 | Fiske ................... | G06F 9/448 726/26 |

(Continued)

*Primary Examiner* — Douglas M Slachta

(57) ABSTRACT

We describe a computing machine (ex-machine) that uses self-modification and randomness to enhance computation. An ex-machine program can compute languages that a standard machine cannot compute. An ex-machine has three types of instructions: standard, meta and random. One or more meta instructions self-modify the machine as it executes. Sometimes standard instructions are expressed in the C programming language or a hardware description language (VHDL). In an embodiment, random instructions take measurements from a random source that measures quantum events. In an embodiment, an ex-machine receives a computer program as input, containing only standard instructions. An ex-machine can combines random instructions and meta instructions to self-modify its instructions, so that it can evolve to compute (verify) the correctness of the computer program that it received as input. In an embodiment, an ex-machine uses its meta and random instructions to improve its machine learning procedures as the ex-machine is computing.

22 Claims, 25 Drawing Sheets

Right Affine Map 740

$$f(x+yi) = f_1(x) + f_2(y)\, i$$

$$f_1(x) = |A|x + (|A| - 1)\nu(T_{k+1}) - |A|^2 \nu(T_k)$$

$$f_2(y) = \frac{1}{|A|}y + B\nu(r) + \nu(b) - \frac{B}{|A|}\nu(q)$$

(56) References Cited

U.S. PATENT DOCUMENTS

| | | | |
|---|---|---|---|
| 2015/0113518 A1* | 4/2015 | Liem | G06F 8/656 |
| | | | 717/171 |
| 2015/0355896 A1* | 12/2015 | Benge | H04L 67/025 |
| | | | 717/171 |
| 2017/0147331 A1* | 5/2017 | Liem | G06F 8/656 |
| 2019/0034314 A1* | 1/2019 | Ogawa | G06F 11/28 |
| 2019/0251262 A1* | 8/2019 | Fiske | G06F 21/75 |

* cited by examiner

A Meta Instruction Execution. Step 1.

States $Q = \{0, 1, 2, 3, 4, 5, 6, 7\}$. Alphabet $A = \{\#, 0, 1\}$.
Meta Instruction $(5, 0, |Q| - 1, 1, 0, J)$ where
$J = (|Q| - 1, 1, |Q|, \#, -1)$.

Instruction $(5, 0, 7, 1, 0)$ is executed, since $|Q| = 8$.
$J = (7, 1, 8, \#, -1)$ is added to the standard instructions.
States $Q$ are updated to $Q = \{0, 1, 2, 3, 4, 5, 6, 7, 8\}$.

A Meta Instruction Execution. Computational Step 2.

States $Q = \{0, 1, 2, 3, 4, 5, 6, 7, 8\}$. Alphabet $A = \{\#, 0, 1\}$.

Instruction $J = (7, 1, 8, \#, -1)$ is executed.

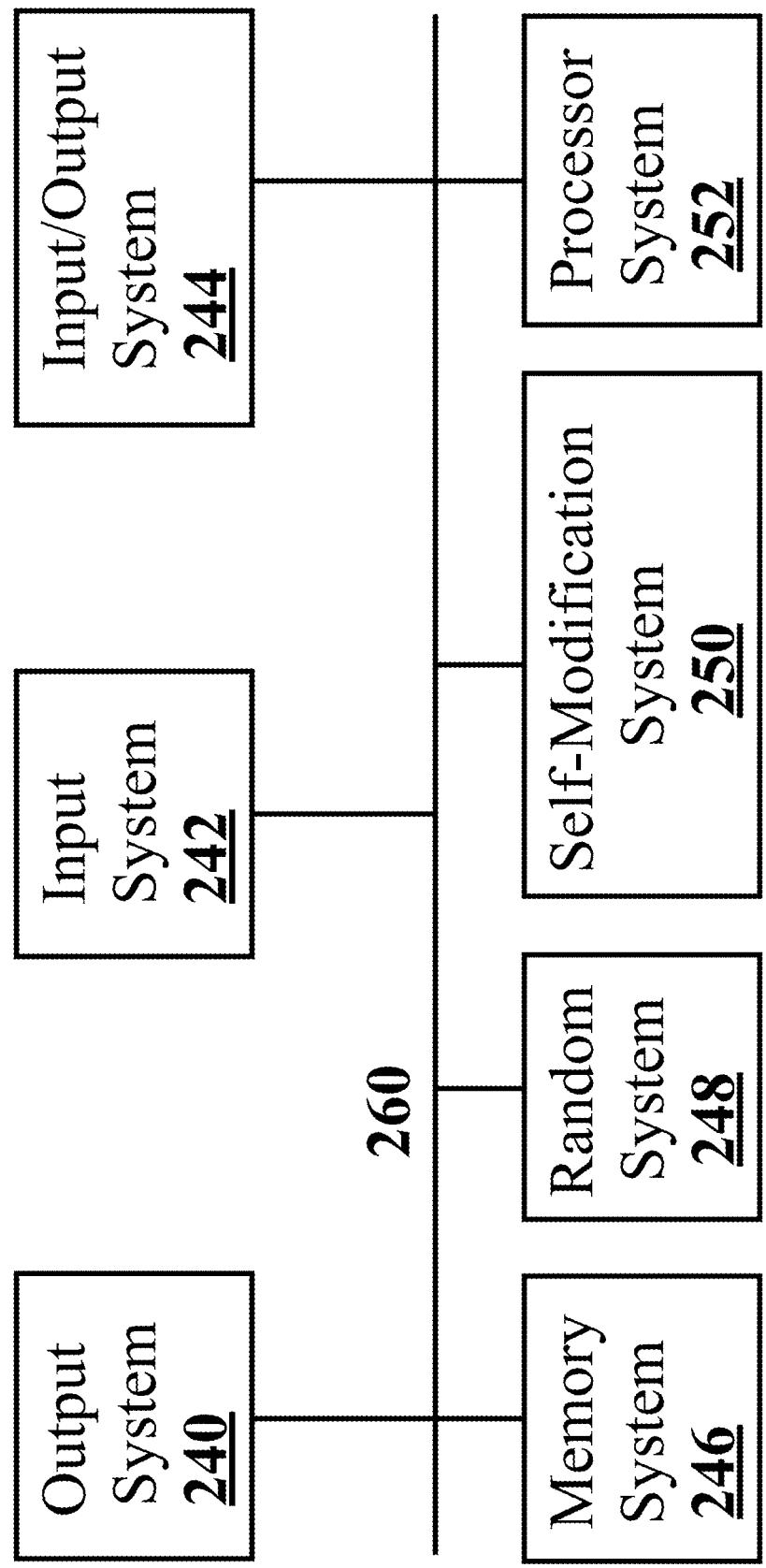

A Graphical Representation: Traversing an Infinite Binary Tree $\mathfrak{Q}(x)$ computes language $L_f$. $f : \mathbb{N} \to \{0, 1\}$ Quantum Observables Rendering
Random Bits via Value Indefiniteness

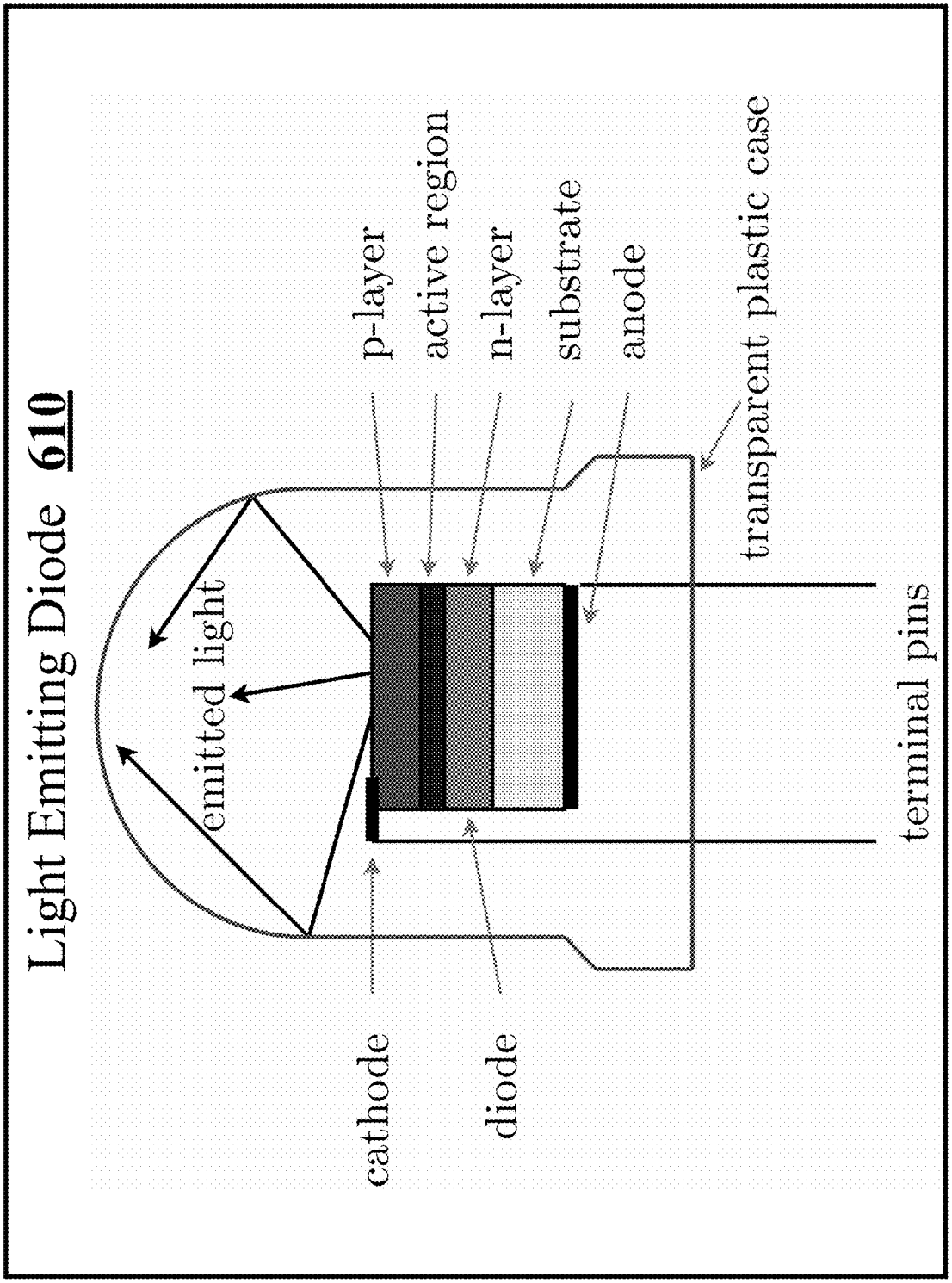

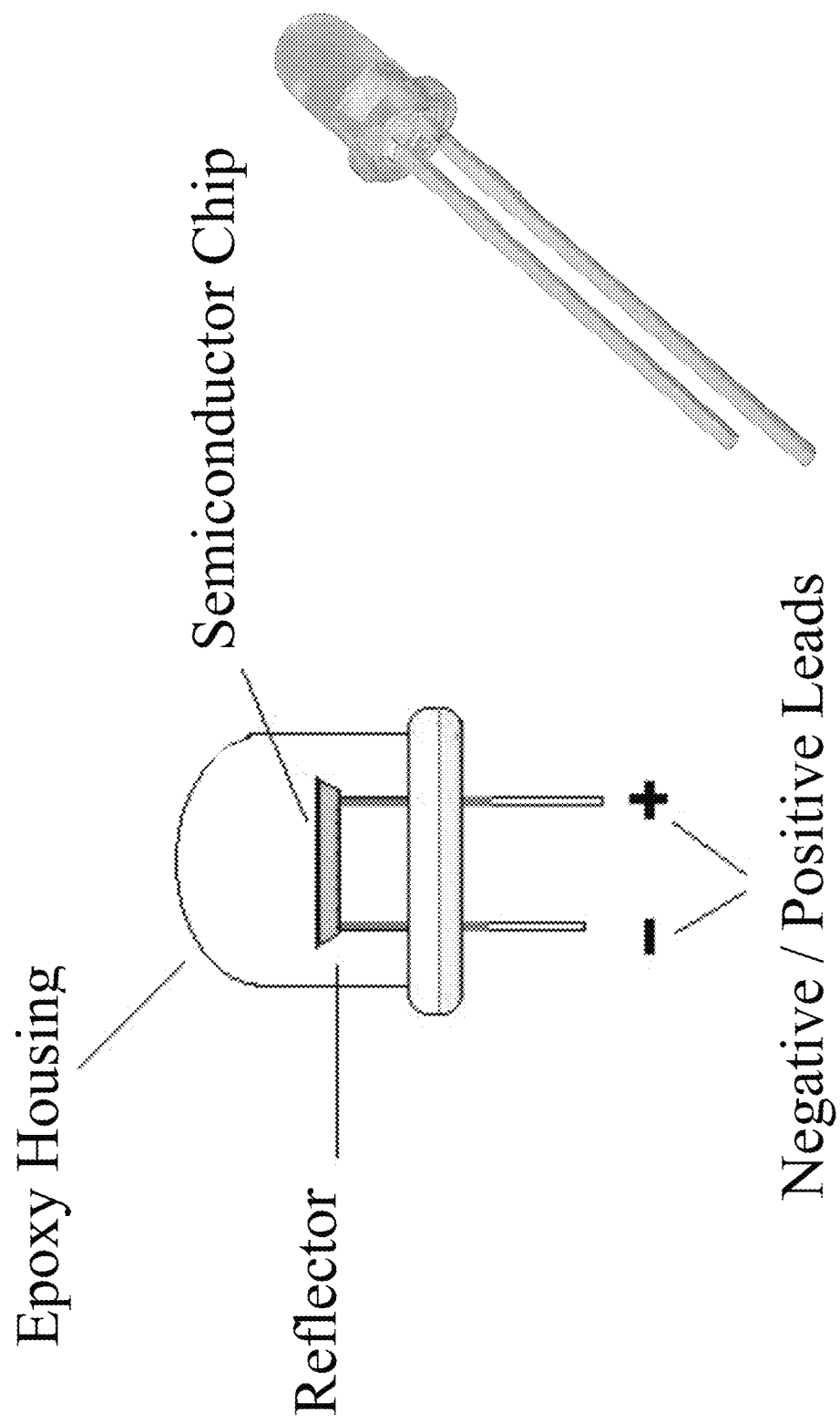

Light Emitting Diode 630 in Semiconductor

Machine Configuration 710

Before Execution of Instructions $(q, T_k, r, b, +1)$ or $(q, T_k, r, b, -1)$

Right Affine Map 740

$$f(x+yi) = f_1(x) + f_2(y)\,i$$

$$f_1(x) = |A|x + (|A|-1)\nu(T_{k+1}) - |A|^2 \nu(T_k)$$

$$f_2(y) = \frac{1}{|A|}y + B\nu(r) + \nu(b) - \frac{B}{|A|}\nu(q)$$

Unit Square $U$

Halting Attractor 750

FIG. 7E

Left Affine Map 760

$$g(x+yi) = g_1(x) + g_2(y)\,i$$

$$g_1(x) = \frac{1}{|A|}x + |A|\nu(T_{k-1}) + \nu(b) - \nu(T_k)$$

$$g_2(y) = |A|y + B\nu(r) - |A|B\nu(q) - |A|\nu(T_{k-1})$$

Unit Square W

Unit Square — g(W) — Unit Square

Halting Attractor 770

Piecewise Linear Approximation. Sigmoid 810 $\quad y = \dfrac{2}{\pi}\arctan(x)$ $(-13, -0.95)$, $(-8.5, -0.93)$, $(-6.25, -0.9)$, $(-4.15, -0.85)$, $(-3.05, -0.8)$,
$(-2.4, -0.75)$, $(-1.38, -0.6)$, $(-1, -0.5)$, $(-0.5, -0.3)$, $(0, 0)$, $(0.5, 0.3)$,
$(1, 0.5)$, $(1.38, 0.6)$, $(2.4, 0.75)$, $(3.05, 0.8)$, $(4.15, 0.85)$,
$(6.25, 0.9)$, $(8.5, 0.93)$, $(13, 0.95)$

FIG. 8B Piecewise Linear Almost Step Function 820 $y = e^{-(2x)^{20}}$
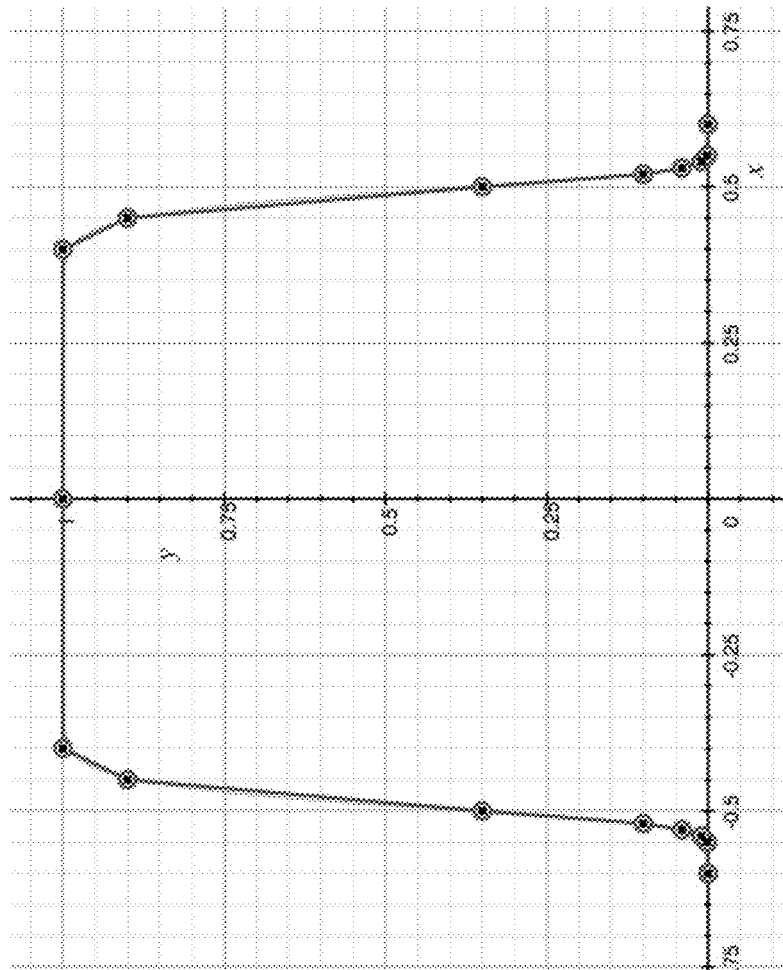
(-0.6, 0), (-0.54, 0.01), (-0.55, 0.001), (-0.53, 0.04), (-0.52, 0.1), (-0.5, 0.35), (-0.45, 0.9), (-0.4, 1), (0, 1), (0.4, 1), (0.45, 0.9), (0.5, 0.35), (0.52, 0.1), (0.53, 0.04), (0.54, 0.01), (0.55, 0.001), (0.6, 0)

Sigmoid Neural Network 830    $g(x) = \dfrac{2}{\pi} \arctan(x)$

Sigmoid and Step Network 840
$$g(x) = \frac{2}{\pi}\arctan(x) \qquad \chi(x) = e^{-(cx)^{c^2}}$$

Multi-Layer Network of Nonlinear Functions 850

QUANTUM RANDOM SELF-MODIFIABLE COMPUTER

1 RELATED APPLICATIONS

This application claims priority benefit of U.S. Provisional Patent Application Ser. No. 62/682,979, entitled Quantum Random Self-Modifiable Computer, filed Jun. 10, 2018, which is incorporated herein by reference. This application claims priority benefit of U.S. Non-Provisional patent application Ser. No. 16/435,500, entitled Quantum Random Self-Modifiable Computer, filed Jun. 9, 2019, which is incorporated herein by reference. This application claims priority benefit of U.S. Non-Provisional patent application Ser. No. 17/845,791, entitled Quantum Random Self-Modifiable Computer, filed Jun. 21, 2022, which is incorporated herein by reference.

2 FIELD

The specification generally relates to computing: computing hardware, random number generation in computation, random instructions, machine-implemented methods, machine-implemented systems, and self-modification of programs and hardware.

3 ADVANTAGES OVER THE PRIOR ART

Consider two fundamental questions in computer science, which substantially influence the design of current digital computers and play a fundamental role in hardware and machine-implemented software of the prior art:
1. What can a computing machine compute?
2. How many computational steps does a computational machine require to solve an instance of the 3-SAT problem? The 3-SAT problem is the basis for the famous $P \stackrel{?}{=} NP$ problem [10].

In the prior art, the two questions are typically conceived and implemented with hardware and software that compute according to the Turing machine (TM) [24] (i.e., standard digital computer [17]) model, which is the standard model of computation [5, 6, 10, 15, 23] in the prior art.

In this invention(s), our embodiments advance far beyond the prior art, by applying new machine-implemented methods and new hardware to advance computation and in particular, machine learning and the computation of program correctness for standard digital computer programs. The machine embodiments bifurcate the first question into two questions. What is computation? What can computation compute? Our new computing machine adds two special types of instructions to the standard digital computer [17] instructions 110, as shown in FIG. 1A. Some embodiments are referred to as an ex-machine—derived from the latin extm machinam—because ex-machine computation generates new dynamical behaviors and computational capabilities that one may no longer recognize as a standard digital computer or typical machine.

One type of special machine instruction is meta instruction 120 in FIG. 1A. In some embodiments, meta instructions 120 help make up self-modifiable system 250, shown in FIG. 2B. When an ex-machine executes a meta instruction, the meta instruction can add new states and add new instructions or replace instructions. Unlike a typical machine in the generic sense (e.g., the inclined plane, lever, pulley, wedge, wheel and axle, Archimedean screw, Galilean telescope, or bicycle), the meta instruction enables the complexity [19, 20] of an ex-machine to increase.

The other special instruction is a random instruction 140 in FIG. 1A that can be physically realized with random measurements 130. In some embodiments, a light emitting diode, shown in FIG. 5A, FIG. 5B, and FIG. 5C emits photons that random measurements 130 detect. In other embodiments, random instruction 140 can be realized with non-determinism, generated from a physical process such as atmospheric noise, sound, moisture, temperature measurements, pressure measurements, fluid turbulence, memory head read times in a digital computer due to air turbulence or friction in the hardware memory head, or protein folding. Due to random instructions 140, the execution behavior of two ex-machines may be distinct, even though the two ex-machines start their execution with the same input in memory, the same program instructions, the same initial machine states, and so on. Two distinct identical ex-machines may exhibit different execution behaviors even when started with identical initial conditions. When this property of the random instructions is combined with the appropriate use of meta instructions 120, two identical machines with the same initial conditions can evolve to two different computations as the execution of each respective machine proceeds: this unpredictable behavior is quite useful in machine learning applications and cryptographic computations. This property makes it more challenging for an adversary to attack or tamper with the computation. This property enables ex-machine programs to evolve new machine learning procedures.

Some of the ex-machine programs provided here compute beyond the Turing barrier (i.e., beyond the computing capabilities of the digital computer). Computing beyond this barrier has advantages over the prior art, particularly for embodiments of machine learning applications, cryptographic computation, and for verifying program correctness in standard digital computer programs. Furthermore, these embodiments provide machine programs for computing languages that a register machine, standard digital computer or Turing machine is not able to compute. In the disclosure of these inventions, a countable set of ex-machines are explicitly specified, using standard instructions, meta instructions and random instructions. Using the mathematics of probability, measure theory and Cantor's heirarchy of infinities, we prove that every one of these ex-machines can evolve to compute a Turing incomputable language with probability measure 1, whenever random measurements 130 (trials) behave like unbiased Bernoulli trials. (A Turing machine [24] or digital computer [17] cannot compute a Turing incomputable language.) For this reason, when we discuss to computational methods in the prior art, we will refer to a Turing machine program or digital computer program as an algorithm. Since the mechanical rules of an algorithm are fixed throughout the computation and the complexity of an algorithm stays constant during all executions of an algorithm, we will never refer to an ex-machine computation as an algorithm. Overall, the mathematics presented herein shows that the ex-machine inventions advance far beyond the prior art.

4 DESCRIPTION of FIGURES

In the following figures, although they may depict various examples of the invention, the invention is not limited to the examples depicted in the figures.

FIG. 1A shows an embodiment of an ex-machine comprised of machine instructions 110 (composed of standard instructions 110, random instructions 140 and meta instructions 120), random measurements 130, memory 116, memory values 118 and machine states 114.

FIG. 1B shows an embodiment of a random instructions 150 comprised of random generator 160 that measures one or more quantum events 170.

In FIG. 1C, while executing, meta instruction (5, 0, |Q|−1, 1, 0, J) creates a new standard instruction J=(7, 1, 8, #, −1).

FIG. 2B shows an embodiment of a computing architecture that implements an ex-machine, which includes a processor, memory and input/output system, random system, and self-modification system. This embodiment may be the ex-machine of FIG. 1A.

Figure 5A:
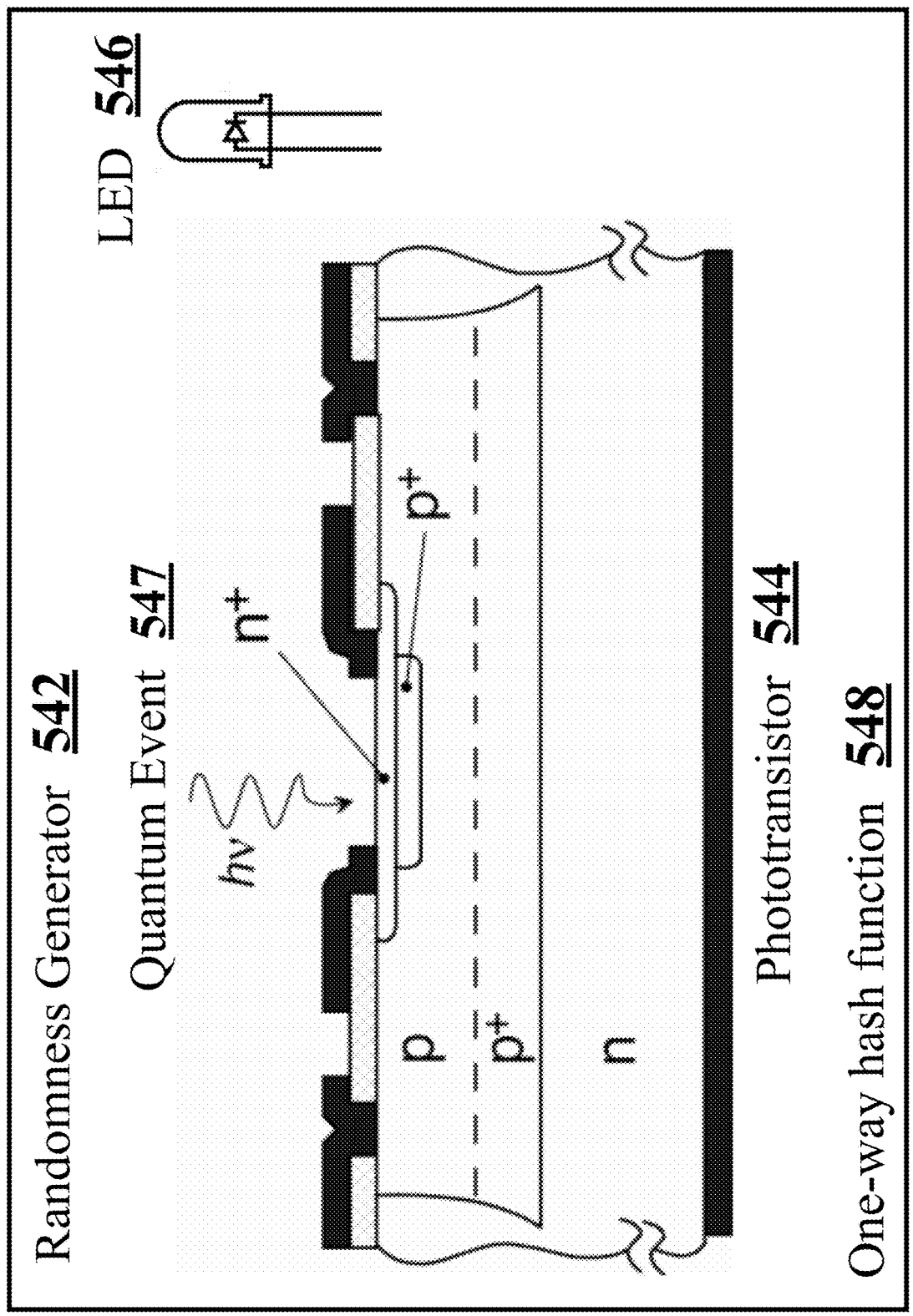

FIG. 5A shows an embodiment of a randomness generator, based on quantum randomness. The ex-machine instructions, described in definition 5.2, use this generator as a source of quantum randomness. Randomness generator 542 is based on the behavior of photons to measure randomness. Randomness generator 542 contains a light emitting diode 546 that emits photons and a phototransistor 544 that absorbs and detects photons.

Figure 5B:
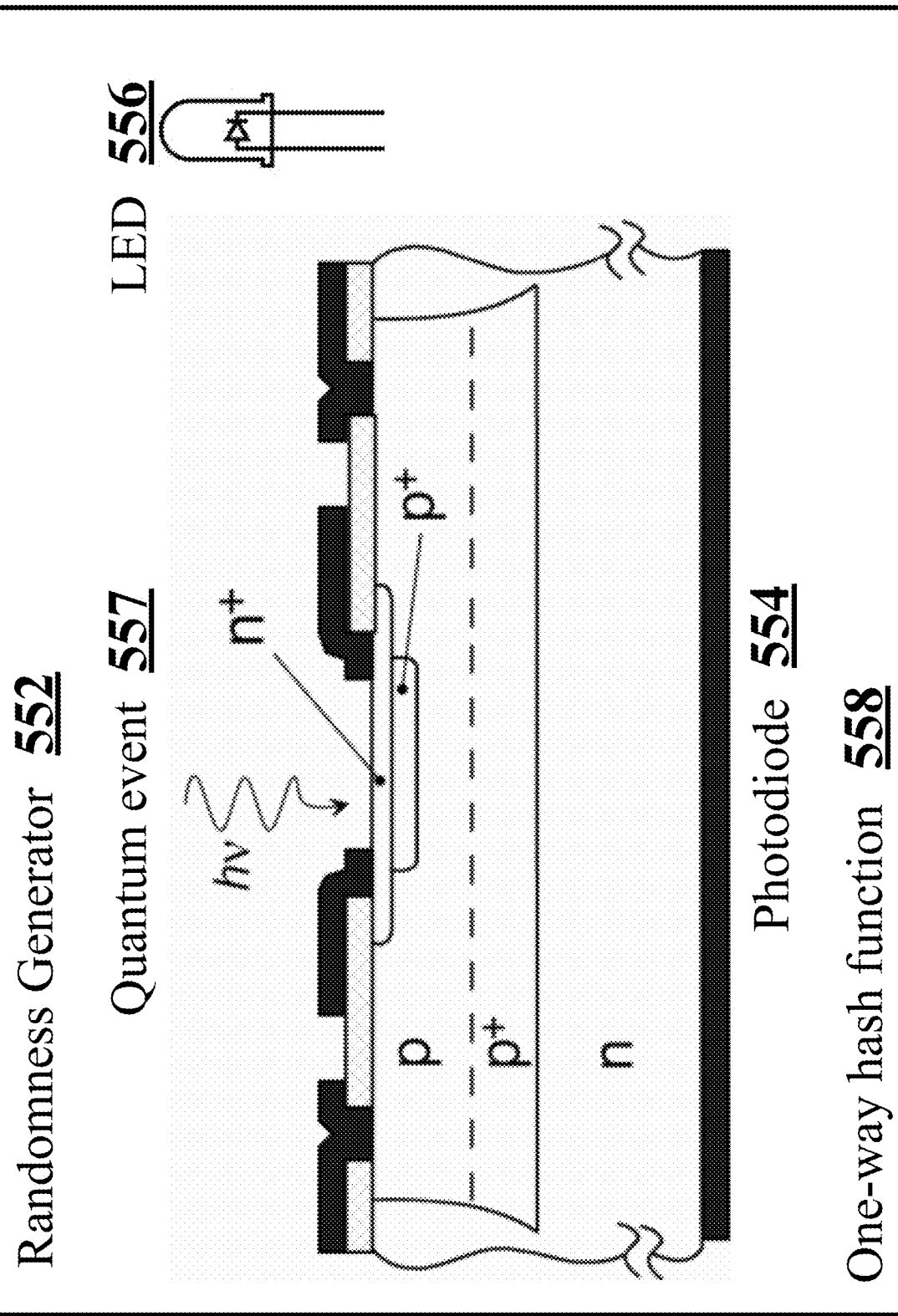

FIG. 5B shows an embodiment of a randomness generator, based on quantum randomness. Randomness generator 552 is based on the behavior of photons to take random measurements. Randomness generator 552 contains a light emitting diode 556 that emits photons and a phototdiode 554 that absorbs and detects photons.

Figure 5C:
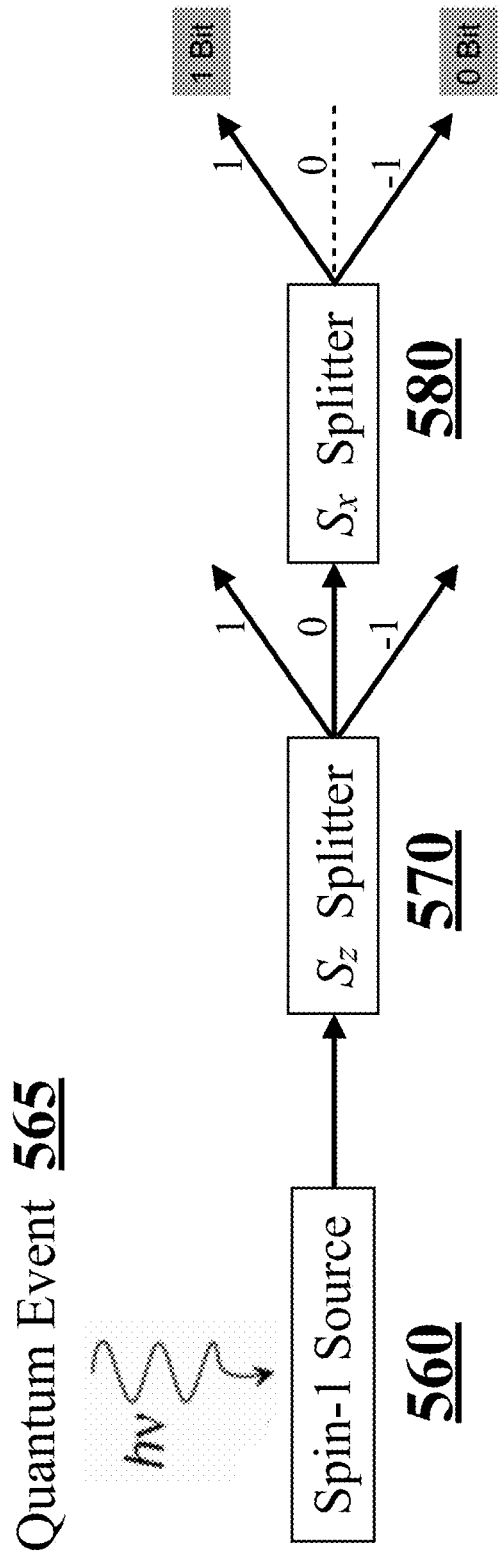

FIG. 5C shows an embodiment of randomn measurements 130, that uses quantum events 565 to provide a spin-1 source 560; followed by an $S_z$ beam splitter 570; and then followed by a $S_x$ beam splitter 580 that produces a random binary outcome. In an embodiment, electrons act as a spin-1 source.

FIG. 6A shows a light emitting diode, which emits photons and in some embodiments is part of the random number generator. The light emitting diode contains a cathode, a diode, an anode, one terminal pin connected to the cathode and one terminal pin connected to the anode, a p-layer of semiconductor, an active region, an n-layer of semiconductor, a substrate and a transparent plastic case.

FIG. 6B shows a light emitting diode, containing a semiconductor chip.

Figure 6C:
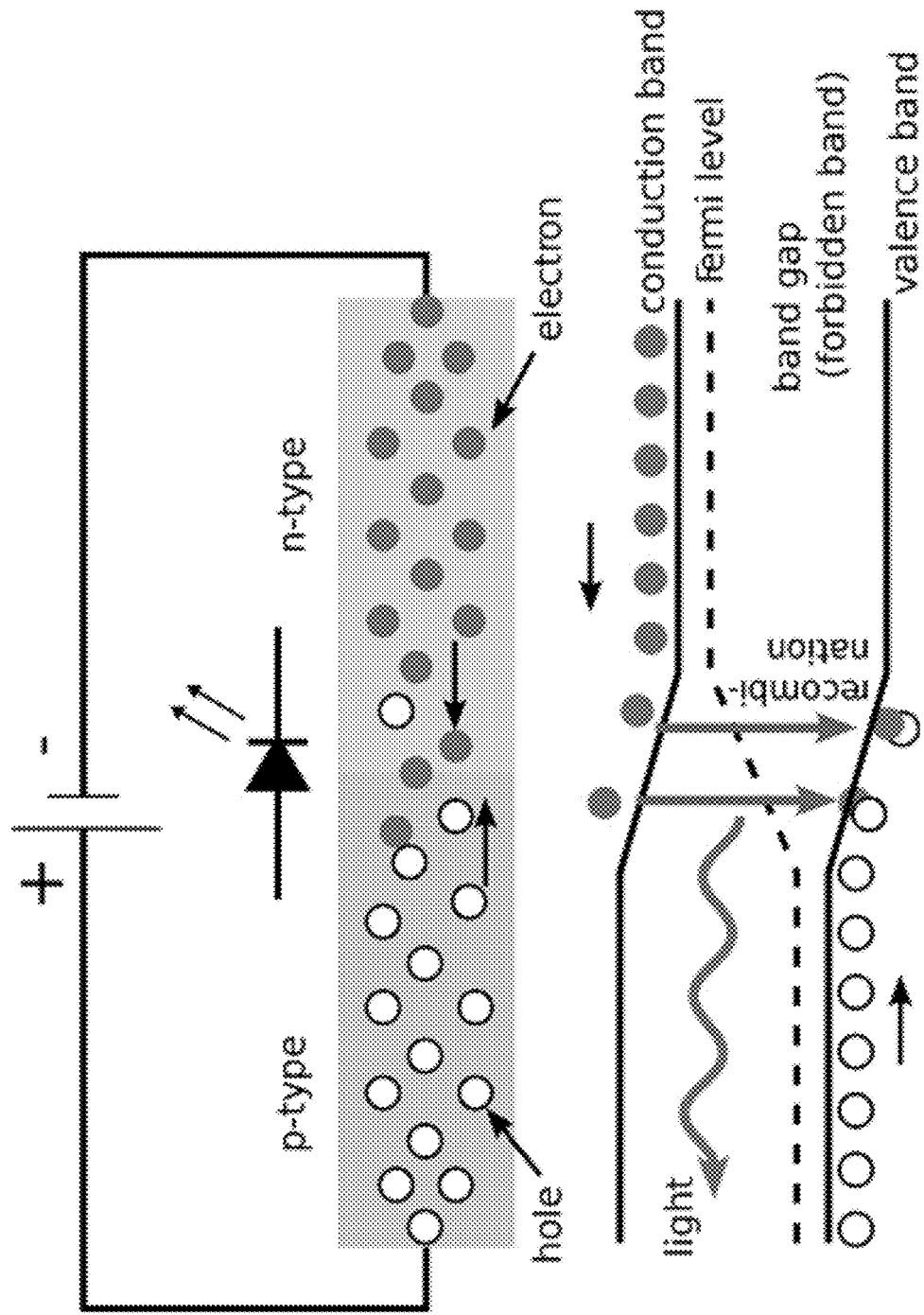

FIG. 6C shows a light emitting diode, showing a semiconductor view of the light emitting diode, and including electron and hole flow based on the conduction and valence bands.

Figure 7A:
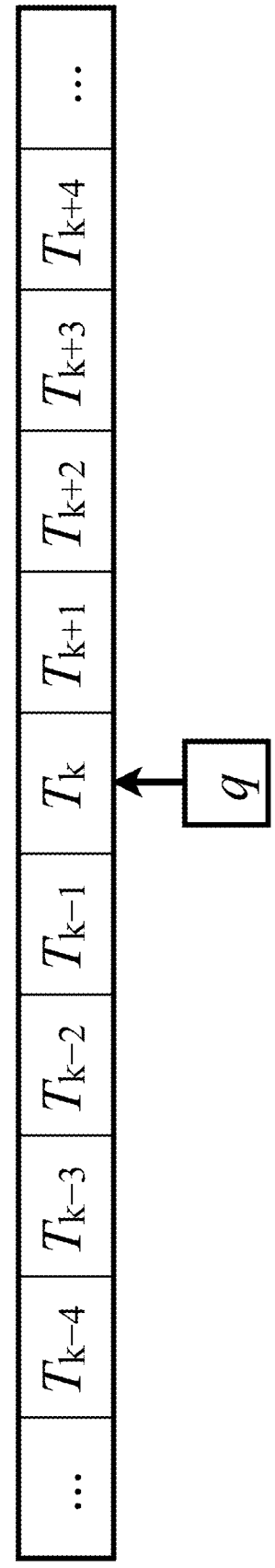

FIG. 7A shows a standard machine configuration in machine state q and the contents of its memory in a sequential representation before a standard machine instruction is executed. The purpose is to see how to transform instructions to geometric maps.

Figure 7B:
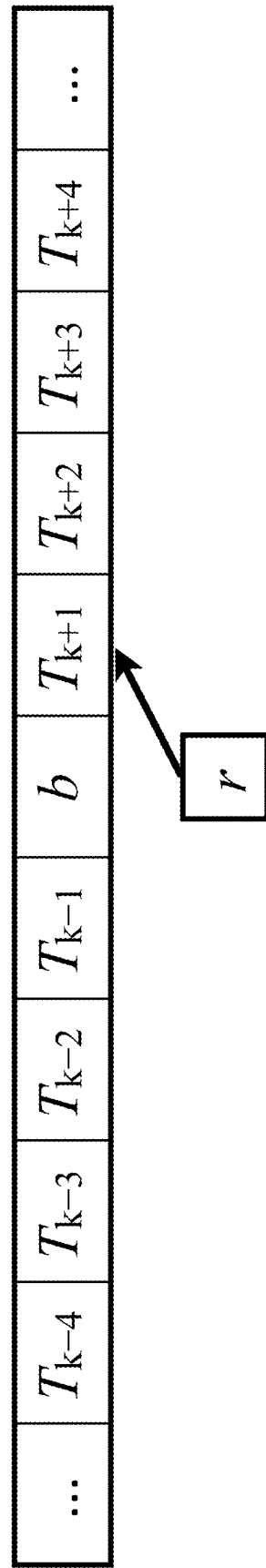

FIG. 7B shows a standard machine configuration in machine state r and its memory contents in a sequential representation after a standard machine instruction is executed.

Figure 7C:
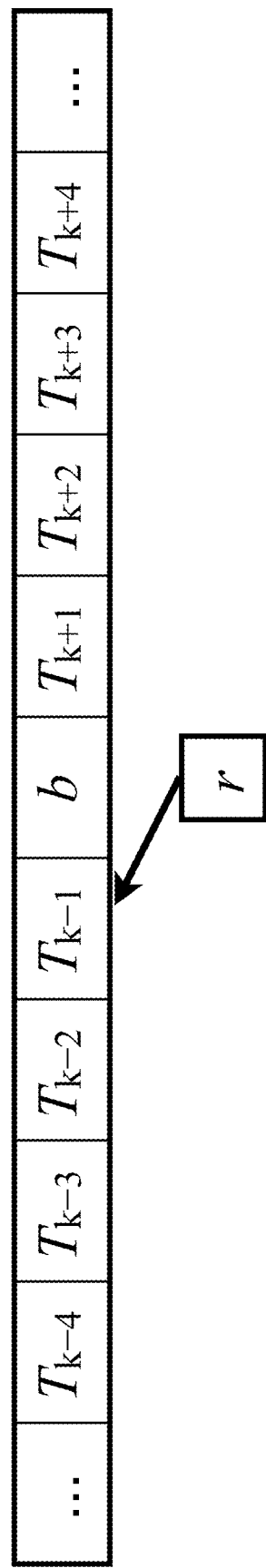

FIG. 7C shows a standard machine configuration in machine state r and its memory contents in a sequential representation after a standard machine instruction is executed.

Figure 7D:
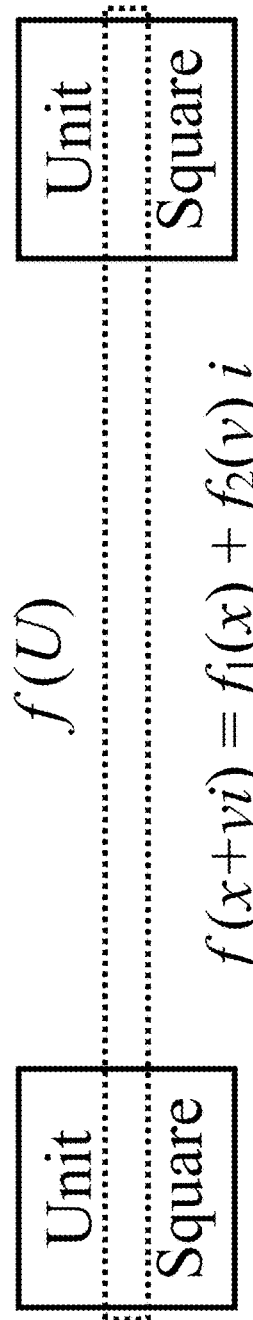

FIG. 7D shows right affine map 740 that corresponds to the instruction $(q, T_k, r, b, +1)$ executed by a digital computer in FIG. 7B. The right affine map is $f(x+yi)=f_1(x)+f_2(y)\,i$, where $f_1(x)=f_1(x)=|A|x+(|A|-1)v(T_{k+1})-|A|^2v(T_k)$ and $$f_2(x) = \frac{1}{|A|}y + Bv(r) + v(b) - \frac{B}{|A|}v(q).$$

$f$ is described further in section 9, titled The φ Correspondence.

FIG. 7E shows left affine map 760 that corresponds to the instruction $(q, T_k, r, b, -1)$ executed by a digital computer in FIG. 7C. The left affine map is $g(x+yi)=g_1(x)+g_2(y)\,i$, where $$g_1(x) = \frac{1}{|A|}x + |A|v(T_{k-1}) + v(b) - v(T_k)$$

and $g_2(y)=|A|y+Bv(r)-|A|Bv(q)-|A|v(T_{k-1})$. g is described further in section 9, titled The φ Correspondence.

Figure 8A:
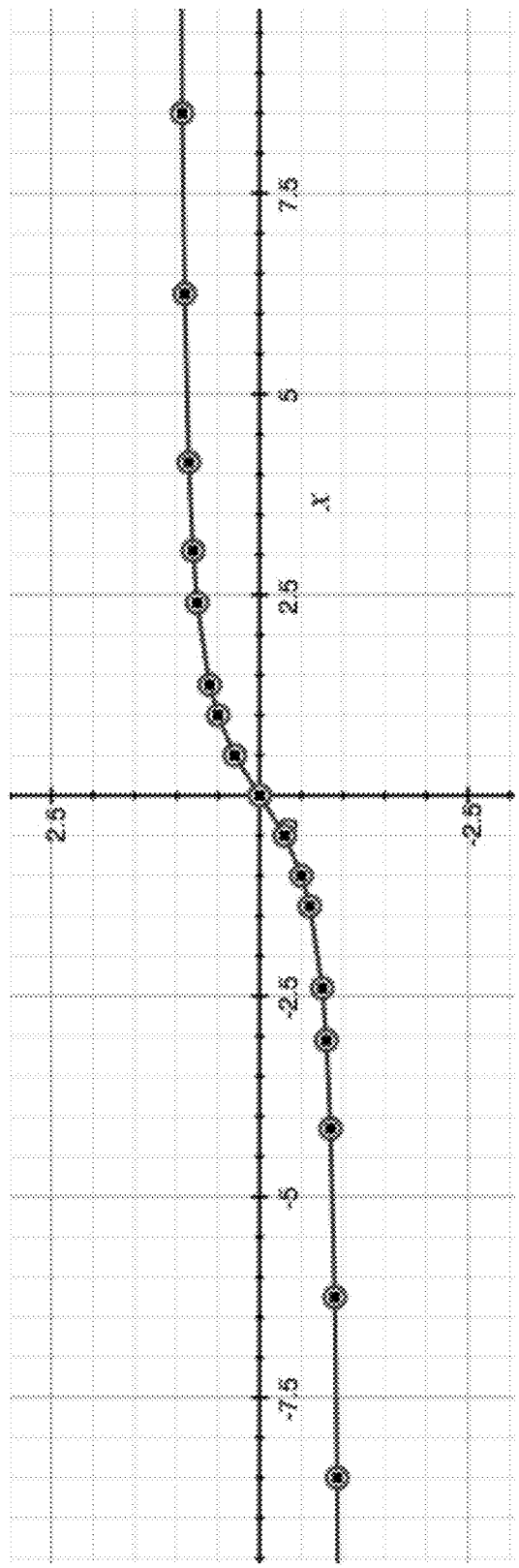

FIG. 8A shows a piecewise linear approximation of sigmoid function $$g(x) = \frac{2}{\pi}\arctan(x).$$

Sigmoid functions are used in machine learning embodiments (FIG. 9A) that execute meta instructions and random instructions. There are 17 points in this piecewise linear approximation: (−13, −0.95), (−8.5, −0.93), (−6.25, −0.9), (−4.15, −0.85), (−3.05, −0.8), (−2.4, −0.75), (−1.38, −0.6), (−1, −0.5), (−0.5, −0.3), (0, 0), (0.5, 0.3), (1, 0.5), (1.38, 0.6), (2.4, 0.75), (3.05, 0.8), (4.15, 0.85), (6.25, 0.9), (8.5, 0.93), (13, 0.95).

FIG. 8B shows a piecewise linear approximation of the almost step function $\chi(x)=e^{-(2x)^{20}}$. There are 17 points in this piecewise linear approximation: (−0.6, 0), (−0.54, 0.01), (−0.55, 0.001), (−0.53, 0.04), (−0.52, 0.1), (−0.5, 0.35), (−0.45, 0.9), (−0.4, 1), (0,1), (0.4, 1), (0.45, 0.9), (0.5, 0.35), (0.52, 0.1), (0.53, 0.04), (0.54, 0.01), (0.55, 0.001), (0.6, 0). Almost step functions are used in machine learning embodiments (FIG. 9A) that execute meta instructions and random instructions.

Figure 8C:
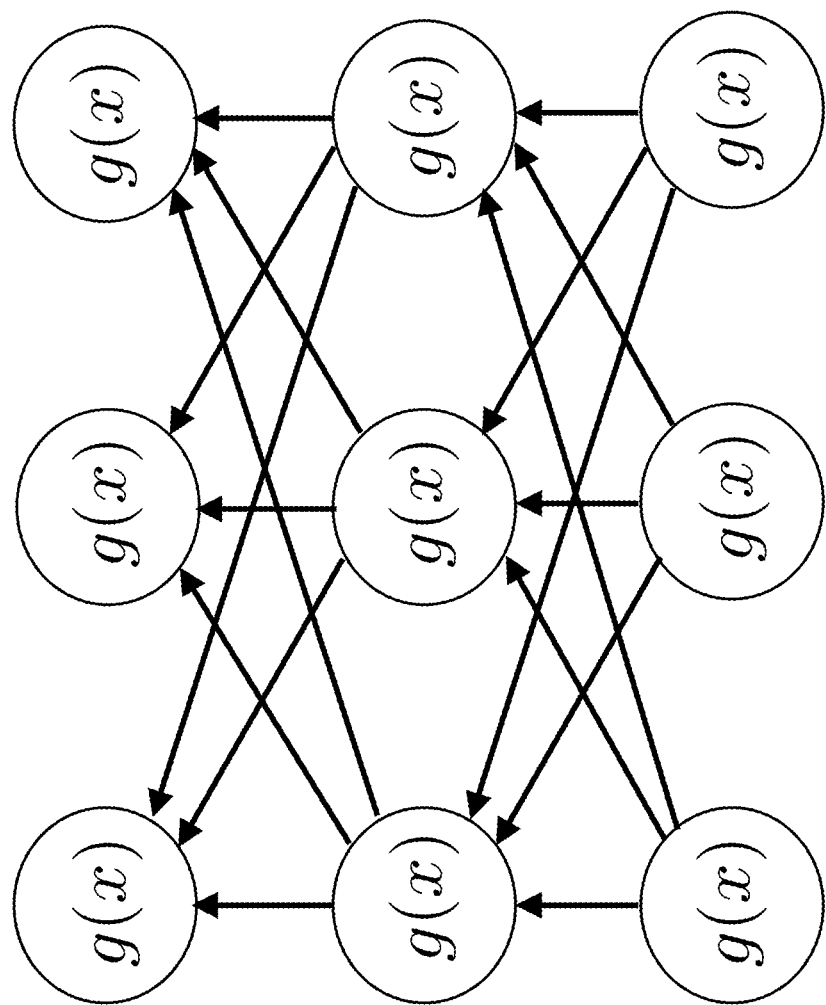

FIG. 8C shows a network of sigmoidal functions that are used in machine learning embodiments. Some embodiments have 2 or 3 layers of sigmoidal functions connected by linearly weighted sums. Some embodiments have 100 layers of sigmoidal functions. Some embodiments have more than ten thousand layers of sigmoidal functions. Some embodiments have more than one million layers of sigmoidal functions.

Figure 8D:
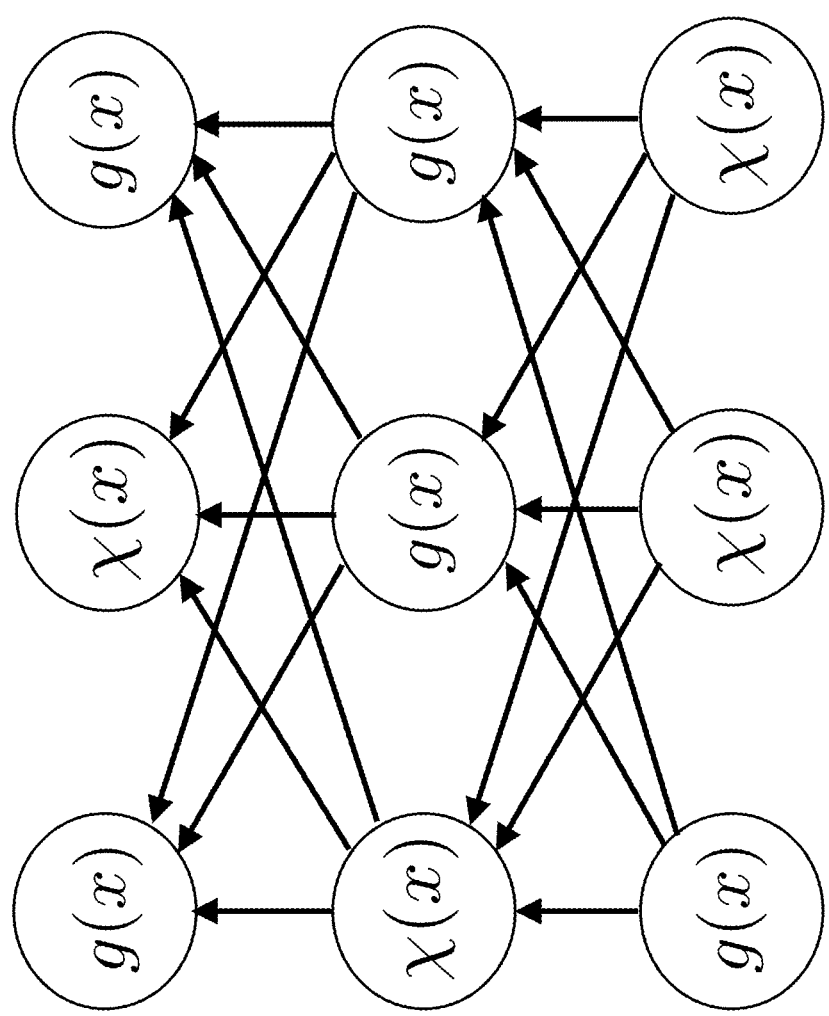

FIG. 8D shows a network of sigmoidal and almost steps functions that are used in machine learning embodiments.

Some embodiments have 2 or 3 layers of sigmoidal functions connected by linearly weighted sums. Some embodiments have 100 layers of sigmoidal and almost step functions. Some embodiments have more than ten thousand layers of sigmoidal and almost step functions. Some embodiments have more than one million layers of sigmoidal and almost step functions.

Figure 8E:
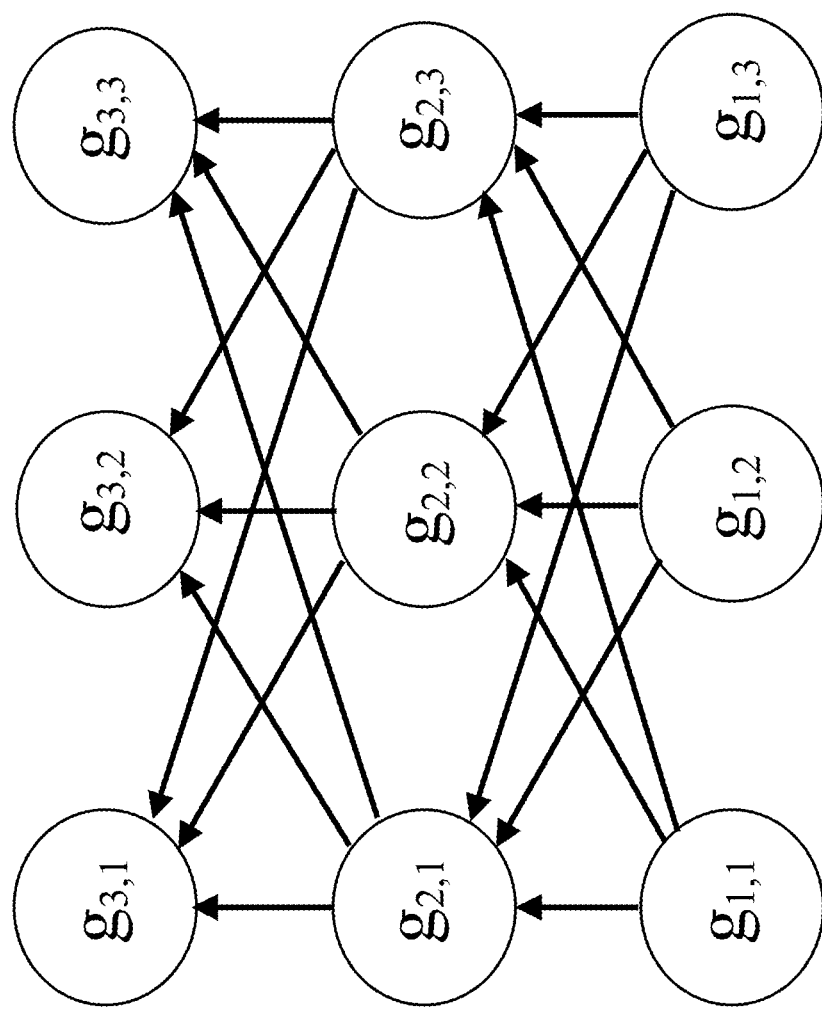

FIG. 8E shows a multi-layer network of nonlinear functions, used in machine learning procedure 9A. In an embodiment, the inputs of node function are weighted sums of the functions from the previous layer.

Figure 9A:
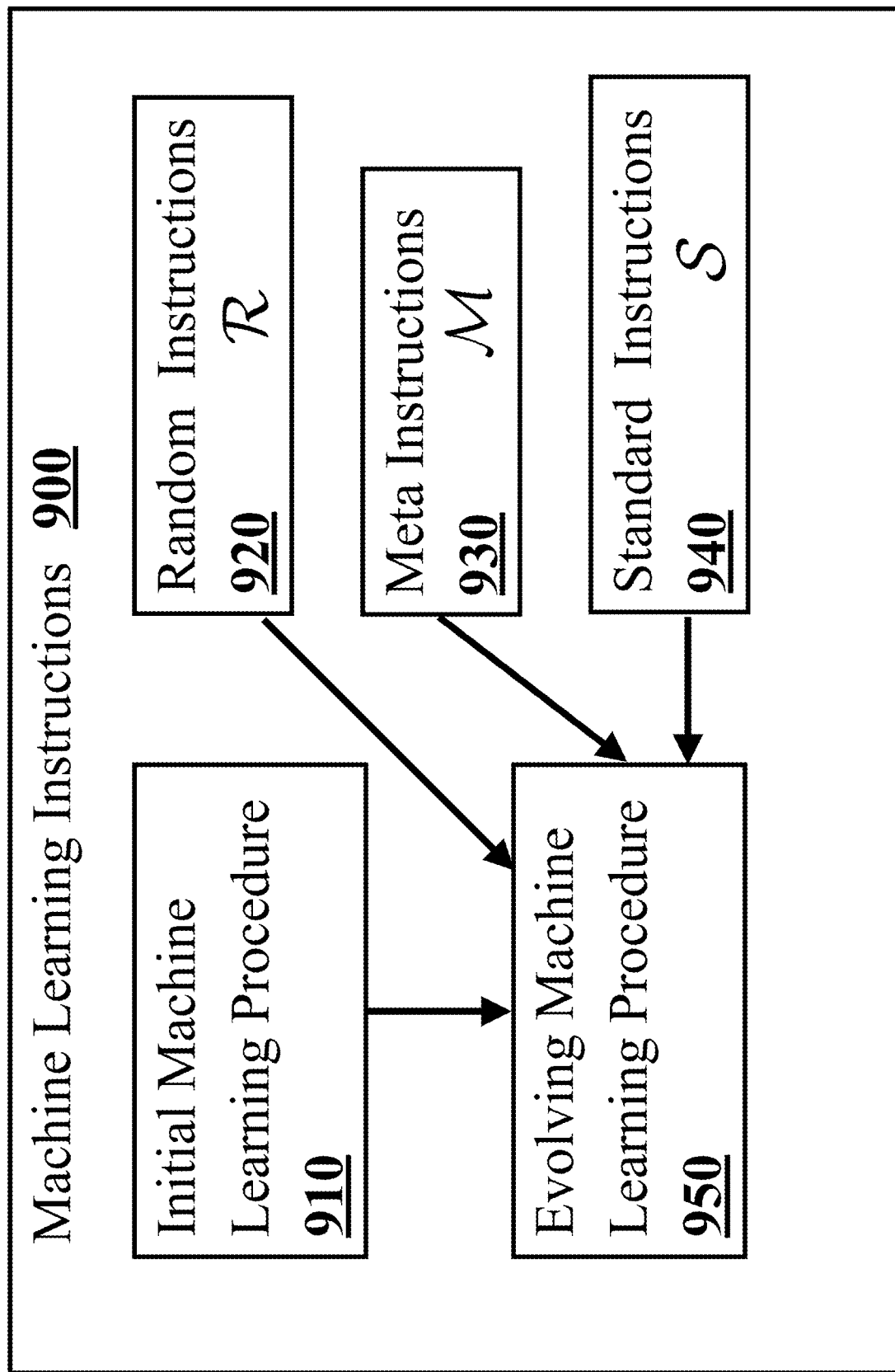

FIG. 9A shows a non-algorithmic machine learning procedure with machine instructions 900, containing random instructions 920, meta instructions 930 and standard instructions 940. The machine learning procedure is initially machine learning procedure 910. The random instructions 920 and meta instructions 930 enable the initial machine learning procedure 910 to self-modify while computing to Evolving Machine Learning procedure 950.

5 EX-MACHINE COMPUTER

Our invention describes a quantum random, self-modifiable computer that adds two special types of instructions to standard digital computer instructions [5, 10, 14, 15, 17, 24]. Before the quantum random and meta instructions are defined, we present some preliminary notation, and specification for standard instructions.

$\mathfrak{A}$ denotes the integers. $\mathfrak{A}$ and $\mathfrak{A}^+$ are the non-negative and positive integers, respectively. The finite set $Q=\{0, 1, 2, \ldots, n-1\} \subset \mathfrak{A}$ represents the machine states 114 in FIG. 1A. This convenient representation of the ex-machine states 114 helps specify how new machine states are added to Q when a meta instruction 120 is executed. An example of meta instruction execution is shown in FIG. 1C and FIG. 1D where machine state 8 is added to machine states 114 after execution of the first meta instruction (step 1).

Let $\mathfrak{A}=\{a_1, \ldots, a_n\}$, where each $a_i$ represents a distinct memory value 118 stored in memory 116, represented as T. The set $A=\{0, 1, \#\} \cup \mathfrak{A}$ consists of alphabet symbols (memory values), where # is the blank symbol and $\{0, 1, \#\} \cap \mathfrak{A}$ is the empty set. In some ex-machines, $A=\{0, 1, \#, Y, N, a\}$, where $a_1=Y$, $a_2=N$, $a_3=a$. In some ex-machines, $A=\{0, 1, \#\}$, where $\mathfrak{A}$ is the empty set. The memory values are read from and written to memory (T). The ex-machine memory 116 is represented by function $T:\mathfrak{A} \to A$ with an additional condition: before ex-machine execution starts, there exists an $N>0$ so that $T(k)=\#$ when $k>N$. In other words, this mathematical condition means all memory addresses contain blank or non-existent memory values, except for a finite number of memory addresses. When this condition holds for memory 116, we say that memory T is finitely bounded

5.1 Standard Instructions
Machine Specification 5.1. Execution of Standard Instructions 110 in FIG. 1A The standard ex-machine instructions S satisfy $S \subset Q \times A \times Q \times A \times \{-1, 0, 1\}$ and a uniqueness condition: If $(q_1, a_1, r_1, a_1, y_1) \in S$ and $(q_2, a_2, r_2, a_2, y_2) \in S$ and $(q_1, a_1, r_1, a_1, y_1) \neq (g_2, a_2, r_2, a_2, y_2)$, then $q_1 \neq q_2$ or $a_1 \neq a_2$. A standard instruction $I=(q, a, r, a, y)$ is similar to a Turing machine tuple [7,33]. When the ex-machine is in state q and the memory head is scanning alphabet symbol $a=T(k)$ at memory address k, instruction I is executed as follows:

The ex-machine state moves from state q to state r.

The ex-machine replaces alphabet symbol a with alphabet symbol a so that $T(k)=\alpha$. The rest of the memory remains unchanged.

If $y=-1$, the ex-machine moves its memory head, pointing one memory cell to the left (lower) in memory and is subsequently scanning the memory value $T(k-1)$ at memory address k−1.

If $y=+1$, the ex-machine moves its memory head, point one memory cell to the right (higher) in memory and is subsequently scanning the memory value $T(k+1)$ at memory address k+1.

If $y=0$, the ex-machine does not moves its memory head and is subsequently scanning the memory value $T(k)=a$ at memory address k.

Figure 1A:
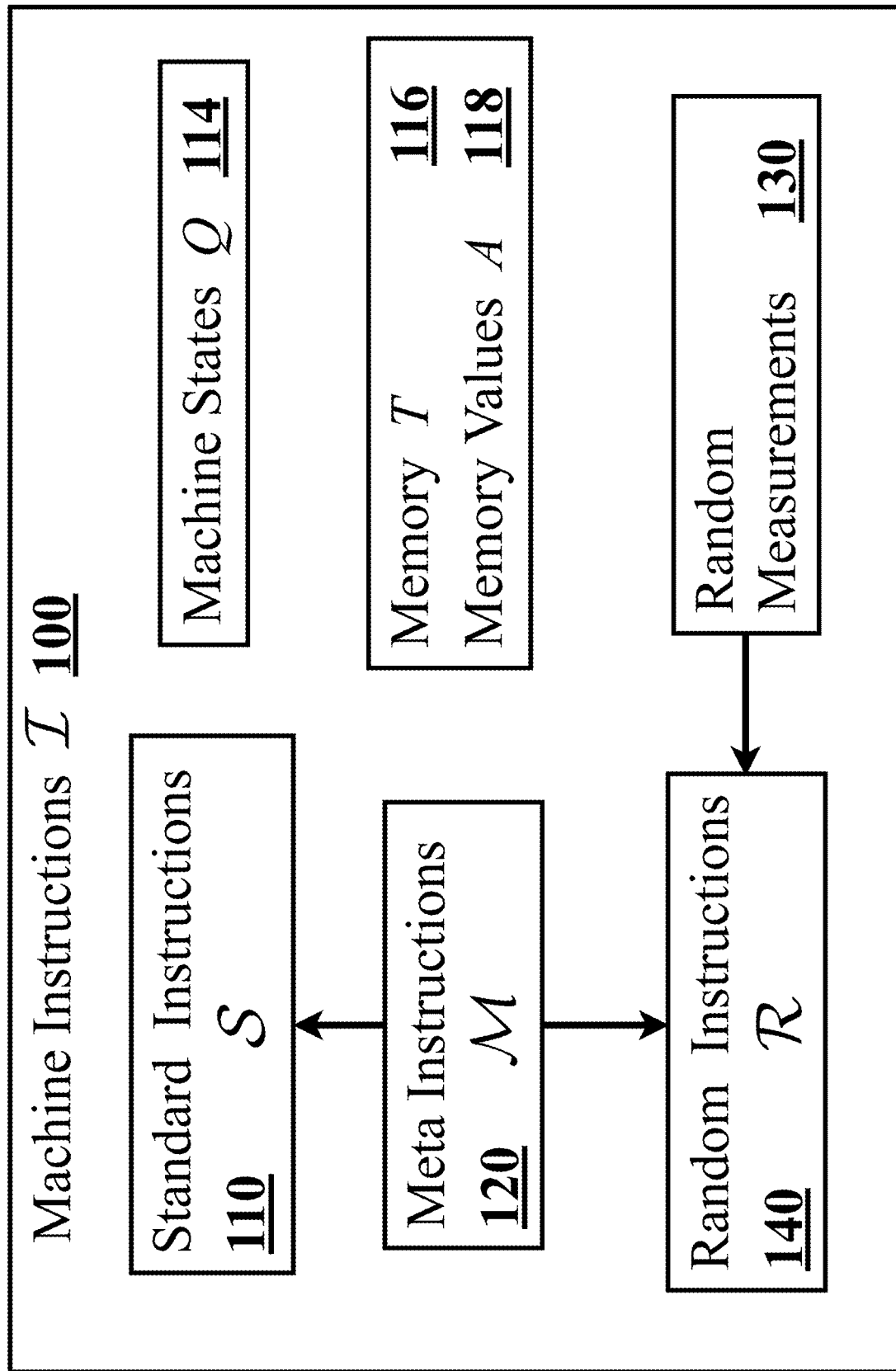
FIG. 1C shows an embodiment of a meta instruction 120 executing (FIG. 1A).
FIG. 1D shows an embodiment of a meta instruction, where the new standard instruction J=(7, 1, 8, #, −1) is executed right after it is created in FIG. 1C.

In other embodiments, standard instructions 110 in FIG. 1A may be expressed with C syntax such as x=x+1; or z=(x+1)*y;. In some embodiments, one of the standard instructions 110 may selected may be a loop with a body of machine instructions such as:

```
n = 5000;
for(i = 0; i < n; i++)
{
    . . . /* body of machine instructions, expressed in C. */
}
```

In some embodiments, random instruction 140 may measure a random bit, called random_bit and then non-deterministically execute according to following code:

```
if (random_bit == 1)
    C_function_1( );
else if (random_bit == 0)
    C_function_2( );
```

Figure 2A:
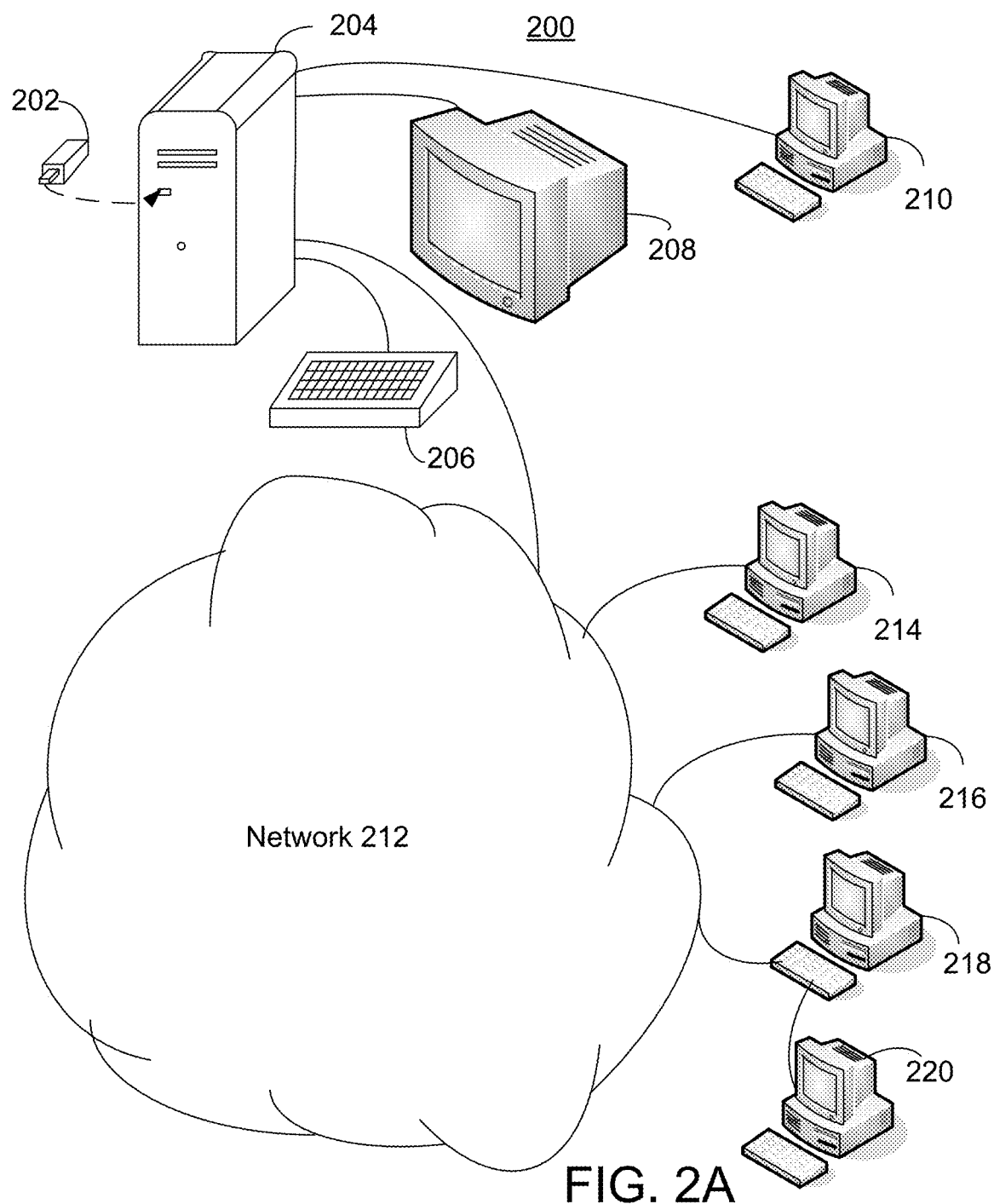
FIG. 2A shows an embodiment of a computer network, implemented with ex-machines. In some embodiments, the transmission may be over the Internet or a part of a network that supports an infrastructure such as the electrical grid, a financial exchange, or a power plant.

In other embodiments, the standard instructions 110 may have a programming language syntax such as assembly language, C++, Fortran, JAVA, JAVA virtual machine instructions, Go, Haskell, RISC machine instructions, Ruby, LISP and execute on hardware 204, shown in FIG. 2A. In other embodiments, the standard instructions 110 may read hex memory address 0x54E9A701285674FB41dec.7406382936A and after one instruction is executed, during the second computational step the instruction may read hex memory address 0x9A2368895EDC0523415E8790738293B8: random access memory is available in memory system 246 of FIG. 2B. In some embodiments, random access of memory is also implied by the fact that the standard instructions 110 may have a programming language syntax such as assembly language, C++, Fortran, JAVA, JAVA virtual machine instructions, Go, Haskell, RISC machine instructions, Ruby, LISP, or a hardware description language such as VHDL [25].

A digital computer program [17] or a Turing machine [24] has a fixed set of machine states Q, a finite alphabet A, a finitely bounded memory, and a finite set of standard ex-machine instructions that are executed according to specification 5.1. In other words, an ex-machine that uses only standard instructions is computationally equivalent to a digital computer [17]. An ex-machine with only standard instructions is called a standard machine or digital computer. A standard machine has no unpredictability because it contains no random instructions. A standard machine does not modify its instructions as it is computing.

Random Instructions

Repeated independent trials are called random Bernoulli trials [9] if there are only two possible outcomes for each trial (i.e., random measurement 130 in FIG. 130) and the probability of each outcome remains constant for all trials. In an embodiment, the outcome is a result of measuring quantum event 170, quantum event 547, quantum event 557, or quantum event 565. Unbiased means the probability of both outcomes is the same. The random or non-deterministic properties can be expressed mathematically as follows.
Random Measurement Property 1. Unbiased Trials.

Consider the bit sequence $(x_1 x_2 \ldots)$ in the infinite product space $\{0, 1\}^\mathbb{N}$. A single outcome $x_i$ of a bit sequence $(x_1 x_2 \ldots)$ generated by randomness is unbiased. The probability of measuring a 0 or a 1 are equal:

$$P(x_i = 1) = P(x_i = 0) = \frac{1}{2}.$$

Random Measurement Property 2. Stochastic Independence.

History has no effect on the next random measurement. Each outcome x, is independent of the history. No correlation exists between previous or future outcomes. This is expressed in terms of the conditional probabilities: $P(x_i=1|x_1=b_1, \ldots, x_{i-1}=b_{i-1})=\frac{1}{2}$ and $P(x_i=0|x_1=b_1, \ldots, x_{i-1}=b_{i-1})=\frac{1}{2}$ for each $b_i \in \{0, 1\}$.

In some embodiments randomness generator 160 used by random instructions 140, 150 has measurement properties 1 and 2. In some embodiments, randomness generator 542 in FIG. 5A has measurement properties 1 and 2. In other embodiments, physical devices that are built with quantum observables according to FIG. 5C exhibit properties 1 and 2 when measurements are taken by the physical device. In some embodiments, electrons may provide the spin-1 source of a quantum event 565, as shown in FIG. 5C. In some embodiments, photons in LED 610 in FIG. 6A, or LED 620 in FIG. 6B, or LED 630 in 6C. may provide a source of quantum events 170, 547 or 557 that are measured by random measurements 130 and detected by phototransistor 544 or photodiode 554. Section 6 provides a physical basis for the measurement properties and a discussion of quantum randomness for some embodiments of non-determinism.

The random instructions $\mathcal{R}$ are subsets of $Q \times A \times Q \times \{-1, 0, 1\} = \{(q, a, r, y) : q, r \text{ are in } Q \text{ and } a \text{ in } A \text{ and } y \text{ in } \{-1, 0, 1\}\}$ that satisfy a uniqueness condition defined below.
Machine Specification 5.2. Execution of Random Instructions 140 in FIG. 1A In some embodiments, the random instructions $\mathcal{R}$ satisfy $\mathcal{R} \subset Q \times A \times Q \times \{-1, 0, 1\}$ and the following uniqueness condition: If $(q_1, \alpha_1, r_1, y_1) \in \mathcal{R}$ and $(q_2, \alpha_2, r_2, y_2) \in R$ and $(q_1, \alpha_1, r_1, y_1) \neq (q_2, \alpha_2, r_2, y_2)$, then $q_1 \neq q_2$ or $\alpha_1 \neq \alpha_2$. When the machine head is reading memory value a from memory T and the machine is in machine state q, the random instruction (q, a, r, y) executes as follows:
1. The machine reads random measurements 130 that returns a random bit $b \in \{0, 1\}$.
2. In memory, memory value a is replaced with random bit b.
(This is why A contains both symbols 0 and 1.)
3. The machine state changes to machine state r.
4. The machine moves its memory head left if y=−1, right if y=+1, or the memory head does not move if y=0.

In some embodiments, the source of non-determinism in random measurements 130 is a quantum event 170. In some embodiments, quantum event 170 is generated outside of the hardware of the ex-machine: for example, the arrival of a photon from the environment outside of the ex-machine, as shown in quantum event 547. These photons may arrive from our sun, or an external light build or by an LED 610, LED 620, or LED 630, mounted on a circuit board, outside the processor that executes the ex-machine. In an embodiment, LED 610 or LED 620 or more than one LED is mounted on a circuit board; phototransistor 544 or may be photodiode 554 may be mounted so that the photosensitive part of the semiconductor is facing LED 610 or LED 620. In another embodiment, quantum event 170 is generated by semiconductor LED 630, inside of the hardware that implements processor system 252 of the ex-machine; in an embodiment, semiconductor LED 630 is integrated into a semiconductor chip that implements processor system 252.

In some embodiments, quantum measurements satisfy random measurement property 1 and random measurement property 2. In some embodiments, random measurements 130 is implemented with randomness generator 542 in FIG. 5A. In some embodiments, quantum random measurements 130 measure quantum events 565, using a spin-1 source 560 (e.g., electrons), followed by a $S_z$ splitter 570 and then a $S_x$ splitter 580 as shown in FIG. 5C. In some embodiments, photons in LED 610 in FIG. 6A, or LED 620 in FIG. 6B, or LED 630 in 6C. may provide a source of a quantum event 547 or quantum 557, that are measured by random measurements 130, which uses phototransistor 544 or photodiode 554 as a detector of a quantum event. In some embodiments, phototransistor 544 of FIG. 5A may measure the arrival time of one or more photons as a part of semiconductor chip that comprises randomness generator 542. In an embodiment, quantum event In some embodiments, there are more than two outcomes of taking the physical measurement by random measurements 130. For example, 8 different outcomes can be generated by repeating 3 measurements with spin-1 source 560 (e.g., electrons), followed by a $S_z$ splitter 570 and then a $S_x$ splitter 580 as shown in FIG. 5C. These three measurements produce 3 bits, which represent $2^3=8$ possible outcomes. In an embodiment, there are three outcomes. In another embodiment, there are four different outcomes.

In an embodiment, after execution of a random instruction, at step 4, the machine may random access to a different part of memory. For example, before a random instruction is being executed, it may be reading memory address 0x4B6368895EDC0543418E8790738293B9 and after at step 4, it moves to reading memory address 0x29F2B761285674FB41DE074063529462.

Machine instructions 1 lists a random walk machine that has only standard instructions and random instructions. Alphabet A={0, 1, #, E}. The states are Q={0, 1, 2, 3, 4, 5, 6, h}, where the halting state h=7. A valid initial memory contains only blank symbols; that is, # ##. The valid initial state is 0.

There are three random instructions: (0, #, 0, 0), (1, #, 1, 0) and (4, #, 4, 0). The random instruction (0, #, 0, 0) is executed first. If the random source measures a 1, the machine jumps to state 4 and the memory head moves to the right of memory address 0. If the random source measures a 0, the machine jumps to state 1 and the memory head moves to the left of memory address 0. Instructions containing alphabet value E provide error checking for an invalid initial memory or initial state; in this case, the machine halts with an error.

Machine Specification 1. Random Walk

```
;; Comments follow two semicolons.
(0, #, 0, 0)
(0, 0, 1, 0, -1)
(0, 1, 4, 1, 1)
;; Continue random walk to the left of memory address 0
(1, #, 1, 0)
(1, 0, 1, 0, -1)
(1, 1, 2, #, 1)
(2, 0, 3, #, 1)
(2, #, h, E, 0)
(2, 1, h, E, 0)
;; Go back to state 0. Numbers of random 0's = number of random 1's.
(3, #, 0, #, -1)
;; Go back to state 1. Numbers of random 0's > number of random 1's.
(3, 0, 1, 0, -1)
(3, 1, h, E, 0)
;; Continue random walk to the right of memory address 0
(4, #, 4, 0)
(4, 1, 4, 1, 1)
(4, 0, 5, #, -1)
(5, 1, 6, #, -1)
(5, #, h, E, 0)
(5, 0, h, E, 0)
;; Go back to state 0. Numbers of random 0's = number of random 1's.
(6, #, 0, #, 1)
;; Go back to state 4. Numbers of random 1's > number of random 0's.
(6, 1, 4, 1, 1)
(6, 0, h, E, 0)
```

Below are 31 computational steps of the ex-machine's first execution. This random walk machine never halts when the initial memory is blank and the initial state is 0. The first random instruction executed is (0, #, 0, 0), as a part of random instructions 140 in FIG. 1A. In random measurements 130, the measuring device measured a 0, so the execution of this instruction is shown as (0, #, 0, 0_qr, 0). The second random instruction executed is (1, #, 1, 0). The random source measured a 1, so the execution of instruction (1, #, 1, 0) is shown as (1, #, 1, 1_qr, 0).

1st Execution of Random Walk Machine. Computational Steps 1-31.

| STATE | MEMORY | MEMORY ADDRESS | INSTRUCTION |
|---|---|---|---|
| 0 | ##### 0## | 0 | (0, #, 0, 0_qr, 0) |
| 1 | #### #0## | -1 | (0, 0, 1, 0, -1) |
| 1 | #### 10## | -1 | (1, #, 1, 1_qr, 0) |
| 2 | ##### 0## | 0 | (1, 1, 2, #, 1) |
| 3 | ###### ## | 1 | (2, 0, 3, #, 1) |
| 0 | ##### ### | 0 | (3, #, 0, #, -1) |
| 0 | ##### 0## | 0 | (0, #, 0, 0_qr, 0) |
| 1 | #### #0## | -1 | (0, 0, 1, 0, -1) |
| 1 | #### 00## | -1 | (1, #, 1, 0_qr, 0) |
| 1 | ### #00## | -2 | (1, 0, 1, 0, -1) |
| 1 | ### 000## | -2 | (1, #, 1, 0_qr, 0) |
| 1 | ## #000## | -3 | (1, 0, 1, 0, -1) |
| 1 | ## 1000## | -3 | (1, #, 1, 1_qr, 0) |
| 2 | ### 000## | -2 | (1, 1, 2, #, 1) |
| 3 | #### 00## | -1 | (2, 0, 3, #, 1) |
| 1 | ### #00## | -2 | (3, 0, 1, 0, -1) |
| 1 | ### 100## | -2 | (1, #, 1, 1_qr, 0) |
| 2 | #### 00## | -1 | (1, 1, 2, #, 1) |
| 3 | ##### 0## | 0 | (2, 0, 3, #, 1) |
| 1 | #### #0## | -1 | (3, 0, 1, 0, -1) |
| 1 | #### 10## | -1 | (1, #, 1, 1_qr, 0) |
| 2 | ##### 0## | 0 | (1, 1, 2, #, 1) |
| 3 | ###### ## | 1 | (2, 0, 3, #, 1) |
| 0 | ##### ### | 0 | (3, #, 0, #, -1) |
| 0 | ##### 0## | 0 | (0, #, 0, 0_qr, 0) |
| 1 | #### #0## | -1 | (0, 0, 1, 0, -1) |
| 1 | #### 00## | -1 | (1, #, 1, 0_qr, 0) |
| 1 | ### #00## | -2 | (1, 0, 1, 0, -1) |
| 1 | ### 000## | -2 | (1, #, 1, 0_qr, 0) |
| 1 | ## #000## | -3 | (1, 0, 1, 0, -1) |
| 1 | ## 1000## | -3 | (1, #, 1, 1_qr, 0) |

Below are the first 31 steps of the ex-machine's second execution. As a part of random instructions 140 in FIG. 1A, the first random instruction executed is (0, #, 0, 0). Measured by random measurements 130, the random bit was 1, so the result of this instruction is shown as (0, #, 0, 1_qr, 0). The second random instruction executed is (1, #, 1, 0), which measured a 0, so the result of this instruction is shown as (1, #, 1, 0_ qr, 0).

2nd Execution of Random Walk Machine. Computational Steps 1-31.

| STATE | MEMORY | MEMORY ADDRESS | INSTRUCTION |
|---|---|---|---|
| 0 | ## 1##### | 0 | (0, #, 0, 1_qr, 0) |
| 4 | ##1 ##### | 1 | (0, 1, 4, 1, 1) |
| 4 | ##1 0#### | 1 | (4, #, 4, 0_qr, 0) |
| 5 | ## 1##### | 0 | (4, 0, 5, #, -1) |
| 6 | # ####### | -1 | (5, 1, 6, #, -1) |
| 0 | ## ####### | 0 | (6, #, 0, #, 1) |
| 0 | ## 1##### | 0 | (0, #, 0, 1_qr, 0) |
| 4 | ##1 ##### | 1 | (0, 1, 4, 1, 1) |
| 4 | ##1 1#### | 1 | (4, #, 4, 1_qr, 0) |
| 4 | ##11 #### | 2 | (4, 1, 4, 1, 1) |
| 4 | ##11 1### | 2 | (4, #, 4, 1_qr, 0) |
| 4 | ##111 ### | 3 | (4, 1, 4, 1, 1) |
| 4 | ##111 1## | 3 | (4, #, 4, 1_qr, 0) |
| 4 | ##1111 ## | 4 | (4, 1, 4, 1, 1) |
| 4 | ##1111 0# | 4 | (4, #, 4, 0_qr, 0) |
| 5 | ##111 1## | 3 | (4, 0, 5, #, -1) |
| 6 | ##11 1### | 2 | (5, 1, 6, #, -1) |
| 4 | ##111 ### | 3 | (6, 1, 4, 1, 1) |
| 4 | ##111 0## | 3 | (4, #, 4, 0_qr, 0) |
| 5 | ##11 1### | 2 | (4, 0, 5, #, -1) |
| 6 | ##1 1#### | 1 | (5, 1, 6, #, -1) |
| 4 | ##11 #### | 2 | (6, 1, 4, 1, 1) |
| 4 | ##11 0### | 2 | (4, #, 4, 0_qr, 0) |
| 5 | ##1 1#### | 1 | (4, 0, 5, #, -1) |
| 6 | ## 1##### | 0 | (5, 1, 6, #, -1) |
| 4 | ##1 ##### | 1 | (6, 1, 4, 1, 1) |
| 4 | ##1 0#### | 1 | (4, #, 4, 0_qr, 0) |
| 5 | ## 1##### | 0 | (4, 0, 5, #, -1) |
| 6 | # ####### | -1 | (5, 1, 6, #, -1) |
| 0 | ## ####### | 0 | (6, #, 0, #, 1) |
| 0 | ## 0##### | 0 | (0, #, 0, 0_qr, 0) |
| 1 | # #0##### | -1 | (0, 0, 1, 0, -1) |

The first and second executions of the random walk ex-machine verify our statement in the introduction: in contrast with a standard machine or a digital computer, the execution behavior of the same ex-machine may be distinct at two different instances, even though each instance of the ex-machine starts its execution with the same input, stored in memory, the same initial states and same initial instructions. Hence, the ex-machine is a discrete, non-autonomous dynamical system, which enhances its computational capabilities.

Meta Instructions

Meta instructions are a second type of special instructions, as shown in 120 of FIG. 1A. The execution of a meta instruction enables the ex-machine to self-modify its instructions. This means that an ex-machine's meta instructions can add new states, add new instructions or replace instructions while ex-machine instructions 100 of FIG. 1A are being executed. Formally, the meta instructions $\mathcal{M}$ satisfy $\mathcal{M} \subset \{$ (q, a, r, α, y, J):q∈Q and r∈Q∪{|Q|} and a, α∈A and instruction J∈S∪R} as a part of self-modification system 250 (FIG. 2B) while executing in processor system 252. In an embodiment, processor system 252 is implemented in machines 204, 214, 216, 218, 220 of FIG. 2A.

Define $\mathcal{I}$ =S∪R∪M as the set of standard 110, random 140, and meta instructions 120 in FIG. 1A, stored in memory system 246 (FIG. 2B). To help describe how a meta instruction modifies $\mathcal{I}$ in self-modification system 250 of FIG. 2B, the unique state, scanning symbol condition is defined. For any two distinct instructions chosen from $\mathcal{I}$ at least one of the first two coordinates should differ so that processor system 252 in FIG. 2B can determine which machine instruction 100 to execute next. More precisely, all 6 of the following uniqueness conditions hold for the instructions 110, 120 and 140 (FIG. 1A, 1B, 1C, 1D) that are stored in hardware memory system 246.

1. If $(q_1, \alpha_1, r_1, \beta_1, y_1)$ and $(q_2, \alpha_2, r_2, \beta_2, y_2)$ are both in S, then $q_1 \neq q_2$ or $\alpha_1 \neq \alpha_2$.
2. If $(q_1, \alpha_1, r_1, \beta_1, y_1) \in$ S and $(q_2, \alpha_2, r_2, y) \in \mathcal{R}$, then $q_1 \neq q_2$ or $\alpha_1 \neq \alpha_2$.
3. If $(q_1, \alpha_1, r_1, y_1)$ and $(q_2, \alpha_2, r_2, y_2)$ are both in $\mathcal{R}$, then $q_1 \neq q_2$ or $\alpha_1 \neq \alpha_2$.
4. If $(q_1, \alpha_1, r_1, y_1) \in \mathcal{R}$ and $(q_2, \alpha_2, r_2, \alpha_2, y_2, J_2) \in \mathcal{M}$, then $q_1 \neq q_2$ or $\alpha_1 \neq \alpha_2$.
5. If $(q_1, \alpha_1, r_1, \beta_1, y_1) \in$ S and $(q_2, \alpha_2, r_2, \alpha_2, y_2, J_2) \in \mathcal{M}$, then $q_1 \neq q_2$ or $\alpha_1 \neq \alpha_2$.
6. If $(q_1, \alpha_1, r_1, \alpha_1, y_1, J_1)$ and $(q_2, \alpha_2, r_2, \alpha_2, y_2, J_2)$ are both in $\mathcal{M}$, then $q_1 \neq q_2$ or $\alpha_1 \neq \alpha_2$.

Before a valid machine execution starts, a hardware machine, shown as a system in FIG. 2B, should be designed so that the standard, quantum random and meta instructions S U R U M always satisfy the unique state, scanning symbol condition. This condition assures that there is no ambiguity on what machine instruction should be executed when the machine is in state q and is scanning symbol a in memory. An ambiguity could create a physical situation where no more instructions are executed: this is analogous to a flip-flop that has not yet settled upon a 0 or 1 output (i.e., Buridan's ass). Furthermore, the execution of a meta instruction preserves this uniqueness condition.

Specification 5.3 is an embodiment of self-modification system 250 in FIG. 2B. Specification 5.3 is also an embodiment of meta instructions 120 in FIG. 1A.

Machine Specification 5.3. Execution of Meta Instructions 120 in FIG. 1A

A meta instruction $(q, a, r, \alpha, y, J)$ in $\mathcal{M}$ is executed as follows.

The first five coordinates $(q, a, r, \alpha, y)$ are executed as a standard instruction according to specification 5.1 with one caveat. State q may be expressed as $|Q|-c_1$ and state r may be expressed as $|Q|$ or $|Q|-c_2$, where $0 < c_1, c_2 \leq |Q|$. When $(q, a, r, \alpha, y)$ is executed, if q is expressed as $|Q|-c_1$, the value of q is instantiated to the current value of $|Q|$ minus $c_1$. Similarly, if r is expressed as $|Q|$ or $|Q|-c_2$, the value of state r is instantiated to the current value of $|Q|$ or $|Q|$ minus $c_2$, respectively.

Subsequently, instruction J modifies $\mathcal{I}$ where instruction J has one of the three forms: J=(q, a, r, α, y) or J=(q, a, r, y) or J=(q, a, r, α, y, J₁). In the third form, J is also a meta instruction.

For each of the three forms, if $\mathcal{I} \cup \{J\}$ still satisfies the unique state, scanning symbol condition, then $\mathcal{I}$ is updated to $\mathcal{I} \cup \{J\}$.

Otherwise, there is an instruction I in $\mathcal{I}$ whose first two coordinates q, a, are equal to instruction J's first two coordinates. In this case, instruction J replaces instruction I in $\mathcal{I}$. That is, $\mathcal{I}$ is updated to $\mathcal{I} \cup \{J\} - \{I\}$.

In the third form, in meta instructions 120 of FIG. 1A, a meta instruction that executes can create a new meta instruction, which is added to $\mathcal{I}$ or replaces some other instruction that already lies in $\mathcal{I}$, according to the unique state, scanning symbol condition. A meta instruction that creates another meta instruction can also be part of self-modification system 250. In regard to specification 5.3, embodiment 1 shows how instruction I is added to $\mathcal{I}$ and how new states are instantiated and added to Q.

Machine Embodiment 1. Adding New Machine States

Consider the meta instruction $(q, \alpha_1, |Q|-1, \alpha_1, y_1, J)$, where $J=(|Q|-1, \alpha_2, |Q|, \alpha_2, y_2)$. After the standard instruction $(q, \alpha_1, |Q|-1, \alpha_1, y_1)$ is executed, this meta instruction adds one new state $|Q|$ to the machine states Q and also adds the instruction J, instantiated with the current value of $|Q|$. FIG. 1C shows the execution of the first computational step for this meta instruction—for the specific values Q={0, 1, 2, 3, 4, 5, 6, 7}, A={#, 0, 1}, q=5, $\alpha_1$=0, $\alpha_1$=1, $y_1$=0, $\alpha_2$=1, $\alpha_2$=#, and $y_2$=-1. States and alphabet symbols are shown in red and blue, respectively. FIG. 1D shows the execution of the second computational step for meta instruction $(q, \alpha_1, |Q|-1, \alpha_1, y_1, J)$, where $J=(|Q|-1, \alpha_2, |Q|, \alpha_2, y_2)$. FIG. 1C and FIG. 1D illustrate how new machine states are added to Q, as a result of executing the meta instruction.

In other embodiments, meta instructions 120 in FIG. 1A may be implemented in hardware that can count the number of machine states and has instantiation hardware to instantiate a meta instruction based on the current number of machine states. In hardware, extra instructions created by the execution of a meta instruction can be stored in this hardware, implementing memory system 246 of FIG. 2B. In other embodiments, meta instructions 120 in FIG. 1A may be implemented in a more abstract programming language. In some embodiments, meta instructions 120 can be implemented the LISP programming language and executed on computing machine 204, shown in FIG. 2A with an external random number generator 552 in FIG. 5B with LEDs as the quantum sources, as shown in FIG. 6A, FIG. 6B and FIG. 6C. In another embodiment, randomness generator 552 may be part of an integrated circuit that also executes machine instructions 100, including standard instructions 110, meta instructions 120 and random instructions 140.

Below is an example of how meta instructions 120 in FIG. 1A can be expressed in LISP. The following LISP code takes a lambda function, named y_plus_x with two arguments x and y and adds them. The code self-modifies lambda function y_plus_x, expressed as (lambda (y x) (+y x)) to construction a lambda function (lambda (x) (+x x)) that takes one argument x as input and doubles x.

```
;; ex_fn.lsp
;;
;; Author: Michael Stephen Fiske
(set 'y_plus_x (lambda (y x) (+ y x) ) )
(define (meta_replace_arg1_with_arg2 lambda_fn)
    (letn (
        (lambda_args (first lambda_fn) )
        (num_args (length lambda_args) )
        (arg1 (first lambda_args) )
        (body (rest lambda_fn) )
        (i 0)
        (arg2 nil)
        (fn_double_x nil)
    )
```

```
    (if (> num_args 1)
       (set 'arg2 (first (rest lambda_args) ) )
    )
    (println "Before self-modifying lambda_fn = " lambda_fn)
    (println "args: " lambda_args)
    (println "number of arguments: " num_args)
    (println "arg1: " arg1)
    (println "Before self-modification, lambda body: " body)
    (set-ref-all arg1 body arg2)
    (append (lambda) (list (list arg2) ) body)
) )
(define (meta_procedure lambda_fn lambda_modifier)
   (lambda_modifier lambda_fn)
)
(set 'double (meta_procedure y_plus_x meta_replace_arg1_with_arg2) )
(println "After self-modification, lambda function double = " double)
(println "(double 5) = " (double 5) )
double
```

The aforementioned LISP code produces the following output when executed:

```
Before self-modifying lambda_fn = (lambda (y x) (+ y x) )
args: (y x)
number of arguments: 2
arg1: y
Before self-modification, lambda body: ( (+ y x) )
After self-modification, lambda function double = (lambda (x) (+ x x) )
(double 5) = 10
```

In the final computational step, lambda function (lambda (x) (+x x)) is returned.

Let $\mathcal{X}$ be an ex-machine. The instantiation of $|Q|-1$ and $|Q|$ in a meta instruction I (shown in FIG. 1C) invokes self-reflection about $\mathcal{X}$'s current number of states, at the moment when $\mathcal{X}$ executes I. This simple type of self-reflection is straightforward in physical realizations. In particular, a physical implementation in our lab along with quantum random bits measured from a quantum random number generator [34] simulates all executions of the ex-machines provided herein.

Machine Specification 5.4. Simple Meta Instructions

A simple meta instruction has one of the forms (q, a, $|Q|-c_2$, α, y), (q, a, $|Q|$, α, y), ($|Q|-c_1$, a, r, α, y), ($|Q|-c_1$, a, $|Q|-c_2$, α, y), ($|Q|-c_1$, a, $|Q|$, α, y), where $0<c_1$, $c_2 \le |Q|$. The expressions $|Q|-c_1$, $|Q|-c_2$ and $|Q|$ are instantiated to a state based on the current value of $|Q|$ when the instruction is executed.

In the embodiments in this section, ex-machines only self-reflect with the symbols $|Q|-1$ and $|Q|$. In other embodiments, an ex-machine may self-reflect with $|Q|+c$, where c is positive integer.

Machine Embodiment 2. Execution of Simple Meta Instructions

Let A={0, 1, #} and Q={0}. ex-machine $\mathcal{X}$ has 3 simple meta instructions.

($|Q|-1$, #, $|Q|-1$, 1, 0)
($|Q|-1$, 1, $|Q|$, 0, 1)
($|Q|-1$, 0, $|Q|$, 0, 0)

With an initial blank memory and starting state of 0, the first four computational steps are shown below. In the first step, $\mathcal{X}$'s memory head is scanning a # and the ex-machine state is 0. Since $|Q|=1$, simple meta instruction ($|Q|-1$, #, $|Q|-1$, 1, 0) instantiates to (0, #, 0, 1, 0), and executes.

| STATE | MEMORY | MEMORY ADDRESS | IN-STRUCTION | NEW IN-STRUCTION |
|---|---|---|---|---|
| 0 | ## 1### | 0 | (0, #, 0, 1, 0) | (0, #, 0, 1, 0) |
| 1 | ##0 ### | 1 | (0, 1, 1, 0, 1) | (0, 1, 1, 0, 1) |
| 1 | ##0 1## | 1 | (1, #, 1, 1, 0) | (1, #, 1, 1, 0) |
| 2 | ##00 ## | 2 | (1, 1, 2, 0, 1) | (1, 1, 2, 0, 1) |

In the second step, the memory head is scanning a 1 and the state is 0. Since $|Q|=1$, instruction ($|Q|-1$, 1, $|Q|$, 0, 1) instantiates to (0, 1, 1, 0, 1), executes and updates Q={0, 1}. In the third step, the memory head is scanning a # and the state is 1. Since $|Q|=2$, instruction ($|Q|-1$, #, $|Q|-1$, 1, 0) instantiates to (1, #, 1, 1, 0) and executes. In the fourth step, the memory head is scanning a 1 and the state is 1. Since $|Q|=2$, instruction ($|Q|-1$, 1, $|Q|$, 0, 1) instantiates to (1, 1, 2, 0, 1), executes and updates Q={0, 1, 2}. During these four steps, two simple meta instructions create four new instructions and add new states 1 and 2.

Machine Specification 5.5. Finite Initial Conditions

A machine is said to have finite initial conditions if the following conditions are satisfied by the computing hardware shown in hardware embodiments of FIG. 1A, FIG. 2A, FIG. 2B, FIG. 5A, FIG. 5B, FIG. 5C, FIG. 6A, FIG. 6B, FIG. 6C, before the machine starts its execution.

1. The number of machine states $|Q|$ is finite.
2. The number of alphabet symbols $|A|$ (i.e., memory values) is finite.
3. The number of machine instructions is $|\mathcal{I}|$ finite.
4. The memory is finitely bounded.

It may be useful to think about the initial conditions of an ex-machine as analogous to the boundary value conditions of a differential equation. While trivial to verify, the purpose of remark 5.1 is to assure computations by an ex-machine execute on different types of hardware such as semiconductor chips, lasers using photons, biological implementations using proteins, DNA and RNA, quantum computers that use entanglement and quantum superposition.

Remark 5.1. Finite Initial Conditions

If the machine starts its execution with finite initial conditions, then after the machine has executed l instructions for any positive integer l, the current number of states Q(l) is finite and the current set of instructions $\mathcal{I}$ (l) is finite. Also, the memory T is still finitely bounded and the number of measurements obtained from the random or non-deterministic source is finite.

Proof. The remark follows immediately from specification 5.5 of finite initial conditions and machine instruction specifications 5.1, 5.2, and 5.3. In particular, the execution of one meta instruction adds at most one new instruction and one new state to Q. □

Specification 5.6 describes new ex-machines that can evolve from computations of prior ex-machines that have halted. The notion of evolving is useful because the random instructions 140 and meta instructions 120 can self-modify an ex-machine's instructions as it executes. In contrast with the ex-machine, after a digital computer program stops executing, its instructions have not changed.

This difference motivates the next specification, which is illustrated by the following. Consider an initial ex-machine $\mathcal{X}_0$ that has 9 initial states and 15 initial instructions. $\mathcal{X}_0$ starts' executing on a finitely bounded memory $T_0$ and halts. When the ex-machine halts, it (now called $\mathcal{X}_1$) has 14 states and 24 instructions and the current memory is $S_1$. We say that ex-machine $\mathcal{X}_0$ with memory $T_0$ evolves to ex-machine $\mathcal{X}$1 with memory $S_1$.

Machine Specification 5.6. Evolving an Ex-Machine

Let $T_0, T_1, T_2 \ldots T_{i-1}$ each be a finitely bounded memory. Consider ex-machine $\mathcal{X}_0$ with finite initial conditions in the ex-machine hardware. $\mathcal{X}_0$ starts executing with memory $T_0$ and evolves to ex-machine $\mathcal{X}_n$, with memory $S_1$. Subsequently, $\mathcal{X}_i$ starts executing with memory $T_1$, and evolves to $\mathcal{X}_2$ with memory $S_2$. This means that when ex-machine $\mathcal{X}_1$ starts executing on memory $T_1$, its instructions are preserved after the halt with memory $S_1$. The ex-machine evolution continues until $\mathcal{X}_{i-1}$ starts executing with memory $T_{i-1}$ and evolves to ex-machine $\mathcal{X}_i$ with memory $S_i$. One says that ex-machine $\mathcal{X}_0$ with finitely bounded memories $T_0, T_1, T_2 \ldots T_{i-1}$ evolves to ex-machine $\mathcal{X}_i$ after i halts.

When an ex-machine $\mathcal{X}_0$ evolves to $\mathcal{X}_1$ and subsequently $\mathcal{X}_1$ evolves to $\mathcal{X}_2$ and so on up to ex-machine $\mathcal{X}_n$, then ex-machine $\mathcal{X}_i$ is called an ancestor of ex-machine $\mathcal{X}_j$ whenever $0 \leq i < j \leq n$. Similarly, ex-machine $\mathcal{X}_j$ is called a descendant of ex-machine $\mathcal{X}$, whenever $0 \leq i < j \leq n$. The sequence of ex-machines $\mathcal{X}_0 \to \mathcal{X}_1 \to \ldots \to \mathcal{X}_n \ldots$ is called an evolutionary path.

In some embodiments, this sequence of ex-machines may be stored on distinct computing hardware, as shown in machines 214, 216, 218 and 220 of FIG. 2A. In an embodiment, token 202 may contain hardware shown in FIG. 5A, FIG. 5B, FIG. 5C, FIG. 6A, FIG. 6B, or FIG. 6C. Token 202 may provide quantum random measurements 130 or help implement random instructions 150 in FIG. 1B that are used by machines 214, 216, 218 and 220 of FIG. 2A.

6 NON-DETERMINISM, RANDOMNESS, AND QUANTUM EVENTS

Figure 1B:
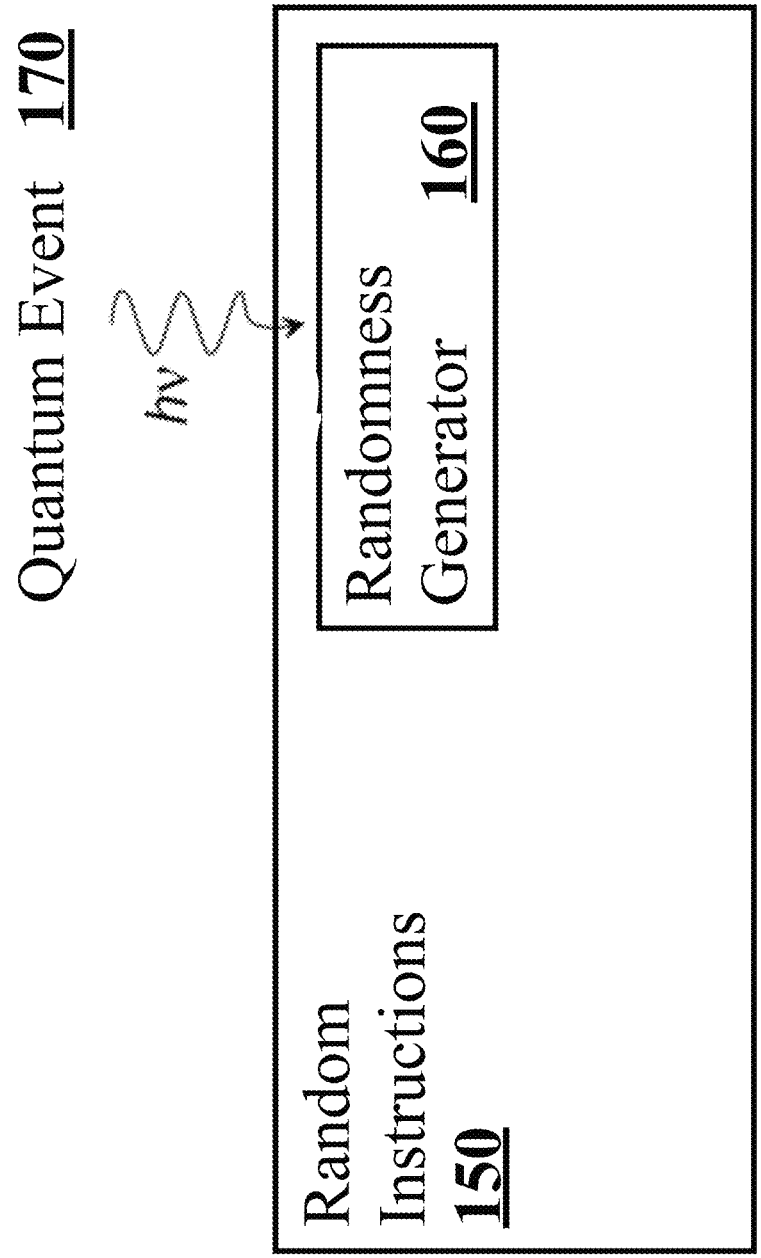
Figure 1C:
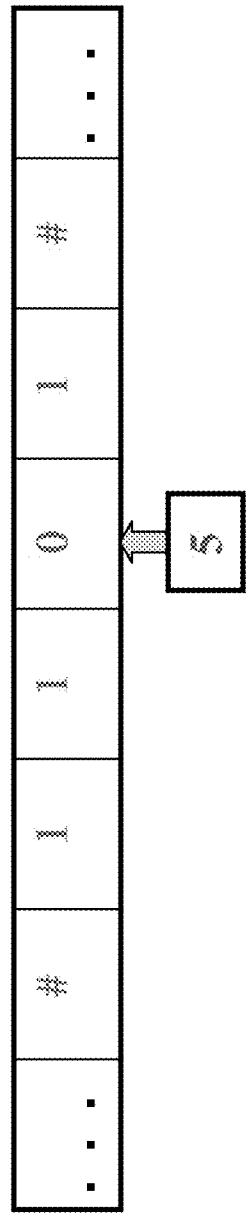
Figure 1C:
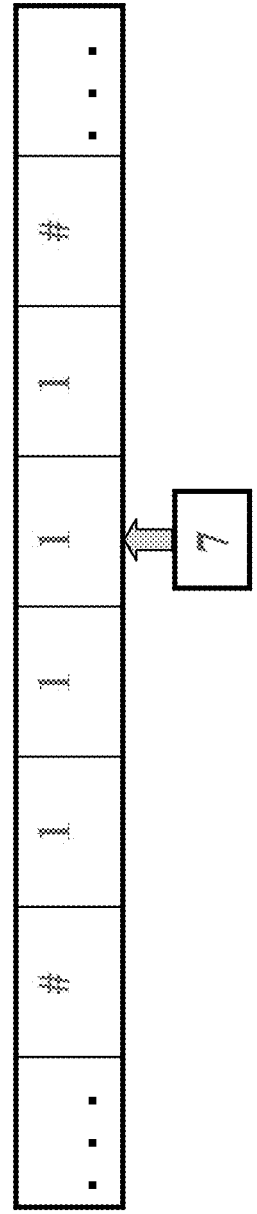
Figure 1D:
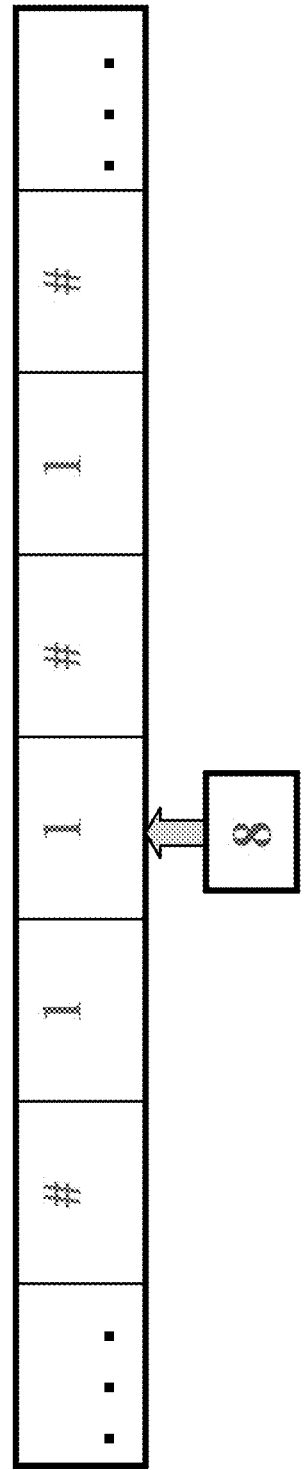

In some embodiments, the computing machines described in this invention use non-determinism as a computational tool to make the computation unpredictable. In some embodiments, quantum random measurements are used as a computational tool. Quantum randomness is a type of non-determinism, based on measuring quantum events 170 by randomness generator 160, as shown in FIG. 1B. We ran DIEHARD statistical tests of our random instructions executed in Random Walk Embodiment 1, whose implementation follows embodiments shown in FIG. 6A, FIG. 6B and FIG. 6C. The statistics of our random instructions executed in Random Walk Embodiment 1 behave according to random measurement properties 1 and 2. These statistical properties have also been empirically observed in other quantum random sources [22, 26, 27].

Some embodiments of physically non-deterministic processes are as follows. In some embodiments that utilize non-determinism, photons can (i.e., quantum event 170, quantum event 547, quantum event 557) strike a semitransparent mirror and then take two or more paths in space. In one embodiment, if the photon is reflected by the semitransparent mirror, then it takes on one bit value b with a binary outcome: if the photon passes through by the semitransparent mirror (i.e., quantum event 170), then the non-deterministic process produces another bit value 1-b.

In another embodiment, the spin 560 of an electron may be measured to generate the next non-deterministic bit. In another embodiment, a protein, composed of amino acids, spanning a cell membrane or artificial membrane, that has two or more conformations (quantum event 170 in FIG. 1B) can be used to detect non-determinism: the protein conformation (quantum event 170) measured by random measurements 130 can generate a non-deterministic value in $\{0, 1, n-1\}$, where the protein has n distinct conformations. In an alternative embodiment, one or more rhodopsin proteins could be used to detect the arrival times of photons (quantum event 170 in FIG. 1B) and the differences of 3 arrival times $t_0 < t_1 < t_2$ could generate non-deterministic bits: generate 1 if $t_2 - t_1 > t_1 - t_0$ and generate 0 if $t_2 - t_1 < t_1 - t_0$ and do not generate a bit if $t_2 - t_1 = t_1 - t_0$. In some embodiments, a Geiger counter may measure the detection of radioactive events (quantum event 170) as a part of randomness generator 160 that is a part of random instructions 150.

In sections 7 and 11, the execution of the standard instructions, random instructions and meta instructions uses the property that for any m, all $2^m$ binary strings are equally likely to occur when a quantum random number generator takes m binary measurements. One, however, has to be careful not to misinterpret quantum random properties 1 and 2. In an embodiments, where the probability of one binary outcome is $p \neq \frac{1}{2}$, then an unbiased source of randomness (i.e., each binary string is equally likely) can be produced with a simple standard machine that operates on more than one measurement of the binary outcome to produce a single, unbiased outcome. The number of measurements, taken by random measurements 130, needed to generated an unbiased binary outcome, depends upon how far p is from frac12.

Consider the Champernowne sequence 01 00 01 10 11 000 001 010 011 100 101 110 111 0000 . . . , which is sometimes cited as a sequence that is Borel normal, yet still Turing computable. In [9], Feller discusses the mathematics of random walks. The Champernowne sequence catastrophically fails the expected number of changes of sign for a random walk as $n \to \infty$. Since all $2^m$ strings are equally likely, the expected value of changes of sign follows from the reflection principle and simple counting arguments, as shown in section 111.5 of [9].

Furthermore, most of the $2^m$ binary strings (i.e., binary strings of length m) have high Kolmogorov complexity. This fact leads to the following mathematical intuition that enables new computational behaviors that a standard digital computer cannot perform. The execution of quantum random instructions working together with meta instructions enables the ex-machine to increase its program complexity [28] as it evolves. In some cases, the increase in program complexity can increase the ex-machine's computational power as the ex-machine evolves. Also, notice the distinction here between the program complexity of the ex-machine and Kolmogorov complexity. The definition of Kolmogorov complexity only applies to standard machines. Moreover, the program complexity (e.g., the Shannon complexity |Q||A|) stays fixed for standard machines. In contrast, an ex-machine's program complexity can increase without bound, when the ex-machine executes quantum random and meta instructions that productively work together. (For example, see ex-machine 2, called $\mathfrak{Q}(x)$.)

In terms of the ex-machine computation performed, how one of these binary strings is generated from some particular type of non-deterministic process is not the critical issue. Suppose the quantum random generator demonstrated measuring the spin of particles, certified by the strong Kochen-Specker theorem [4, 13] outputs the 100-bit string $a_0 a_1 \ldots$ a=10110000101011100110011001110001000111001010101101111000000010011001000011010101101111001101010000 to ex-machine $\mathcal{X}_1$.

Suppose a distinct quantum random generator using radioactive decay outputs the same 100-bit string $\alpha_0 \alpha_1 \ldots \alpha_{99}$ to a distinct ex-machine $\mathcal{X}_2$. Suppose $\mathcal{X}_1$ and $\mathcal{X}_2$ have identical programs with the same initial tapes and same initial state. Even though radioactive decay was discovered over 100 years ago and its physical basis is still phenomenological, the execution behavior of $X_1$ and $X_2$ are indistinguishable for the first 100 executions of their quantum random instructions. In other words, ex-machines $\mathfrak{x}_1$ and $\mathfrak{x}_2$ exhibit execution behaviors that are independent of the quantum process that generates these two identical binary strings.

6.1 Mathematical Determinism and Unpredictability

Before some of the deeper theory on quantum randomness is reviewed, we take a step back to view randomness from a broader theoretical perspective. While we generally agree with the philosophy of Eagle [7] that randomness is unpredictablity, embodiment 3 helps sharpen the differences between indeterminism and unpredictability.

Machine Embodiment 3. [1111] A Mathematical Gedankenexperiment

Our gedankenexperiment demonstrates a deterministic system which exhibits an extreme amount of unpredictability. This embodiment shows that a physical system whose mathematics is deterministic can still be an extremely unpredictable process if the measurements of the process has limited resolution. Some mathematical work is needed to define the dynamical system and summarize its mathematical properties before we can present the gedankenexperiment.

Consider the quadratic map $f:\mathbb{R} \to \mathbb{R}$, where $f(x)=9/2x(1-x)$. Set $I_0=[0, 1/3]$ and $I_1=[1/3, 2/3]$. Set $B=(1/3, 2/3)$. Define the set $\Lambda=\{x \in [0, 1]: f^n(x) \in I_0 \cup I_1 \text{ for all } n \in \mathfrak{A}\}$. 0 is a fixed point of $f$ and $f^2(1/3)$ $f^2(2/3)=0$, so the boundary points of B lie in $\Lambda$. Furthermore, whenever $x \in B$, then $f(x)<0$ and $$\lim_{n \to \infty} f^n(x) = -\infty.$$

This means all orbits that exit A head off to $-\infty$.

The inverse image $f^{-1}(B)$ is two open intervals $B_0 \subset I_0$ and $B_1 \subset I_1$ such that $f(B_0)=f(B_1)=B$. Topologically, $B_0$ behaves like Cantor's open middle third of $I_0$ and $B_1$ behaves like Cantor's open middle third of $I_1$. Repeating the inverse image indefinitely, define the set $$H = B \cup \bigcup_{k=1}^{\infty} f^{-k}(B).$$

Now $H \cup \Lambda = [0,1]$ and $H \cap \Lambda = \emptyset$.

Using dynamical systems notation, set $\Sigma_2 = \{0, 1\}^{\mathfrak{K}}$. Define the shift map $\sigma: \Sigma_2 \to \Sigma_2$, where $\sigma(a_0 a_1 \ldots) = (a_1 a_2 \ldots)$. For each x in $\Lambda$, x's trajectory in $I_0$ and $I_1$ corresponds to a unique point in $\Sigma_2$: define h: $\Lambda \to \Sigma_2$ as $h(x)=(a_0 a_1 \ldots)$ such that for each $n \in \mathfrak{A}$, set $a_n=0$ if $f^n(x) \in I_0$ and $a_n=1$ if $f^n(x) \in I_1$.

For any two points $(a_0 a_1 \ldots)$ and $(b_0 b_1 \ldots)$ in $\Sigma_2$, define the metric $d((a_0 a_1 \ldots),$ $$(b_0 b_1 \ldots )) = \sum_{i=0}^{\infty} |a_i - b_i| 2^{-i}.$$

Via the standard topology on $\mathbb{R}$ inducing the subspace topology on $\Lambda$, it is straightforward to verify that h is a homeomorphism from $\Lambda$ to $\Sigma_2$. Moreover, $h \circ f = \sigma \circ h$, so h is a topological conjugacy. The set H and the topological conjugacy h enable us to verify that $\Lambda$ is a Cantor set. This means that $\Lambda$ is uncountable, totally disconnected, compact and every point of $\Lambda$ is a limit point of $\Lambda$.

We are ready to pose our mathematical gedankenexperiment. We make the following assumption about our mathematical observer. When our observer takes a physical measurement of a point x in $\Lambda_2$, she measures a 0 if x lies in $I_0$ and measures a 1 if x lies in $I_1$. We assume that she cannot make her observation any more accurate based on our idealization that is analogous to the following: measurements at the quantum level have limited resolution due to the wavelike properties of matter [3] Similarly, at the second observation, our observer measures a 0 if $f(x)$ lies in $I_0$ and 1 if $f(x)$ lies in $I_1$. Our observer continues to make these observations until she has measured whether $f^{k-1}(x)$ is in $I_0$ or in $I_1$. Before making her k+1st observation, can our observer make an effective prediction whether $f^{k-1}(x)$ lies in $I_0$ or $I_1$ that is correct for more than 50% of her predictions?

The answer is no when h(x) is a generic point (i.e., in the sense of Lebesgue measure) in $\Sigma_2$. Set $\mathcal{R}$ to the Martin-Löf random points in $\Sigma_2$. Then $\mathcal{R}$ has Lebesgue measure 1 (Feller [9]) in $\Sigma_2$, so its complement $\Sigma_2 - \mathcal{R}$ has Lebesgue measure 0. For any x such that h(x) lies in $\mathcal{R}$, then our observer cannot predict the orbit of x with a Turing machine. Hence, via the topological conjugacy h, we see that for a generic point x in $\Lambda$, x's orbit between $I_0$ and $I_1$ is Martin-Löf random–even though $f$ is mathematically deterministic and $f$ is a Turing computable function.

Overall, the dynamical system $(f, \Lambda)$ is mathematically deterministic and each real number x in $\Lambda$ has a definite value. However, due to the lack of resolution in the observer's measurements, the orbit of generic point x is unpredictable—in the sense of Martin-Löf random.

6.2 Quantum Random Theory

The standard theory of quantum randomness stems from the seminal EPR paper [8]. Einstein, Podolsky and Rosen (EPR) propose a necessary condition for a complete theory of quantum mechanics: Every element of physical reality must have a counterpart in the physical theory. Furthermore, they state that elements of physical reality must be found by the results of experiments and measurements. While mentioning that there might be other ways of recognizing a physical reality, EPR propose the following as a reasonable criterion for a complete theory of quantum mechanics:

If, without in any way disturbing a system, one can predict with certainty (i.e., with probability equal to unity) the value of a physical quantity, then there exists an element of physical reality corresponding to this physical quantity.

They consider a quantum-mechanical description of a particle, having one degree of freedom. After some analysis, they conclude that a definite value of the coordinate, for a particle in the state given by $$\psi = e^{\frac{2\pi i}{h} p_0 x},$$

is not predictable, but may be obtained only by a direct measurement. However, such a measurement disturbs the particle and changes its state. They remind us that in quantum mechanics, when the momentum of the particle is known, its coordinate has no physical reality. This phenomenon has a more general mathematical condition that if the operators corresponding to two physical quantities, say A and B, do not commute, then a precise knowledge of one of them precludes a precise knowledge of the other. Hence, EPR reach the following conclusion:

(I) The quantum-mechanical description of physical reality given by the wave function is not complete. OR (II) When the operators corresponding to two physical quantities (e.g., position and momentum) do not commute (i.e. AB ≠ BA), the two quantities cannot have the same simultaneous reality.

EPR justifies this conclusion by reasoning that if both physical quantities had a simultaneous reality and consequently definite values, then these definite values would be part of the complete description. Moreover, if the wave function provides a complete description of physical reality, then the wave function would contain these definite values and the definite values would be predictable.

From their conclusion of I OR II, EPR assumes the negation of I—that the wave function does give a complete description of physical reality. They analyze two systems that interact over a finite interval of time. And show by a thought experiment of measuring each system via wave packet reduction that it is possible to assign two different wave functions to the same physical reality. Upon further analysis of two wave functions that are eigenfunctions of two non-commuting operators, they arrive at the conclusion that two physical quantities, with non-commuting operators can have simultaneous reality. From this contradiction or paradox (depending on one's perspective), they conclude that the quantum-mechanical description of reality is not complete.

In [2], Neil Bohr responds to the EPR paper. Via an analysis involving single slit experiments and double slit (two or more) experiments, Bohr explains how during position measurements that momentum is transferred between the object being observed and the measurement apparatus. Similarly, Bohr explains that during momentum measurements the object is displaced. Bohr also makes a similar observation about time and energy: "it is excluded in principle to control the energy which goes into the clocks without interfering essentially with their use as time indicators". Because at the quantum level it is impossible to control the interaction between the object being observed and the measurement apparatus, Bohr argues for a "final renunciation of the classical ideal of causality" and a "radical revision of physical reality".

From his experimental analysis, Bohr concludes that the meaning of EPR's expression without in any way disturbing the system creates an ambiguity in their argument. Bohr states: "There is essentially the question of an influence on the very conditions which define the possible types of predictions regarding the future behavior of the system. Since these conditions constitute an inherent element of the description of any phenomenon to which the term physical reality can be properly attached, we see that the argumentation of the mentioned authors does not justify their conclusion that quantum-mechanical description is essentially incomplete." Overall, the EPR versus Bohr-Born-Heisenberg position set the stage for understanding whether hidden variables can exist in the theory of quantum mechanics.

Embodiments of quantum random instructions utilize the lack of hidden variables because this contributes to the unpredictability of quantum random measurements. In some embodiments of the quantum random measurements used by the quantum random instructions, the lack of hidden variables are only associated with the quantum system being measured and in other embodiments the lack of hidden variables are associated with the measurement apparatus. In some embodiments, the value indefiniteness of measurement observables implies unpredictability. In some embodiments, the unpredictability of quantum measurements 130 in FIG. 1A depend upon Kochen-Specker type theorems [4, 13] In some embodiments, the unpredictability of random measurements 130 in FIG. 1A depend upon Bell type theorems [1].

In an embodiment of quantum random measurements 130 shown in FIG. 1A, a protocol for two sequential measurements that start with a spin-1 source is shown in FIG. 5C. Spin-1 particles are prepared in the $S_z=0$ state. (From their eigenstate assumption, this operator has a definite value.) Specifically, the first measurement puts the particle in the $S_z=0$ eigenstate of the spin operator $S_z$. Since the preparation state is an eigenstate of the $S_x=0$ projector observable with eigenvalue 0, this outcome has a definite value and theoretically cannot be reached. The second measurement is performed in the eigenbasis of the $S_x$ operator with two outcomes $S_x=\pm 1$.

The $S_x=\pm 1$ outcomes can be assigned 0 and 1, respectively. Moreover, since $$\langle S_z = 0 \mid S_x = \pm 1 \rangle = \frac{1}{\sqrt{2}},$$

neither of the $S_x=\pm 1$ outcomes can have a pre-determined definite value. As a consequence, bits 0 and 1 are generated independently (stochastic independence) with a 50/50 probability (unbiased). These are quantum random properties 1 and 2.

7 COMPUTING EX-MACHINE LANGUAGES

A class of ex-machines are defined as evolutions of the fundamental ex-machine $\mathfrak{Q}$ (x), whose 15 initial instructions are listed in ex-machine specification 2. These ex-machines compute languages L that are subsets of $\{a\}^* = \{a^n : n \in \mathfrak{A}\}$. The expression $a^n$ represents a string of n consecutive a's. For example, $a^5$=aaaaa and $a^0$ is the empty string. Define the set of languages $$\mathfrak{L} = \bigcup_{L \subset \{a\}^*} \{L\}.$$

Machine Specification 7.1 defines a unique language in $\mathfrak{L}$ for each function $f: \mathfrak{A} \to \{0, 1\}$.

Machine Specification 7.1. Language $L_f$

Consider any function $f: \mathfrak{A} \to \{0, 1\}$. This means $f$ is a member of the set $\{0, 1\}^{\mathbb{N}}$ Function $f$ induces the language $L_f = \{a^n : f(n)=1\}$. In other words, for each non-negative integer n, string $a^n$ is in the language $L_f$ if and only if $f(n)=1$. Trivially, $L_f$ is a language in $\mathfrak{L}$ Moreover, these functions $f$ generate all of $\mathfrak{L}$.

Remark 7.1.

$$\mathfrak{L} = \bigcup_{f \in \{01\}^{\mathbb{N}}} \{L_f\}$$

In order to define the halting syntax for the language in $\mathfrak{L}$ that an ex-machine computes, choose alphabet set A={#, 0, 1, N, Y, a}.

Machine Specification 7.2. Language L in $\mathfrak{L}$ that Ex-Machine $\mathcal{X}$ a Computes Let $\mathcal{X}$ be an ex-machine. The language L in $\mathfrak{L}$ that $\mathcal{X}$ computes is defined as follows. A valid initial tape has the form # #$a^n$ #. The valid initial tape # ## represents the empty string. After machine $\mathfrak{X}$ starts executing with initial tape # #$a^n$ #, string $a^n$ is in $\mathfrak{X}$'s language if ex-machine $\mathfrak{X}$ halts with tape #$a^n$# Y #. String $a^n$ is not in $\mathfrak{X}$'s language if $\mathfrak{X}$ halts with tape #$a^n$ # N #.

The use of special alphabet symbols (i.e., special memory values) Y and N—to decide whether $a^n$ is in the language or not in the language—follows [14].

For a particular string # #$a^m$#, some ex-machine X could first halt with #$a^m$# N # and in a second computation with input # #$a^m$# could halt with #$a^m$# Y #. This oscillation of halting outputs could continue indefinitely and in some cases the oscillation can be aperiodic. In this case, X's language would not be well-defined according to machine specification 7.2. These types of ex-machines will not be specified in this invention.

There is a subtle difference between $\mathfrak{Q}$ (x) and an ex-machine X whose halting output never stabilizes. In contrast to the Turing machine or a digital computer program, two different instances of the ex-machine $\mathfrak{Q}$ (x) can evolve to two different machines and compute distinct languages according to machine specification 7.2. However, after $\mathfrak{Q}$ (x) has evolved to a new machine $\mathfrak{Q}$ ($a_0 a_1 \ldots a_m$ x) as a result of a prior execution with input tape # #$a^m$#, then for each i with $0 \leq i \leq m$, machine $\mathfrak{Q}$ ($a_0 a_1 \ldots a_m$ x) always halts with the same output when presented with input tape # #$a^i$#. In other words, $\mathfrak{Q}$ ($a_0 a_1 \ldots a_m$ x)'s halting output stabilizes on all input strings $a^i$ where $0 \leq i \leq m$. Furthermore, it is the ability of $\mathfrak{Q}$ (x) to exploit the non-autonomous behavior of its two quantum random instructions that enables an evolution of $\mathfrak{Q}$ (x) to compute languages that are Turing incomputable (i.e., not computable by a standard digital computer).

We designed ex-machines that compute subsets of {a}* rather than subsets of {0, 1}* because the resulting specification of $\mathfrak{Q}$ (x) is much simpler and more elegant. It is straightforward to list a standard machine that bijectively translates each $a^n$ to a binary string in {0, 1}* as follows. The empty string in {a}* maps to the empty string in {0, 1}*. Let $\psi$ represent this translation map. Hence, $$a \xrightarrow{\psi} 0,\ aa \xrightarrow{\psi} 1,\ aaa \xrightarrow{\psi} 00,\ a^4 \xrightarrow{\psi} 01,\ a^5 \xrightarrow{\psi} 10,\ a^6 \xrightarrow{\psi} 11,\ a^7 \xrightarrow{\psi}$$

000, and so on. Similarly, an inverse translation standard machine computes the inverse of $\psi$. Hence $$0 \xrightarrow{\psi^{-1}} a,\ 1 \xrightarrow{\psi^{-1}} aa,\ 00 \xrightarrow{\psi^{-1}} aaa,$$

and so on. The translation and inverse translation computations immediately transfer any results about the ex-machine computation of subsets of {a}* to corresponding subsets of {0, 1} via $\psi$. In particular, the following remark is relevant for our discussion.

Remark 7.2. Every subset of {a}* is computable by some ex-machine if and only if every subset of {0, 1}* is computable by some ex-machine.

Proof. The remark immediately follows from the fact that the translation map $\psi$ and the inverse translation map $\psi^{-1}$ are computable with a standard machine.
□

When the quantum randomness in $\mathfrak{Q}$'s two quantum random instructions satisfy property 1 (unbiased bernoulli trials) and random measurement property 2 (stochastic independence), for each $n \in \mathfrak{A}$, all $2^n$ finite paths of length n—in the infinite, binary tree of figure 71—are equally likely. (See [9] for a comprehensive study of random walks.)

Moreover, there is a one-to-one correspondence between a function $f: \mathfrak{A} \to \{0, 1\}$ and an infinite downward path in the infinite binary tree of figure 71. The beginning of a particular infinite downward path is shown in red; it starts as (0, 1, 1, 0 . . . ). Based on this one-to-one correspondence between functions $f: \mathfrak{A} \to \{0, 1\}$ and downward paths in the infinite binary tree, an examination of $\mathfrak{Q}$ (x)'s execution behavior will show that $\mathfrak{Q}$ (x) can evolve to compute any language $L_f$ in $\mathfrak{L}$ when quantum random instructions (x, #, x, 0) and (x, a, t, 0) satisfy random measurement property 1 and random measurement property 2.

Machine Specification 2. $\mathfrak{Q}$ (x)

A={#, 0, 1, N, Y, a}. States Q={0, h, n, y, t, v, v, x, 8} where halting state h=1, and states n=2, y=3, t=4, v=5, v=6, x=7. The initial state is always 0. The letters are used to represent machine states instead of explicit numbers because these states have special purposes. (This is for the reader's benefit.) State n indicates NO that the string is not in the machine's language. State y indicates YES that the string is in the machine's language. State x is used to generate a new random bit; this random bit determines the string corresponding to the current value of |Q|−1. The fifteen instructions of $\mathfrak{Q}$ (x) are shown below.

(0, #, 8, #, 1) $\mathfrak{Q}$
(8, #, x, #, 0)
(y, #, h, Y, 0)
(n, #, h, N, 0)
(x, #, x, 0)
(x, a, t, 0)
(x, 0, w, #, 0, (|Q|−1, #, n, #, 1))
(x, 1, V, #, 0, (|Q|−1, #, y, #, 1))
(t, 0, w, a, 0, (|Q|−1, #, n, #, 1))
(t, 1, w, a, 0, (|Q|−1, #, y, #, 1))
(v, #, n, #, 1, (|Q|−1, a, |Q|, a, 1))
(w, #, y, #, 1, (|Q|−1, a, |Q|, a, 1))
(w, a, |Q|, a, 1, (|Q|−1, a, |Q|, a, 1))
(|Q|−1, a, x, a, 0)
(|Q|−1, #, x, #, 0)

With initial state 0 and initial memory # #aaaa# #, an execution of machine $\mathfrak{Q}$ (x) is shown below.

| STATE | MEMORY | ADDRESS | INSTRUCTION | NEW INSTRUCTION |
|---|---|---|---|---|
| 8 | ## aaaa### | 1 | (0, #, 8, #, 1) | |
| x | ## aaaa### | 1 | (8, a, x, a, 0) | |
| t | ## 1aaa### | 1 | (x, a, t, 1_qr, 0) | |
| w | ## aaaa### | 1 | (t, 1, w, a, 0, (|Q| − 1, #, y, #, 1)) | (8, #, y, #, 1) |
| 9 | ##a aaa### | 2 | (w, a, |Q|, a, 1, (|Q| − 1, a, |Q|, a, 1)) | (8, a, 9, a, 1) |
| x | ##a aaa### | 2 | (9, a, x, a, 0) | (9, a, x, a, 0) |
| t | ##a 1aa### | 2 | (x, a, t, 1_qr, 0) | |
| w | ##a aaa### | 2 | (t, 1, w, a, 0, (|Q| − 1, #, y, #, 1)) | (9, #, y, #, 1) |
| 10 | ##aa aa### | 3 | (w, a, |Q|, a, 1, (|Q| − 1, a, |Q|, a, 1)) | (9, a, 10, a, 1) |
| x | ##aa aa### | 3 | (10, a, x, a, 0) | (10, a, x, a, 0) |
| t | ##aa 0a### | 3 | (x, a, t, 0_qr, 0) | |

-continued

| STATE | MEMORY | ADDRESS | INSTRUCTION | NEW INSTRUCTION |
|---|---|---|---|---|
| w | ##aa aa### | 3 | (t, 0, w, a, 0, (\|Q\|−1, #, n, #, 1)) | (10, #, n, #, 1) |
| 11 | ##aaa a### | 4 | (w, a, \|Q\|, a, 1, (\|Q\|−1, a, \|Q\|, a, 1)) | (10, a, 11, a, 1) |
| x | ##aaa a### | 4 | (11, a, x, a, 0) | (11, a, x, a, 0) |
| t | ##aaa 1### | 4 | (x, a, t, 1_qr, 0) | |
| w | ##aaa a### | 4 | (t, 1, w, a, 0, (\|Q\|−1, #, y, #, 1)) | (11, #, y, #, 1) |
| 12 | ##aaaa ### | 5 | (w, a, \|Q\|, a, 1, (\|Q\|−1, a, \|Q\|, a, 1)) | (11, a, 12, a, 1) |
| x | ##aaaa ### | 5 | (12, #, x, #, 0) | (12, #, x, #, 0) |
| x | ##aaaa 0## | 5 | (x, #, x, 0_qr, 0) | |
| v | ##aaaa ### | 5 | (x, 0, v, #, 0, (\|Q\|−1, #, n, #, 1)) | (12, #, n, #, 1) |
| n | ##aaaa# ## | 6 | (v, #, n, #, 1, (\|Q\|−1, a, \|Q\|, a, 1)) | (12, a, 13, a, 1) |
| h | ##aaaa# N# | 6 | (n, #, h, N, 0) | |

During this execution, Ǫ (x) replaces instruction (8, #, x, #, 0) with (8, #, y, #, 1). Meta instruction (w, a, |Q|, a, 1, (|Q|−1, a, |Q|, a, 1)) executes and replaces (8, a, x, a, 0) with new instruction (8, a, 9, a, 1). Also, simple meta instruction (|Q|−1, a, x, a, 0) temporarily added instructions (9, a, x, a, 0), (10, a, x, a, 0), and (11, a, x, a, 0).

Subsequently, these new instructions were replaced by (9, a, 10, a, 1), (10, a, 11, a, 1), and (11, a, 12, a, 1), respectively. Similarly, simple meta instruction (|Q|−1, #, x, #, 0) added instruction (12, #, x, #, 0) and this instruction was replaced by instruction (12, #, n, #, 1). Lastly, instructions (9, #, y. #, 1), (10, #, n, #, 1), (11, #, y, #, 1), and (12, a, 13, a, 1) were added.

Furthermore, five new states 9, 10, 11, 12 and 13 are added to |Q|. After this computation halts, the machine states are Q={0, h, n, y, t, v, v, x, 8, 9, 10, 11, 12, 13} and the resulting ex-machine evolved to has 24 instructions. It is called Ǫ (11010 x).

Machine Instructions 1. Ǫ (11010 x)
(0, #, 8, #, 1)
(y, s, h, Y, 0)
(n, #, h, N, 0)
(x, #, x, 0)
(x, a, t, 0)
(x, 0, v, #, 0, (|Q|−1, #, n, #, 1))
(x, 1, w, #, 0, (|Q|−1, #, y, #, 1))
(t, 0, w, a, 0, (|Q|−1, #, n, #, 1))
(t, 1, w, a, 0, (|Q|−1, #, y, #, 1))
(v, #, n, #, 1, (|Q|−1, a, |Q|, a, 1))
(w, #, y, #, 1, (|Q|−1, a, |Q|, a, 1))
(w, a, |Q|, a, 1, (|Q|−1, a, |Q|, a, 1))
(|Q|−1, a, x, a, 0)
(|Q|−1, #, x, #, 0)
(8, #, y, #, 1)
(8, a, 9, a, 1)
(9, #, y, #, 1)
(9, a, 10, a, 1)
(10, #, n, #, 1)
(10, a, 11, a, 1)
(11, #, y, #, 1)
(11, a, 12, a, 1)
(12, #, n, #, 1)
(12, a, 13, a, 1)

New instructions (8, #, y, #, 1), (9, #, y, #, 1), and (11, #, y, #, 1) help Ǫ (11010 x) compute that the empty string, a and aaa are in its language, respectively. Similarly, the new instructions (10, #, n, #, 1) and (12, #, n, #, 1) help Ǫ (11010 x) compute that aa and aaaa are not in its language, respectively.

The zeroeth, first, and third 1 in Ǫ (11010 x)'s name indicate that the empty string, a and aaa are in Ǫ (11010 x)'s language. The second and fourth 0 indicate strings aa and aaaa are not in its language. The symbol x indicates that all strings $a^n$ with n≥5 have not yet been determined whether they are in Ǫ (11010 x)'s language or not in its language.

Starting at state 0, ex-machine Ǫ (11010 x) computes that the empty string is in Ǫ (11010 x)'s language.

| STATE | MEMORY | MEMORY ADDRESS | INSTRUCTION |
|---|---|---|---|
| 8 | ## ### | 1 | (0, #, 8, #, 1) |
| y | ### ## | 2 | (8, #, y, #, 1) |
| h | ### Y# | 2 | (y, #, h, Y, 0) |

Starting at state 0, ex-machine Ǫ (11010 x) computes that string a is in Ǫ (11010 x)'s language.

| STATE | MEMORY | MEMORY ADDRESS | INSTRUCTION |
|---|---|---|---|
| 8 | ## a### | 1 | (0, #, 8, #, 1) |
| 9 | ##a ### | 2 | (8, a, 9, a, 1) |
| y | ##a# ## | 3 | (9, #, y, #, 1) |
| h | ##a# Y# | 3 | (y, #, h, Y, 0) |

Starting at state 0, Ǫ (11010 x) computes that string aa is not in Ǫ (11010 x)'s language.

| STATE | MEMORY | MEMORY ADDRESS | INSTRUCTION |
|---|---|---|---|
| 8 | ## aa### | 1 | (0, #, 8, #, 1) |
| 9 | ##a a### | 2 | (8, a, 9, a, 1) |
| 10 | ##aa ### | 3 | (9, a, 10, a, 1) |
| n | ##aa# ## | 4 | (10, #, n, #, 1) |
| h | ##aa# N# | 4 | (n, #, h, N, 0) |

Starting at state 0, Ǫ (11010 x) computes that aaa is in Ǫ (11010 x)'s language.

| STATE | MEMORY | MEMORY ADDRESS | INSTRUCTION |
|---|---|---|---|
| 8 | ## aaa### | 1 | (0, #, 8, #, 1) |
| 9 | ##a aa### | 2 | (8, a, 9, a, 1) |
| 10 | ##aa a### | 3 | (9, a, 10, a, 1) |
| 11 | ##aaa ### | 4 | (10, a, 11, a, 1) |
| y | ##aaa# ## | 5 | (11, #, y, #, 1) |
| h | ##aaa# Y# | 5 | (y, #, h, Y, 0) |

Starting at state 0, Ω (11010 x) computes that aaaa is not in Ω (11010 x)'s language.

| STATE | MEMORY | MEMORY ADDRESS | INSTRUCTION |
|---|---|---|---|
| 8 | ## aaaa#### | 1 | (0, #, 8, #, 1) |
| 9 | ##a aaa#### | 2 | (8, a, 9, a, 1) |
| 10 | ##aa aa#### | 3 | (9, a, 10, a, 1) |
| 11 | ##aaa a#### | 4 | (10, a, 11, a, 1) |
| 12 | ##aaaa #### | 5 | (11, a, 12, a, 1) |
| n | ##aaaa# ### | 6 | (12, #, n, #, 1) |
| h | ##aaaa# N## | 6 | (n, #, h, N, 0) |

Note that for each of these executions, no new states were added and no instructions were added or replaced. Thus, for all subsequent executions, ex-machine Ω (11010 x) computes that the empty string, a and aaa are in its language. Similarly, strings aa and aaaa are not in Ω (11010 x)'s language for all subsequent executions of Ω (11010 x).

Starting at state 0, we examine an execution of ex-machine Ω (11010 x) on input memory # #aaaaaaa# #.

| STATE | MEMORY | ADDRESS | INSTRUCTION | NEW INSTRUCTION |
|---|---|---|---|---|
| 8 | ## aaaaaaa#### | 1 | (0, #, 8, #, 1) | |
| 9 | ##a aaaaaa#### | 2 | (8, a, 9, a, 1) | |
| 10 | ##aa aaaaa#### | 3 | (9, a, 10, a, 1) | |
| 11 | ##aaa aaaa#### | 4 | (10, a, 11, a, 1) | |
| 12 | ##aaaa aaa#### | 5 | (11, a, 12, a, 1) | |
| 13 | ##aaaaa aa#### | 6 | (12, a, 13, a, 1) | |
| x | ##aaaaa aa#### | 6 | (13, a, x, a, 0) | |
| t | ##aaaaa 0a#### | 6 | (x, a, t, 0_qr, 0) | |
| w | ##aaaaa aa#### | 6 | (t, 0, w, a, 0, ($|Q|$ − 1, #, n, #, 1)) | (13, #, n, #, 1) |
| 14 | ##aaaaaa a#### | 7 | (w, a, $|Q|$, a, 1, ($|Q|$ − 1, a, $|Q|$, a, 1)) | (13, a, 14, a, 1) |
| x | ##aaaaaa a#### | 7 | (14, a, x, a, 0) | (14, a, x, a, 0) |
| t | ##aaaaaa 1#### | 7 | (x, a, t, 1_qr, 0) | |
| w | ##aaaaaa a#### | 7 | (t, 1, w, a, 0, ($|Q|$ − 1, #, y, #, 1)) | (14, #, y, #, 1) |
| 15 | ##aaaaaaa #### | 8 | (w, a, $|Q|$, a, 1, ($|Q|$ − 1, a, $|Q|$, a, 1)) | (14, a, 15, a, 1) |
| x | ##aaaaaaa ### | 8 | (15, #, x, #, 0) | (15, #, x, #, 0) |
| x | ##aaaaaaa 1## | 8 | (x, #, x, 1_qr, 0) | |
| w | ##aaaaaaa ### | 8 | (x, 1, w, #, 0, ($|Q|$ − 1, #, y, #, 1)) | (15, #, y, #, 1) |
| y | ##aaaaaaa# ## | 9 | (w, #, y, #, 1, ($|Q|$ − 1, a, $|Q|$, a, 1)) | (15, a, 16, a, 1) |
| h | ##aaaaaaa# Y# | 9 | (y, #, h, Y, 0) | |

Overall, during this execution ex-machine Ω (11010 x) evolved to ex-machine Ω (11010 011 x). Three quantum random instructions were executed. The first quantum random instruction (x, a, t, 0) measured a 0 so it is shown above as (x, a, t, 0_qr, 0). The result of this 0 bit measurement adds the instruction (13, #, n, #, 1), so that in all subsequent executions of ex-machine Ω (11010 011 x), string $a^5$ is not in Ω (11010 011 x)'s language. Similarly, the second quantum random instruction (x, a, t, 0) measured a 1 so it is shown above as (x, a, t, 1_qr, 0). The result of this 1 bit measurement adds the instruction (14, #, y, #, 1), so that in all subsequent executions, string $a^6$ is in Ω (11010 011 x)'s language. Finally, the third quantum random instruction (x, #, x, 0) measured a 1 so it is shown above as (x, #, z, 1_qr, 0). The result of this 1 bit measurement adds the instruction (15, #, y, #, 1), so that in all subsequent executions, string $a^7$ is in Ω (11010 011 x)'s language.

Lastly, starting at state 0, we examine a distinct execution of ex-machine Ω (11010 x) on input memory # #aaaaaaa##. A distinct execution of Ω (11010 x) evolves to ex-machine Ω (11010 000 x).

| STATE | MEMORY | ADDRESS | INSTRUCTION | NEW INSTRUCTION |
|---|---|---|---|---|
| 8 | ## aaaaaaa#### | 1 | (0, #, 8, #, 1) | |
| 9 | ##a aaaaaa#### | 2 | (8, a, 9, a, 1) | |
| 10 | ##aa aaaaa#### | 3 | (9, a, 10, a, 1) | |
| 11 | ##aaa aaaa#### | 4 | (10, a, 11, a, 1) | |
| 12 | ##aaaa aaa#### | 5 | (11, a, 12, a, 1) | |
| 13 | ##aaaaa aa#### | 6 | (12, a, 13, a, 1) | |
| x | ##aaaaa aa#### | 6 | (13, a, x, a, 0) | |
| t | ##aaaaa 0a#### | 6 | (x, a, t, 0_qr, 0) | |
| w | ##aaaaa aa#### | 6 | (t, 0, w, a, 0, ($|Q|$ − 1, #, n, #, 1)) | (13, #, n, #, 1) |
| 14 | ##aaaaaa a#### | 7 | (w, a, $|Q|$, a, 1, ($|Q|$ − 1, a, $|Q|$, a, 1)) | (13, a, 14, a, 1) |
| x | ##aaaaaa a#### | 7 | (14, a, x, a, 0) | (14, a, x, a, 0) |
| t | ##aaaaaa 0#### | 7 | (x, a, t, 0_qr, 0) | |
| w | ##aaaaaa a#### | 7 | (t, 0, w, a, 0, ($|Q|$ − 1, #, n, #, 1)) | (14, #, n, #, 1) |
| 15 | ##aaaaaaa ### | 8 | (w, a, $|Q|$, a, 1, ($|Q|$ − 1, a, $|Q|$, a, 1)) | (14, a, 15, a, 1) |

-continued

| STATE | MEMORY | ADDRESS | INSTRUCTION | NEW INSTRUCTION |
|---|---|---|---|---|
| x | ##aaaaaaa ### | 8 | (15, #, x, #, 0) | (15, #, x, #, 0) |
| x | ##aaaaaaa 0## | 8 | (x, #, x, 0_qr, 0) | |
| v | ##aaaaaaa ### | 8 | (x, 0, v, #, 0, ($\lvert Q \rvert - 1$, #, n, #, 1)) | (15, #, n, #, 1) |
| n | ##aaaaaaa# ## | 9 | (v, #, n, #, 1, ($\lvert Q \rvert - 1$, a, $\lvert Q \rvert$, a, 1)) | (15, a, 16, a, 1) |
| h | ##aaaaaaa# N# | 9 | (n, #, h, N, 0) | |

Based on our previous examination of ex-machine $\mathfrak{Q}$ (x) evolving to $\mathfrak{Q}$ (11010 x) and then subsequently $\mathfrak{Q}$ (11010 x) evolving to $\mathfrak{Q}$ (11010 011 x), ex-machine 3 specifies $\mathfrak{Q}$ ($a_0 a_1 \ldots a_m$ x) in terms of initial machine states and initial machine instructions.

Machine Specification 3. [1152] $\mathfrak{Q}$ ($a_0 a_1 \ldots a_m$ x)

Let $m \in \mathfrak{A}$. Set $Q = \{0, h, n, y, t, v, w, x, 8, 9, 10, \ldots m+8, m+9\}$. For $0 \le i \le m$, each $a_i$ is 0 or 1. ex-machine $\mathfrak{A}$ ($a_0 a_1 \ldots a_m$ x)'s instructions are shown below. Symbol $b_8 = y$ if $a_0 = 1$. Otherwise, symbol $b_8 = n$ if $a_0 = 0$. Similarly, symbol $b_9 = y$ if $a_1 = 1$. Otherwise, symbol $b_9 = n$ if $a_1 = 0$. And so on until reaching the second to the last instruction (m+8, #, $b_{m+8}$, #, 1), symbol $b_{m+8} = y$ if $a_m = 1$. Otherwise, symbol $b_{m+8} = n$ if $a_m = 0$.

(0, #, 8, #, 1)
(y, #, h, Y, 0)
(n, #, h, N, 0)
(x, #, x, 0)
(x, a, t, 0)
(x, 0, v, #, 0, ($\lvert Q \rvert - 1$, #, n, #, 1))
(x, 1, w, #, 0, ($\lvert Q \rvert - 1$, #, y, #, 1))
(t, 0, w, a, 0, ($\lvert Q \rvert - 1$, #, n, #, 1))
(t, 1, w, a, 0, ($\lvert Q \rvert - 1$, #, y, #, 1))
(v, #, n, #, 1, ($\lvert Q \rvert - 1$, a, $\lvert Q \rvert$, a, 1))
(w, #, y, #, 1, ($\lvert Q \rvert - 1$, a, $\lvert Q \rvert$, a, 1))
(w, a, $\lvert Q \rvert$, a, 1, ($\lvert Q \rvert - 1$, a, $\lvert Q \rvert$, a, 1))
($\lvert Q \rvert - 1$, a, x, a, 0)
($\lvert Q \rvert - 1$, #, x, #, 0)
(8, #, b, #, 1)
(8, a, 9, a, 1)
(9, #, $b_9$, #, 1)
(9, a, 10, a, 1)
(10, #, $b_{10}$, #, 1)
(10, a, 11, a, 1)
...
(i+8, #, $b_{i+8}$, #, 1)
(i+8, a, i+9, a, 1)
...
(m+7, #, $b_{m+7}$, #, 1)
(m+7, a, m+8, a, 1)
(m+8, #, $b_{m+8}$, #, 1)
(m+8, a, m+9, a, 1)

Machine Computation Property 7.1.

Whenever i satisfies $0 \le i \le m$, string $a^i$ is in $\mathfrak{Q}$ ($a_0 a_1 \ldots a_m$ x)'s language if $a_i = 1$; string $a^i$ is not in $\mathfrak{Q}$ ($a_0 a_1 \ldots a_m$ x)'s language if $a_i = 0$. Whenever n>m, it has not yet been determined whether string $a^n$ is in $\mathfrak{Q}$ ($a_0 a_1 \ldots a_m$ x)'s language or not in its language.

Proof. When $0 \le i \le m$, the first consequence follows immediately from the definition of $a^i$ being in $\mathfrak{Q}$ ($a_0 a_1 \ldots a_m$ x)'s language and from ex-machine 3. In instruction (i+8, #, $b_{i+8}$, #, 1) the state value of $b_{i+8}$ is y if $a_i = 1$ and $b_{i+8}$ is n if $a_i = 0$.

For the indeterminacy of strings $a^n$ when n>m, ex-machine $\mathfrak{Q}$ ($a_0 \ldots a_m$ x) executes its last instruction (m+8, a, m+9, a, 1) when it is scanning the mth a in $a^n$. Subsequently, for each a on the memory to the right (higher memory addresses) of #$a^m$, ex-machine $\mathfrak{Q}$ ($a_0 \ldots a_m$ x) executes the quantum random instruction (x, a, t, 0).

If the execution of (x, a, t, 0) measures a 0, the two meta instructions (t, 0, w, a, 0, ($\lvert Q \rvert - 1$, #, n, #, 1)) and (w, a, $\lvert Q \rvert$, a, 1, ($\lvert Q \rvert - 1$, a, $\lvert Q \rvert$, a, 1)) are executed. If the next alphabet symbol to the right is an a, then a new standard instruction is executed that is instantiated from the simple meta instruction ($\lvert Q \rvert - 1$, a, x, a, 0). If the memory address was pointing to the last a in $a^n$, then a new standard instruction is executed that is instantiated from the simple meta instruction ($\lvert Q \rvert - 1$, #, x, #, 0).

If the execution of (x, a, t, 0) measures a 1, the two meta instructions (t, 1, w, a, 0, ($\lvert Q \rvert - 1$, #, y, #, 1)) and (w, a, $\lvert Q \rvert$, a, 1, ($\lvert Q \rvert - 1$, a, $\lvert Q \rvert$, a, 1)) are executed. If the next alphabet symbol to the right is an a, then a new standard instruction is executed that is instantiated from the simple meta instruction ($\lvert Q \rvert - 1$, a, x, a, 0). If the memory address was pointing to the last a in $a^n$, then a new standard instruction is executed that is instantiated from the simple meta instruction ($\lvert Q \rvert - 1$, #, x, #, 0).

In this way, for each a on the memory to the right (higher memory addresses) of #$a^m$, the execution of the quantum random instruction (x, a, t, 0) determines whether each string $a^{m+k}$, satisfying $1 \le k \le n - m$, is in or not in $\mathfrak{Q}$ ($a_0 a_1 \ldots a_n$ x)'s language.

After the execution of ($\lvert Q \rvert - 1$, #, x, #, 0), the memory address is pointing to a blank symbol, so the quantum random instruction (x, #, x, 0) is executed. If a 0 is measured by the quantum random source, the meta instructions (x, 0, v, #, 0, ($\lvert Q \rvert - 1$, #, n, #, 1)) and (v, #, n, #, 1, ($\lvert Q \rvert - 1$, a, $\lvert Q \rvert$, a, 1)) are executed. Then the last instruction executed is (n, #, h, N, 0) which indicates that $a^n$ is not in $\mathfrak{Q}$ ($a_0 a_1 \ldots a_n$ x)'s language.

If the execution of (x, #, x, 0) measures a 1, the meta instructions (x, 1, w, #, 0, ($\lvert Q \rvert - 1$, #, y, #, 1)) and (w, #, y, #, 1, ($\lvert Q \rvert - 1$, a, $\lvert Q \rvert$, a, 1)) are executed. Then the last instruction executed is (y, #, h, Y, 0) which indicates that $a^n$ is in $\mathfrak{Q}$ ($a_0 a_1 \ldots a_n$ x)'s language.

During the execution of the instructions, for each a on the memory to the right (higher memory addresses) of #$a^m$, ex-machine $\mathfrak{Q}$ ($a_0 a_1 \ldots a_m$ x) evolves to $\mathfrak{Q}$ ($a_0 a_1 \ldots a_n$ x) according to the specification in ex-machine 3, where one substitutes n for m. □

Remark 7.3. When the binary string $a_0 a_1 \ldots a_m$ is presented as input, the ex-machine instructions for $\mathfrak{Q}$ ($a_0 a_1 \ldots a_m$ x), specified in ex-machine 3, are constructible (i.e., can be printed) with a standard machine.

In contrast with lemma 7.1, $\mathfrak{Q}$ ($a_0 a_1 \ldots a_m$ x)'s instructions are not executable with a standard machine when the input memory # #$a^i$# satisfies i>m because meta and quantum random instructions are required. Thus, remark 7.3 distinguishes the construction of $\mathfrak{Q}$ ($a_0 a_x \ldots a_m$ x)'s instructions from the execution of $\mathfrak{Q}$ ($a_0 a_1 \ldots a_m$ x)'s instructions. Proof. When given a finite list ($a_0 a_1 \ldots a_m$), where each $a_i$ is 0 or 1, the code listing below constructs $\mathfrak{Q}$ ($a_0 a_1 \ldots a_m$ x)'s instructions. Starting with comment ;; Qx_builder.lsp, the code listing is expressed in a dialect of LISP, called newLISP. (See www.newlisp.org). LISP was designed, based on the lambda calculus, developed by Alonzo Church. The appendix of [33] outlines a proof that the lambda calculus is computationally equivalent to digital computer instructions (i.e., standard machine instructions). The 3 instructions below print the ex-machine instructions for $\mathfrak{Q}$ (11010 x), listed in machine instructions 1.

```
(set 'a0_a1_dots_am (list 1 1 0 1 0) )
(set 'Qx_machine (build_Qx_machine a0_a1_dots_am) )
(print_xmachine Qx_machine)
;; Qx_builder.lsp
(define (make_qr_instruction q_in a_in q_out move)
    (list (string q_in) (string a_in) (string q_out) (string move) ) )
;; Move is -1, 0 or 1
(define (make_instruction q_in a_in q_out a_out move)
    (list (string q_in) (string a_in)
              (string q_out) (string a_out) (string move) ) )
(define (make_meta_instruction q_in a_in q_out a_out move_standard
                                       r_in b_in r_out b_out move_meta)
        (list (string q_in) (string a_in)
                  (string q_out) (string a_out) (string move_standard)
                  (make_instruction r_in b_in r_out b_out move_meta) ) )
(define (initial_Qx_machine)
    (list
        (make_instruction "0" "#" "8" "#" 1)
        (make_instruction "8" "#" "x" "#" 0)
        ;; This means string aˆi is in the language.
        (make_instruction "y" "#" "h" "Y" 0)
        ;; This means string aˆi is NOT in the language.
        (make_instruction "n" "#" "h" "N" 0)
        (make_qr_instruction "x" "#" "x" 0)
        (make_qr_instruction "x" "a" "t" 0)
        (make_meta_instruction "x" "0" "v" "#" 0 "|Q|-1" "#" "n" "#" 1)
        (make_meta_instruction "x" "1" "w" "#" 0 "|Q|-1" "#" "y" "#" 1)
        (make_meta_instruction "t" "0" "w" "a" 0 "|Q|-1" "#" "n" "#" 1)
        (make_meta_instruction "t" "1" "w" "a" 0 "|Q|-1" "#" "y" "#" 1)
        (make_meta_instruction "v" "#" "n" "#" 1 "|Q|-1" "a" "|Q|" "a" 1)
        (make_meta_instruction "w" "#" "y" "#" 1 "|Q|-1" "a" "|Q|" "a" 1)
        (make_meta_instruction "w" "a" "|Q|" "a" 1 "|Q|-1" "a" "|Q|" "a" 1)
        (make_instruction "|Q|-1" "a" "x" "a" 0)
        (make_instruction "|Q|-1" "#" "x" "#" 0)
) )
(define (add_instruction instruction q_list)
    (append q_list (list instruction) ) )
(define (check_a0_a1_dots_am a0_a1_dots_am)
    (if (list? a0_a1_dots_am)
            (dolist (a_i a0_a1_dots_am)
                    (if (member a_i (list 0 1) )
                            true
                            (begin
                                (println "ERROR! (build_Qx_machine a0_a1_dots_am). a_1 = " a_i)
                                (exit)
                            )
                    )
                    a0_a1_dots_am )
            nil
) )
;;;;;;;;;;;;;;; BUILD MACHINE Q(a0 a1 . . . am x)
;; a0_a1_dots_am has to be a list of 0's and 1's or '( )
(define (build_Qx_machine a0_a1_dots_am)
    (let
        ( (Qx_machine (initial_Qx_machine) )
            (|Q| 8)
            (b_|Q| nil)
            (ins1 nil)
            (ins2 nil)
        )
        (set 'check (check_a0_a1_dots_am a0_a1_dots_am) )
        ;; if nil OR check is an empty list, remove instruction (8, #, x, #, 0)
        (if (or (not check) (empty? check) )
                true
                (set 'Qx_machine (append (list (Qx_machine 0) ) (rest Qx_machine) ) ) )
        )
        (if (list? a0_a1_dots_am)
                (dolist (a_i a0_a1_dots_am)
                    (if (= a_i 1)
                            (set 'b_|Q| "y")
                            (set 'b_|Q| "n") )
                    (set 'ins1 (make_instruction |Q| "#" b_|Q| "#" 1) )
                    (set 'Qx_machine (add_instruction ins1 Qx_machine) )
                    (set 'ins2 (make_instruction |Q| "a" (+ |Q| 1) "a" 1) )
                    (set 'Qx_machine (add_instruction ins2 Qx_machine) )
                    (set '|Q| (+ |Q| 1) )
                )
        )
        Qx_machine
) )
```

-continued

```
(define (print_elements instruction)
   (let
         ( (idx_ub (min 4 (- (length instruction) 1) ) ) (i 0) )
         (for (i 0 idx_ub)
              (print (instruction i) )
              (if (< i idx_ub) (print ", ") )
         )
)  )
(define (print_instruction instruction)
   (print "(")
   (if (<= (length instruction) 5)
              (print_elements instruction)
              (begin
                         (print_elements instruction)
                         (print ", (")
                         (print_elements (instruction 5) )
                         (print ") ") ) )
   (println ")") )
(define (print_xmachine x_machine)
   (println)
   (dolist (instruction x_machine)
              (print_instruction instruction) )
   (println)
)
```

□
Machine Specification 7.3. [1099] Define $\mathfrak{U}$ as the union of $\mathfrak{Q}$ (x) and all ex-machines $\mathfrak{Q}$ ($a_0 \ldots a_m$ x) for each m∈ $\mathfrak{A}$ and for each $a_0 \ldots a_m$ in $\{0, 1\}^{m+1}$. In other words, $$\mathfrak{U} = \{\mathfrak{Q}(x)\} \cup \bigcup_{m=0}^{\infty} \bigcup_{a_0 \ldots a_m \in \{0,1\}^{m+1}} \{\mathfrak{Q}(a_0 a_1 \ldots a_m x)\}.$$

Theorem 7.2. [1100]
Each language $L_f$ in $\mathfrak{L}$ can be computed by the evolving sequence of ex-machines $\mathfrak{Q}$ (x), $\mathfrak{Q}$ ($f(0)$ x), $\mathfrak{Q}$ ($f(0)$ $f(1)$ x), ..., $\mathfrak{Q}$ ($f(0)f(1) \ldots f(n)$ x), ....
Proof. The theorem follows from ex-machine 2, ex-machine 3 and lemma 7.1. □
Machine Computation Property 7.3. [1101]
Given function $f: \mathfrak{A} \to \{0, 1\}$, for any arbitrarily large n, the evolving sequence of ex-machines $\mathfrak{Q}$ ($f(0)f(1) \ldots f(n)$ x), $\mathfrak{Q}$ ($f(0)f(1) \ldots f(n)f(n+1)$ x), .... computes language $L_f$.
Machine Computation Property 7.4. [1102]
Moreover, for each n, all ex-machines $\mathfrak{Q}$ (x), $\mathfrak{Q}$ ($f(0)$x), $\mathfrak{Q}$ ($f(0)$ $f(1)$ x), ..., $\mathfrak{Q}$ ($f(0)f(1) \ldots f(n)$ x) combined have used only a finite amount of memory, finite number of states, finite number of instructions, finite number of executions of instructions and only a finite amount of quantum random information measured by the quantum random instructions.
Proof. For each n, the finite use of computational resources follows immediately from remark 2, specification 7 and the specification of ex-machine 3. □
A set X is called countable if there exists a bijection between X and $\mathfrak{A}$. Since the set of all Turing machines is countable and each Turing machine only recognizes a single language most (in the sense of Cantor's heirarchy of infinities) languages $L_f$ are not computable with a Turing machine. More precisely, the cardinality of the set of languages $L_f$ computable with a Turing machine is $\aleph_0$. while the cardinality of the set of all languages $\mathfrak{L}$ is $\aleph_1$.
For each non-negative integer n, define the language tree $\mathcal{L}$ ($a_0 a_1 \ldots a_n$)=$\{L_f : f \in \{0, 1\}^\mathbb{N}$ and $f(i) = a_i$ for i satisfying $0 \leq i \leq n\}$. Define the corresponding subset of $\{0, 1\}^\mathbb{K}$ as $S(a_0 a_1 \ldots a_n) = \{f \in \{0, 1\}^\mathbb{K} : f(i) = a_i$ for i satisfying $0 \leq i \leq n\}$.
Let $\Psi$ denote this 1-to-1 correspondence, where $$\mathfrak{L} \overset{\Psi}{\leftrightarrow} \{0, 1\}^\mathbb{N} \text{ and } \mathcal{L}(a_0 a_1 \ldots a_n) \overset{\Psi}{\leftrightarrow} S(a_0 a_1 \ldots a_n).$$

Since random measurement property 1 and random measurement property 2 are both satisfied, each finite path $f(0)f(1) \ldots f(n)$ is equally likely and there are $2^{n+1}$ of these paths. Thus, each path of length n+1 has probability $2^{-(n+1)}$. These uniform probabilities on finite strings of the same length can be extended to the Lebesgue measure p on probability space $\{0, 1\}^\mathbb{N}$. Hence, each subset $S(a_0 a_1 \ldots a_n)$ has measure $2^{-(n+1)}$. That is, $\mu(S(a_0 a_1 \ldots a_n)) = 2^{-(n+1)}$ and $\mu(\{0, 1\}^\mathbb{N}) = 1$. Via the $\Psi$ correspondence between each language tree $\mathcal{L}$ ($a_0 a_1 \ldots a_n$) and subset $S(a_0 a_1 \ldots a_n)$, uniform probability measure $\mu$ induces a uniform probability measure $\nu$ on $\mathfrak{L}$, where $\nu(\mathcal{L} a_0 a_1 \ldots a_n)) = 2^{-(n+1)}$ and $\nu(\mathfrak{L}) = 1$.
Theorem 7.5. [1106] For functions $f: \mathfrak{A} \to \{0, 1\}$, the probability that language $L_f$ is Turing incomputable has measure 1 in $(\nu, \mathfrak{L})$.
Proof. The Turing machines are countable and therefore the number of functions $f: \mathfrak{A} \to \{0, 1\}$ that are Turing computable is countable. Hence, via the $\Psi$ correspondence, the Turing computable languages $L_f$ have measure 0 in $\mathfrak{L}$.
Moreover, the Martin-Löf random sequences $f: \mathfrak{A} \to \{0, 1\}$ have Lebesgue measure 1 in $\{0, 1\}^\mathfrak{A}$ and are a proper subset of the Turing incomputable sequences. □
Machine Computation Property 7.6. [1107] $\mathfrak{Q}$ (x) is not a Turing machine. Each ex-machine $\mathfrak{Q}$ ($a_0 a_1 \ldots a_m$ x) in $\mathfrak{u}$ is not a Turing machine.
Proof. $\mathfrak{Q}$ (x) can evolve to compute Turing incomputable languages on a set of probability measure 1 with respect to $(\nu, \mathfrak{Q})$. Also, $\mathfrak{Q}$ ($a_0 a_1 \ldots a_m$ x) can evolve to compute Turing incomputable languages on a set of measure $2^{-(m+1)}$ with respect to $(\nu, \mathfrak{L})$. In contrast, each Turing machine only recognizes a single language, which has measure 0. In fact, the measure of all Turing computable languages is 0 in $\mathfrak{L}$.
□

These corollaries are remarkable because the language that an ex-machine can compute reflects it computing capabilities. This means practical applications that were not possible with digital computer programs are feasible with an ex-machine.

8 THE EX-MACHINE HALTING PROBLEM

In [24], Alan Turing posed the halting problem for Turing machines. Does there exist a Turing machine $\mathcal{D}$ that can determine for any given Turing machine M and finite initial tape T whether $\mathcal{M}$'s execution on tape T eventually halts? In the same paper [24], Turing proved that no single Turing machine could solve his halting problem.

Next, we explain what Turing's seminal result relies upon in terms of abstract computational resources. Turing's result means that there does not exist a single Turing machine $\mathcal{H}$ —regardless of the size of $\mathcal{H}$'s finite state set Q and finite alphabet set A—so that when this special machine $\mathcal{H}$ is presented with any Turing machine $\mathcal{M}$ with a finite tape T and initial state $q_0$, then $\mathcal{H}$ can execute a finite number of computational steps, halt and correctly determine whether $\mathcal{M}$ halts or does not halt with a tape T and initial state $q_0$. In terms of definability, the statement of Turing's halting problem ranges over all possible Turing machines and all possible finite tapes. This means: for each tape T and machine M, there are finite initial conditions imposed on tape T and machine M. However, as tape T and machine $\mathcal{M}$ range over all possibilities, the computational resources required for tape T and machine $\mathcal{M}$ are unbounded. Thus, the computational resources required by $\mathcal{H}$ are unbounded as its input ranges over all finite tapes T and machines $\mathcal{M}$.

The previous paragraph provides some observations about Turing's halting problem because any philosophical objection to $\mathfrak{Q}(x)$'s unbounded computational resources during an evolution should also present a similar philosophical objection to Turing's assumptions in his statement and proof of his halting problem. Notice that corollary 7.4 supports this.

Since $\mathfrak{Q}(x)$ and every other x-machine $\mathfrak{Q}(a_0 a_1 \ldots a_m x)$ in $\mathfrak{u}$ is not a Turing machine, there is a natural extension of Turing's halting problem. Does there exist an x-machine $\mathfrak{G}(x)$ such that for any given Turing machine $\mathcal{M}$ and finite initial tape T, then $\mathfrak{G}(x)$ can sometimes compute whether $\mathcal{M}$'s execution on tape T will eventually halt? Before we call this the x-machine halting problem, the phrase can sometimes compute whether must be defined so that this problem is well-posed. A reasonable definition requires some work.

From the universal Turing machine/enumeration theorem [21], there exists a Turing computable enumeration $\mathcal{H}$: $\mathfrak{Q} \to$ {all Turing machines $\mathcal{M}$} × {Each of $\mathcal{M}$'s states as an initial state} of every Turing machine. Similar to x-machines, for each machine $\mathcal{M}$, the set {Each of $\mathcal{M}$'s states as an initial state} can be realized as a finite subset {0, . . . , n−1} of $\mathfrak{Q}$. Since $\mathcal{E}(n)$ is an ordered pair, the phrase "Turing machine $\mathcal{E}(n)$" refers to the first coordinate of $\mathcal{E}(n)$. Similarly, the "initial state $\mathcal{E}(n)$" refers to the second coordinate of E(n).

Recall that the Turing machine halting problem is equivalent to the blank-tape halting problem. (See pages 150-151 of [15]). For our discussion, the blank-tape halting problem translates to: for each Turing machine E(n), does Turing machine E(n) halt when E(n) begins its execution with a blank initial tape and initial state E(n)?

Lemma 7.1 Implies that the same initial x-machine can evolve to two different x-machines; furthermore, these two x-machines will never compute the same language no matter what descendants they evolve to. For example, $\mathfrak{Q}(0\ x)$ and $\mathfrak{Q}(1\ x)$ can never compute the same language in $\mathfrak{L}$. Hence, sometimes means that for each n, there exists an evolution of $\mathfrak{G}(x)$ to $\mathfrak{G}(a_0 x)$, and then to $\mathfrak{G}(a_0 a_1 x)$ and so on up to $\mathfrak{G}(a_0 a_1 \ldots a_n x) \ldots$, where for each i with $0 \le i \le n$, then $\mathfrak{G}(a_0 a_1 \ldots a_i x)$ correctly computes whether Turing machine $\mathcal{E}(n)$—executing on an initial blank tape with initial state $\mathcal{E}(n)$—halts or does not halt.

In the prior sentence, the word computes means that $\mathfrak{G}(a_0 a_1 \ldots a_i x)$ halts after a finite number of instructions have been executed and the halting output written by $\mathfrak{G}(a_0 a_1 \ldots a_i x)$ on its tape indicates whether machine $\mathcal{E}(n)$ halts or does not halt. For example, if the input tape is # #$a^i$#, then enumeration machine $\mathcal{ME}$ writes the representation of $\mathcal{E}(i)$ on the tape, and then $\mathfrak{G}(a_0 a_1 \ldots a_m x)$ with $m \ge i$ halts with # Y # written to the right of the representation for machine $\mathcal{E}(i)$. Alternatively $\mathfrak{G}(a_0 a_1 \ldots a_m x)$ with $m \ge i$ halts with # N # written to the right of the representation for machine $\mathcal{E}(i)$. The word correctly means that x-machine $\mathfrak{G}(a_0 a_1 \ldots a_m x)$ halts with # Y # written on the tape if machine $\mathcal{E}(i)$ halts and x-machine $\mathfrak{G}(a_0 a_1 \ldots a_m x)$ halts with # N # written on the tape if machine $\mathcal{E}(i)$ does not halt.

Next, our goal is to transform the x-machine halting problem to a form so that the results from the previous section can be applied. Choose the alphabet as $\mathcal{A} = \{\#, 0, 1, a, A, B, M, N, S, x, Y\}$. As before, for each Turing machine, it is helpful to identify the set of machine states Q as a finite subset of $\mathfrak{A}$. Let $M_*$ be the Turing machine that computes a Turing computable enumeration as $\mathcal{E}_a : \mathfrak{A} \to \{\mathcal{A}\}^* \times \mathfrak{A}$, where the tape # #$a^n$# represents natural number n. Each $\mathcal{E}_a(n)$ is an ordered pair where the first coordinate is the Turing machine and the second coordinate is an initial state chosen from one of $\mathcal{E}_a(n)$'s states. (Chapter 7 of [15] provides explicit details of encoding quintuples with a particular universal Turing machine. Alphabet $\mathcal{A}$ was selected so that it is compatible with this encoding. A careful study of chapter 7 provides a clear path of how $\mathcal{M}_*$'s instructions can be specified to implement $\mathcal{E}_a$.)

Remark 8.1. For each $n \in \mathfrak{A}$ with blank initial tape and initial state $\mathcal{E}(n)$, then Turing machine $\mathcal{E}_a(n)$ either halts or does not halt.

Proof. The execution behavior of Turing machine computation is unambiguous. For each n, there are only two possibilities. □

For our particular instance of $\mathcal{E}_a$, define the halting function $h_{\mathcal{E}_a} : \mathfrak{A} \to \{0, 1\}$ as follows. For each n, set $h_{\mathcal{E}_a}(n) = 1$, whenever Turing machine $\mathcal{E}_a(n)$ with blank initial tape and initial state $\mathcal{E}_a(n)$ halts. Otherwise, set $h_{\mathcal{E}_a}(n) = 0$, if Turing machine $\mathcal{E}_a(n)$ with blank initial tape and initial state $\mathcal{E}_a(n)$ does not halt. Remark 8.1 implies that function $h_{\mathcal{E}_a}(n)$ is well-defined. Via the halting function $h_{\mathcal{E}_a}(n)$ and definition 7.1, define the halting language $L_{h_{\mathcal{E}_a}}$.

Theorem 8.1. The x-machine $\mathfrak{Q}(x)$ has an evolutionary path that computes halting language $L_{h_{\mathcal{E}_a}}$. This evolutionary path is $\mathfrak{Q}(h_{\mathcal{E}_a}(0)\ x) \to \mathfrak{Q}(h_{\mathcal{E}_a}(0)\ h_{\mathcal{E}_a}(1)\ x) \to \ldots \mathfrak{Q}(h_{\mathcal{E}_a}(0)\ h_{\mathcal{E}_a}(1) \ldots h_{\mathcal{E}_a}(m)\ x) \ldots$.

Proof. Theorem 8.1 follows from the previous discussion, including the definition of halting function $h_{\mathcal{E}_a}(n)$ and halting language $L_{h_{\mathcal{E}_a}}$ and theorem 7.2. □

8.1 Some Observations Based on Theorem 8.1

Theorem 8.1 provides an affirmative answer to the x-machine halting problem, but in practice, a particular execution of $\mathfrak{Q}(x)$ will not, from a probabilistic perspective, evolve to compute $LL_{h(\mathcal{E}_a)}$. For example, the probability is $2^{-128}$ that a particular execution of $\mathfrak{Q}(x)$ will evolve to $\mathfrak{Q}(a_0 a_1 \ldots \alpha_{127}\ x)$ so that $\mathfrak{Q}(a_0 a_1 \ldots a_{99}\ x)$ correctly computes whether each string $\lambda$, a, $a^2 \ldots a^{127}$ is a member of $\mathfrak{A}$ or not a member of $\mathfrak{Q}$.

Furthermore, theorem 8.1 provides no general method for infallibly testing (proving) that an evolution of $\mathfrak{Q}(x)$ to some new machine $\mathfrak{Q}(a_0 a_1 \ldots a_m x)$ satisfies $a_i = h_{\mathcal{E}_a}(i)$ for each $0 \leq i \leq m$. We also know that any such general testing method that works for all natural numbers m would need at least an ex-machine because any general testing method cannot be implemented with a standard machine. Otherwise, if such a testing method could be executed by a standard machine, then this testing machine could be used to solve Turing's halting problem; this is logically impossible due to Turing's proof of the unsolvability of the halting problem with a standard machine (digital computer). This unsolvability has practical ramifications for program correctness in software, and circuit verification in hardware.

Figure 3:
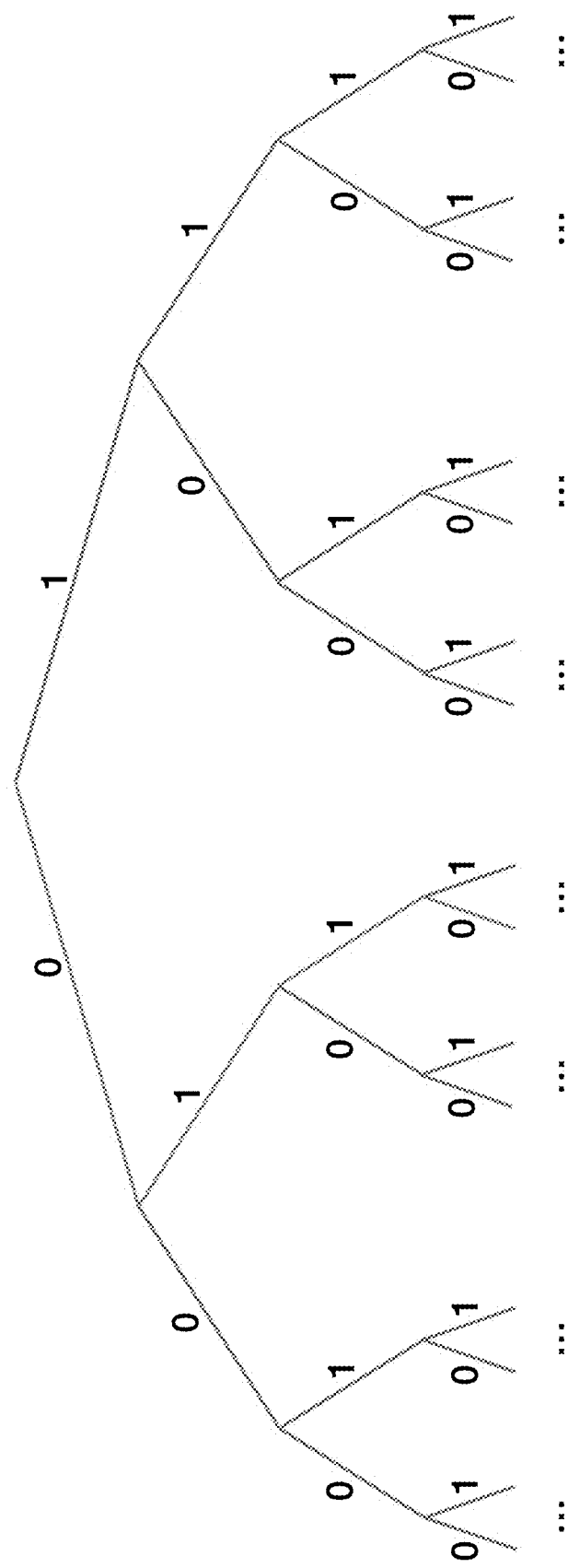
FIG. 3 shows a graphic representation of an infinite binary tree. This figure helps visualize why ex-machines, such as ฎ (x) and others, can compute languages that standard machines are unable to compute.
Figure 4:
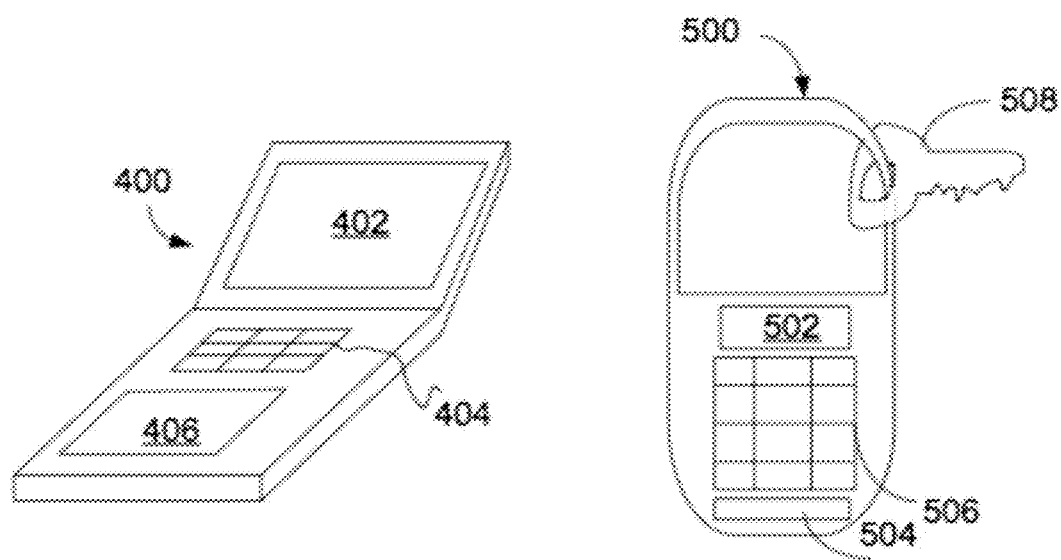
FIG. 4 shows a mobile smartphone embodiment 400 that computes wireless voice data and communicates wireless voice data, which may include the machine instructions of FIG. 1A. The mobile phone 500 is an embodiment that contains an ex-machine that intelligently sends secure commands and keys to control an automobile.

The existence of the path shows that it is logically possible for this evolution to happen, since $\mathfrak{Q}(x)$ can in principle evolve to compute any language $L_f$ in $\mathcal{L}$. In other words, every infinite, downward path in the infinite binary tree of FIG. 3 is possible and equally likely. This section also mathematically demonstrates the computational limitations of the prior art, which is a digital computer.

In a sense, theorem 8.1 has an analogous result in pure mathematics. The Brouwer fixed point theorem guarantees that a continuous map from an n-simplex to an n-simplex has at least one fixed point and demonstrates the power of algebraic topology. However, the early proofs were indirect and provided no contructive methods for finding the fixed point(s). The parallel here is that theorem 8.1 guarantees that an evolutionary path exists, but the proof provides no general method for infallibly testing that for an evolution up to stage m, then $\mathfrak{Q}(a_0 a_1 \ldots a_m x)$ satisfies $a_i = h_{\mathcal{E}_a}(i)$ for each $0 \leq i \leq m$. This is why the self-modification methods integrated with randomness are used.

9 THE $\phi$ CORRESPONDENCE

In the previous section, entitled "The Ex-Machine Halting Problem", the ex-machine is not limited by the halting problem due to its meta instructions and random instructions that use self-modification and randomness. This capability of the ex-machine has some extremely practical applications. In the prior art, program correctness of standard program is unsolvable by a standard machine or digital computer, as a consequence of Turing's halting problem. Program correctness is extremely important not only due to the problem of malware [28] infecting mission critical software. However, program correctness is also critical to any hardware/software system—regardless of whether it is infected with malware—that operates air traffic control, the electric grid, the Internet, GPS [16], an autonomous driving network, and so on.

This section shows how to convert any standard program to a geometric problem; then novel self-modification procedures and/or traditional machine learning methods, implemented with the ex-machine's self-modification capability, can be used to solve the geometric problem. For example, the detection of an infinite loop in a standard program is a special case of the halting problem, and the detection of infinite loops is a subset of program correctness.

With this in mind, the $\phi$ correspondence can translate any standard digital computer program—no matter how big—to a geometric problem in the complex plane $\mathbb{C}$. Consider standard machine M. A transformation $\phi$ is defined such that each standard instruction in M is mapped to an affine function in the complex plane $\mathbb{C}$. Let machine states $Q = \{q_1, \ldots, q_m\}$. Let alphabet $A = \{\alpha_1, \ldots, a_n\}$, where $a_1$ is the blank symbol #. Halt state h is not in Q. Function $\eta: Q \times A \to Q \cup \{h\} \times A \times \{-1, +1\}$ represents the standard machine instructions, where $\eta(q, a) = (r, b, x)$ corresponds to standard instruction (q, a, r, b, x). Set $B = |A| + |Q| + 1$. Define symbol value function $v: A \cup \{h\} \cup Q \to \mathfrak{A}$ as $v(a_1) = 0$, $v(a_2) = 1, \ldots, v(a_i) = i - 1$, $v(h) = |A|$, $v(q_1) = |A| + 1, \ldots, v(q_i) = |A| + i$.

$T_k$ is the memory value in the kth memory address. The machine configuration (q, k, T) lies in $Q \times \mathbb{Z} \times A^{\mathbb{Z}}$. Machine configuration (q, k, T) is mapped to the complex number $$\phi(q, k, T) = \sum_{j=-1}^{\infty} v(T_{k+j+1})|A|^{-j} + \left(Bv(q) + \sum_{j=0}^{\infty} v(T_{k-j-1})|A|^{-j}\right)i.$$

The real and imaginary parts of $\phi(q, k, T)$ are rational because the finitely bounded memory condition (i.e., finite memory) for standard machines implies that only a finite number of memory cells contain non-blank values.

Remark 9.1. If two machine configurations (q, l, T) and (r, k, S) are not equivalent, then $\phi(q, l, T) \neq \phi(r, k, S)$. That is, $\phi$ is one-to-one on the equivalence classes of machine configurations.

Proof. By translating our memory representation T via $R(j) = T(j+l-k)$, W.L.O.G. we may assume that $l = k$. Thus, we are comparing (q, k, T) and (r, k, S). Suppose $$\sum_{j=-1}^{\infty} v(T_{k+j+1})|A|^{-j} + \left(Bv(q) + \sum_{j=-1}^{\infty} v(T_{k-j-1})|A|^{-j}\right)i =$$

$$\sum_{j=-1}^{\infty} v(S_{k+j+1})|A|^{-j} + \left(Bv(r) + \sum_{j=-1}^{\infty} v(S_{k-j-1})|A|^{-j}\right)i.$$

Then the real parts must be equal. This implies for all $j \geq -1$ that $T_{k+j+1} = S_{k+j+1}$. Hence, $T_j = S_j$ for all $j \geq k$.

For the imaginary parts, $|Bv(q) - Bv(r)| \geq B$ whenever $q \neq r$. Also, $$0 \leq \sum_{j=0}^{\infty} v(T_{k-j-1})|A|^{-j} < \frac{|A|-1}{1-\frac{1}{|A|}} = |A|.$$

Similarly, $$0 \leq \sum_{j=0}^{\infty} v(S_{k-j-1})|A|^{-j} < |A|.$$

Hence, $$\left|\sum_{j=0}^{\infty} v(T_{k-j-1})|A|^{-j} - \sum_{j=0}^{\infty} v(S_{k-j-1})|A|^{-j}\right| < |A|.$$

Since $B > |A|$, this implies $q = r$ and $T_{k-j-1} = S_{k-j-1}$ for all $j \geq 0$. This means $T_j = S_j$ for all $j \leq k-1$. Thus, (q, k, T) = (r, k, S). □

This next part defines a one-to-one mapping $\phi$ from a standard digital computer program $\eta$ to a finite set of affine functions, whose domain is a bounded subset of $\mathbb{C}$. From FIG. 7A, one can derive equation 1 for the real part of the machine configuration 710 and equation 2 for the imaginary part of the machine configuration 710.

$$x = |A|v(T_k) + \sum_{j=0}^{\infty} v(T_{k+j+1})|A|^{-j} \quad (1)$$

$$y = Bv(q) + \sum_{j=0}^{\infty} v(T_{k-j-1})|A|^{-j} \quad (2)$$

Right Affine Map

Before executing instruction $(q, T_k, r, b, +1)$, the machine is in configuration 710 as shown in FIG. 7A. During this computational step (execution step), machine state q moves to state r. Memory value b replaces $T_k$ at memory address k, and the memory head moves to memory address k+1. The corresponding right affine function is of the form $f(x+y_i) = f_1(x) + f_2(y)\, i$, where $f_1(x) = |A|x + m$ and $$f_2(y) = \frac{1}{|A|}y + n.$$

FIG. 7B shows machine configuration 725 after instruction 720 $(q, T_k, r, b, +1)$ executes. Machine configuration 725 is used to compute the value of m in $f_1(x)$ and n in $f_2(x)$.

$$f_1(x) = |A|v(T_{k+1}) + \sum_{j=1}^{\infty} v(T_{k+j+1})|A|^{-j+1}$$

From equation 1, $$|A|x = |A|^2 v(T_k) + \sum_{j=0}^{\infty} v(T_{k+j+1})|A|^{-j+1}.$$

Hence, $$m = f_1(x) - |A|x =$$
$$|A|v(T_{k+1}) - |A|^2 v(T_k) + \sum_{j=1}^{\infty} v(T_{k+j+1})|A|^{-j+1} - \sum_{j=0}^{\infty} v(T_{k+j+1})|A|^{-j+1} =$$
$$|A|v(T_{k+1}) - |A|^2 v(T_k) - v(T_{k+1}).$$

Equation 3 defines the real part of the affine map for instruction $(q, T_k, r, b, +1)$.

$$f_1(x) = |A|x + (|A|-1)v(T_{k+1}) - |A|^2 v(T_k) \quad (3)$$

$$f_2(y) = Bv(r) + v(b) + \sum_{j=0}^{\infty} v(T_{k-j-1})|A|^{-j-1}.$$

From equation 2, $$\frac{1}{|A|}y = \frac{B}{|A|}v(q) + \sum_{j=0}^{\infty} v(T_{k-j-1})|A|^{-j-1}.$$

Hence $$n = f_2(y) - \frac{1}{|A|}y = Bv(r) + v(b) - \frac{B}{|A|}v(q).$$

Equation 4 defines the imaginary part of right affine map corresponding to instruction 720, where $(q, T_k, r, b, +1)$ is shown in FIG. 7B.

$$f_2(y) = \frac{1}{|A|}y + Bv(r) + v(b) - \frac{B}{|A|}v(q) \quad (4)$$

Left Affine Map

We compute the formula for <0 mapping instruction $(q, T_k, r, b, -1)$ to left affine function $g(x+y_1) = g_1(x) + g_2(y)\, i$, where $$g_1(x) = \frac{1}{|A|}x + m,$$

and $g_2(y) = |A|y + n$. FIG. 7C shows machine configuration 735 after instruction 730 $(q, T_k, r, b, -1)$ executes. Machine configuration 735 is used to compute m in $g_1(x)$ and n in $g_2(y)$.

First $$g_1(x) = |A|v(T_{k-1}) + v(b) + \sum_{j=1}^{\infty} v(T_{k+j})|A|^{-j}.$$

Before $(q, T_k, r, b, -1)$ executes, equation 1 holds. Also, $$\frac{1}{|A|}x = v(T_k) + \sum_{j=1}^{\infty} v(T_{k+j})|A|^{-j}.$$

Hence, $$m = g_1(x) - \frac{1}{|A|}x = |A|v(T_{k-1}) + v(b) - v(T_k).$$

$$g_1(x) = \frac{1}{|A|}x + |A|v(T_{k-1}) + v(b) - v(T_k) \quad (5)$$

For the imaginary part, $$g_2(y) = Bv(r) + \sum_{j=0}^{\infty} v(T_{k-j-2})|A|^{-j}.$$

Before instruction $(q, T_k, r, b, -1)$ executes, equation 2 holds. Multiplying by $$|A| \text{ yields } |A|y = |A|Bv(q) + |A|v(T_{k-1}) + \sum_{j=1}^{\infty} v(T_{k-j-1})|A|^{-j+1}.$$

Lastly, $$n = g_2(y) - |A|y =$$

$$Bv(r) + \sum_{j=0}^{\infty} v(T_{k-j-2}) \infty |A|^{-j} - |A|Bv(q) - |A|v(T_{k-1}) - \sum_{j=1}^{\infty} v(T_{k-j-1})|A|^{-j+1}.$$

Hence, $n = Bv(r) - |A|Bv(q) - |A|v(T_{k-1})$.

$$g_2(y) = |A|y + Bv(r) - |A|Bv(q) - |A|v(T_{k-1}) \quad (6)$$

Define halting attractor $\mathfrak{A}_h = \{x+yi \in \mathbb{C} : 0 \le x \le |A|^2 \}$ and $B|A| \le y \le (B+1)|A|\}$. The set of all points in $\mathbb{C}$ that correspond to halting configurations $(h, k, T)$ are called halting points. Remarks 9.2 and 9.3 establish that the halting points are a subset of $\mathfrak{A}_h$. Define the halting map $\mathfrak{h}_h : \mathfrak{A}_h \to \mathfrak{A}_h$ such that $\mathfrak{h}(x+yi) = x+yi$ on $\mathfrak{A}_h$. This means every point in the halting attractor is a fixed point.

Remark 9.2. Every halting point $x_h + y_h i$ in $\mathfrak{A}_h$ satisfies $B|A| \le y \le (B+1)|A|$.

PROOF. Let $x_h + y_h i$ be a halting point. Then $$y_h = Bv(h) + \sum_{j=0}^{\infty} v(T_{k-j-1})|A|^{-j} = B|A| + \sum_{j=0}^{\infty} v(T_{k-j-1})|A|^{-j}.$$

Thus, $y_h > B|A|$ since a tape of all blanks yields 0 for the infinite sum. If $A=\{\#\}$, then the halting behavior is trivial, so we assume $|A| \ge 2$ for this next part. If $v(T_{k-j-1}) = |A|-1$ for all $j \ge 0$, then the sum of this geometric series is $$\frac{|A|-1}{1-\frac{1}{|A|}} = |A|.$$

Remark 9.3. Every halting point $x_h + y_h i$ in $\mathfrak{A}h$ satisfies $0 \le x_h < |A|^2$.

PROOF. $|x| \ge 0$ because every term is $\ge 0$. Analyzing equation $$1|x| < |A|(|A|-1) + \frac{|A|-1}{1-\frac{1}{|A|}} = |A|^2.$$

Each affine function's domain is a subset of a unique unit square $\{x+yi \in \mathbb{C} : m \le x \le m+1 \text{ and } n \le y \le n+1\}$, where m and n are integers. Hence, $\phi$ transforms Turing's halting problem to the following dynamical systems problem, which is a type of geometric problem. If machine configuration $(q, k, T)$ halts after n computational steps, then the orbit of $\phi(q, k, T)$ exits one of the unit squares on the nth iteration and enters halting attractor $\mathfrak{A}_h$. In other words, we say that the execution of computer program $\eta$ with initial configuration $(q, k, T)$ enters the halting attractor $\mathfrak{A}_h$ after a finite number of execution steps, where it is understood that computer program n has been mapped to a finite set of affine maps, and initial configuration $(q, k, T)$ has been mapped to an initial point $\phi(q, k, T)$ in $\mathbb{C}$.

If machine configuration $(r, j, S)$ is immortal (i.e., never halts), then the orbit of $\phi(r, j, S)$ remains in these finite number of unit squares forever and never enters the halting attractor $\mathfrak{A}_h$. In other words, the execution of computer program q with initial configuration $(q, k, T)$ never enters halting attractor $\mathfrak{A}_h$.

For a particular standard machine, set X equal to the union of all the closed unit squares induced by $\phi$ along with halting attractor $\mathfrak{A}_h$. Closed means the unit squares contain their boundary. Because there are a finite number of unit squares and $\mathfrak{A}_h$ is a compact set, there is a set D that is compact (i.e., closed and bounded) and path connected such that D contains the closed unit squares and halting attactor $\mathfrak{A}_h$. Define $F: D \to \mathbb{C}$ as a function extension of the finite number of right and left affine functions $f$ and g, specified by equations 3, 4, 5, 6 and also an extension of halting function $\mathfrak{h}$.

10 PROGRAM CORRECTNESS BASED ON ENTERING THE HALTING ATTRACTOR

One of the main inventions, provided in this section, is that the correctness of a computer program with an initial configuration can be computed based on whether the program's execution enters the program's halting attractor $\mathfrak{A}_h$ in the complex plane $\mathbb{C}$. In other words, a new computational approach, implemented in hardware and software, to a deep, theoretical mathematical problem has many practical software and hardware applications and inventions that currently are believed to be unsolvable by the prior art.

In an embodiment, ex-machine $\mathfrak{X}$ receives as input standard instructions 110 (FIG. 1A) of a standard machine M (also called a computer program or standard computer program), that are stored in input system 242 (FIG. 2B) of ex-machine $\mathfrak{X}$. An ex-machine also receives as input the initial configuration of the standard computer program: the initial configuration is comprised of the initial machine state q and initial memory contents T of the computer program M.

Ex-machine $\mathfrak{X}$ executes machine instructions 100 with processor system 252 and computes the left affine maps and right affine maps of M according to equations 3, 4, 5, and 6. Then ex-machine $\mathfrak{X}$ stores the left and right affine maps of M (i.e., the computational results of equations 3, 4, 5, and 6) in memory system 246.

In an embodiment, the ex-machine $\mathfrak{X}$ receives standard instructions 110 (FIG. 1A) as input that are expressed in the C programming language [12]. In an embodiment, the input to $\mathfrak{X}$ is a list of standard instructions 110, expressed as C code. There are three tests provided to function FFMul (unsigned char a, unsigned char b). During the execution of the computer program, if one of the three tests has an error, then the program enters the function infinite_error_loop (unsigned char a, unsigned char b) and never exits the loop; in other words, if one of the three tests of function FFMul (unsigned char a, unsigned char b) fails, then the execution of the program never enters its halting attractor. If the execution of this computer program successfully verifies all 3 tests, then the execution of the program exits function main( ) and successfully enters the halting attractor.

```
#include <stdio.h>
unsigned char FFMul(unsigned char a, unsigned char b)
{
    unsigned char aa = a, bb = b, r = 0, t;
    while (aa != 0)
    {
        if ( (aa & 1) != 0) r = (unsigned char) (r ^ bb);
        t = (unsigned char) (bb & 0x80);
        bb = (unsigned char) (bb << 1);
        if (t != 0) bb = (unsigned char) (bb ^ 0x1b);
        aa = (unsigned char) ( (aa & 0xff) >> 1);
    }
    return r;
}
void infinite_error_loop(unsigned char a, unsigned char b)
{
    while(1)
    {
        printf("PROGRAM ERROR with test a = %d and b = %d \n", a, b);
    }
}
#define NUM_TESTS 3
int main( )
{
  int i;
  unsigned char test_result = 0;
  unsigned char a[NUM_TESTS] = {59, 117, 197};
  unsigned char b[NUM_TESTS] = {237, 88, 84};
  unsigned char correct_result[NUM_TESTS] = {243, 208, 17};
  for(i = 0; i < NUM_TESTS; i++)
  {
      test_result = FFMul(a[i], b[i]);
      printf("test_result = %d \n", test_result);
      if (test_result != correct_result[i])
      {
          infinite_error_loop(a[i], b[i]);
      }
  }
  return 0;
}
```

In the prior C listing, the following comprise the initial configuration of this C program: the initial value of constant NUM_TESTS is set to 3; the initial value of the array variable a[NUM_TESTS] is set to 59, 117, and 197 in memory system 246; the initial value of the variable b[NUM_TESTS] is set to 237, 88, 84 in memory system 246; the initial value of the variable correct_result [NUM_TESTS] is set to 243, 208, 17 in memory system 246; the initial value of the variable test_result is set to 0 in memory system 246.

In an embodiment, the ex-machine $\mathcal{X}$ receives as input standard instructions 110 (FIG. 1A) that are expressed in the programming language Python. For example, the input to $\mathcal{X}$ could be the following list of standard instructions, expressed as Python code.

```
def sum_a_b_c(a, b, c):
    return a + b + c
def sum_of_squares(a, b, c):
    return (a * a) + (b * b) + (c * c)
def gcd(a, b):
    while b:
        temp = a
        a = b
        b = temp % b
        # a, b = b, a % b
    return a
def gcd_many(*numbers):
    return reduce(gcd, numbers)
def abn_sum_of_squares(a, b, n):
    return sum_of_squares(a, b, a * n + b )
def a_plus_b_plus_an_plus_b(a, b, n):
    return n * (a + 1) + b + 1
def abn_compute_m(a, b, n):
    abn_rem = abn_sum_of_squares(a, b, n) % a_plus_b_plus_an_plus_b(a, b, n)
    if (0 == abn_rem) :
        print_abc_solution(a, b, a * n + b)
        m = abn_sum_of_squares(a, b, n) / a_plus_b_plus_an_plus_b(a, b, n)
        print " m = ", m
```

```
    if (abn_rem > 0) :
        # print "\n remainder = ", abn_rem
        m = 0
    return m
def isa_abc(a, b, c):
    if (0 == sum_of_squares(a, b, c) % sum_a_b_c(a, b, c)) and ( gcd( gcd(a, b), c) < 2) :
        return 1
    else :
        return 0
def print_abc_solution(a, b, c):
    print "a = ", a, " b = ", b, " c = ", c, " is an abc triplet. "
    return 0
def search_abc_pair(a, b, c_min, c_max):
    for c in range(c_min, c_max):
        if isa_abc(a, b, c):
            print_abc_solution(a, b, c)
    print "\n"
def test_abc_fns( ):
    print "\n 2 + 3 + 4 = ", sum_a_b_c(2, 3, 4)
    print "\n 3^2 + 4^2 + 12^2 = ", sum_of_squares(3, 4, 12)
    print "\n gcd(35, 60) = ", gcd(35, 60)
    print "\n gcd(2, 3) = ", gcd(2, 3)
    print "\n gcd_many(35, 14, 21) = ", gcd_many(35, 14, 21)
    print "\n"
    return 0
a = 2
b = 5
for n in range(4, 500000):
    abn_compute_m(a, b, n)
test_abc_fns( )
a = 2
b = 3
c = 14
if isa_abc(a, b, c):
    print "a = ", a, " b = ", b, " c = ", c, " is an abc triplet\n"
else:
    print "a = ", a, " b = ", b, " c = ", c, " is NOT an abc triplet.\n"
```

In another embodiment, the ex-machine $\mathcal{X}$ receives as input standard instructions 110 (FIG. 1A) that are expressed in VHDL [25], a hardware description language.

Machine Embodiment 4. Correctness of the Goldbach Conjecture

The purpose of the following program is to prove that the Goldbach conjecture is true. The Goldbach conjecture states that every even number greater than or equal to 4 is the sum of two primes. For example, 4=2+2, 6=3+3, 8=3+5, 10=3+7, 12=5+7, 14=3+11 and so on. The following code, named Goldbach Machine, is a correct program if its execution never reaches the halting attractor; that is, if its execution stays in the while (g==true) loop forever and never reaches the halt instruction. The code in the Goldbach machine can be transformed to a finite set of affine maps in the complex plane $\mathbb{C}$ as described previously.

```
        set n = 2
        set g = true
        set prime_list = (2)
        while (g == true)
```

```
        {
            set n = n + 2
            set g = false
            for each p in prime_list
            {
                set x = n - p
                if (x is a member of prime_list) set g = true
            }
            if (n−1 is prime) store n−1 in prime_list
        }
        print ("Even number " n " is not the sum of two primes.")
        print ("The Goldbach conjecture is false!")
        halt
```

Machine Embodiment 5. Correctness of a Hardware Circuit Design

We describe another embodiment of a program that can be checked for correctness. In hardware design, there are a finite number of timing constraints that determine if race conditions exist for a hardware circuit. Race conditions are usually considered to be a program error or hardware design error. In some cases, a computer program can be specified that checks each of these timing constraints; if one of the timing constraints is violated then the computer program can enter a trivial infinite loop such as

```
        while(true)
        {
            print ("TIMING CONSTRAINT ERROR in hardware design circuit!")
        }
```

If none of the timing constraints are violated then the program enters a halting state, indicating that the computer program testing the timing constraints is correct. In this case, the entry of the computer program into the halting attractor indicates that the computer program is correct, and thus that there are no race conditions in the circuit design. In this case, in contrast to the Goldbach machine, the meaning of the computer program's execution entering the halting attractor is inverted from the program is incorrect to the program is correct. □

Machine embodiment 4 and machine embodiment 5 teach us the following: for some computer programs, entering the halting attractor means that the program has an error; for other computer programs, entering the halting attractor means the program is correct. The meaning of a computer program entering the halting attractor depends upon the particular computer program and must be understood on a case by case basis.

11 A NON-DETERMINISTIC EXECUTION MACHINE

A brief, intuitive summary of a non-deterministic execution machine is provided first before the formal description in machine specification 11.1. Our non-deterministic execution machine should not be confused with the nondeterministic Turing machine that is described on pages 30 and 31 of [12].

Part of the motivation for our approach is that procedure 5 is easier to analyze and implement. Some embodiments of procedure 5 can be implemented using randomness generator 548 in FIG. 5A. In some embodiments, the randomness generator 542 in FIG. 5A along with a source of photons shown in FIG. 6A, FIG. 6B, and FIG. 6C can help implement procedure 5 with random measurements 130, shown in FIG. 130. Moreover, our non-deterministic execution machine can be emulated with an ex-machine.

In a standard digital computer, the computer program can be specified as a function; from a current machine configuration (q, k, T), where q is the machine state, k is the memory address being scanned and T is the memory, there is exactly one instruction to execute next or the Turing machine halts on this machine configuration.

Instead of a function, in embodiments of our invention(s) of a non-deterministic execution machine, the program $\mathcal{I}$ is a relation. From a particular machine configuration, there is ambiguity on the next instruction I in $\mathcal{I}$ to execute. This is computational advantage when the adversary does not know the purpose of the program $\mathcal{I}$. Measuring randomness with random measurements 130 in FIG. 1A helps select the next instruction to execute. In some embodiments, the quantum randomness is measured, using the non-deterministic hardware shown in 5A or 5B. In another embodiment, quantum randomness is measured, using the non-deterministic hardware shown in 5C, where the spin-1 source of non-determinism is obtained by measuring the spin of electrons.

Part of our non-deterministic execution machine specification is that each possible instruction has a likelihood of being executed. Some quantum randomness is measured with 130 in FIG. 1A and the next instruction executed is selected according to this quantum measurement and each instruction's likelihood. In some embodiments, the quantum randomness is measured, using hardware that is designed according to the protocol in FIG. 5C.

Before machine specifications are provided, some symbol definitions are reviewed. Symbol $\mathfrak{A}^+$ is the positive integers. Recall that $\mathbb{Q}$ represents the rational numbers. [0, 1] is the closed interval of real numbers x such that $0 \le x \le 1$. The expression $x \notin X$ means element x is NOT a member of X. For example, $$-1 \notin \mathbb{N}, \quad \frac{3}{127} \in \mathbb{Q} \text{ and } \frac{1+\sqrt{5}}{2} \notin \mathbb{Q}.$$

The symbol $\cap$ means intersection.

$$\text{Note } \left\{-5, 0, \frac{3}{127}\right\} \cap \mathbb{Q} = \left\{-5, 0, \frac{3}{127}\right\}$$

$$\text{and } \left\{-5, 0, \frac{1+\sqrt{5}}{2}, \pi\right\} \cap \mathbb{Q} = \{-5, 0\}.$$

Machine Specification 11.1. A Non-Deterministic Execution Machine

A non-deterministic machine $\mathcal{N}$ is defined as follows:

Q is a finite set of states.

$\mathcal{F}$ is a set of final states and $\mathcal{F} \subset Q$

When machine execution begins, the machine is in an initial state $q_0$ and $q_0 \in Q$.

$\mathcal{A}$ finite set of alphabet symbols that are read from and written to memory.

# is a special alphabet symbol called the blank symbol that lies in $\mathcal{A}$.

The machine's memory T is represented as a function T: $\mathbb{Z} \to \mathcal{A}$. The alphabet symbol stored in the kth memory cell is T(k).

$\mathcal{I}$ is a next-instruction relation, which is a subset of $Q \times \mathcal{A} \times Q \times \mathcal{A} \times \{-1, 0, +1\}$. $\mathcal{I}$ acts as a non-deterministic program where the non-determinism arises from how an instruction is selected from $\mathcal{I}$ before it is executed. Each instruction I that lies in the set $\mathcal{I}$ specifies how machine $\mathcal{N}$ executes a computational step. When machine $\mathcal{N}$ is in state q and scanning alphabet symbol $\alpha = T(k)$ at memory cell (address) k, an instruction (such that the first two coordinates of I are q and $\alpha$, respectively) is non-deterministically selected. If instruction $I = (q, \alpha, r, \beta, y)$ is selected, then instruction I is executed as follows:

Machine $\mathcal{N}$ changes from machine state q to machine state r.

Machine $\mathcal{N}$ replaces alphabet symbol a with alphabet symbol $\beta$ so that $T(k) = \beta$. The rest of the memory remains unchanged.

If $y = -1$, then machine $\mathcal{N}$ starts scanning one memory cell downward in memory and is subsequently scanning the alphabet symbol $T(k-1)$, stored in memory address $k-1$.

If $y = +1$, then machine $\mathcal{N}$ starts scanning one memory cell upward in memory and is subsequently scanning the alphabet symbol $T(k+1)$, stored in memory address $k+1$.

If $y = 0$, then machine $\mathcal{N}$ continues to scan the same memory cell and subsequently is scanning alphabet symbol $T(k) = \beta$, stored in memory address k.

To assure $\mathcal{N}$ is a physically realizable machine, before machine $\mathcal{N}$ starts executing, there exist $M > 0$ such that the memory contains only blank symbols (i.e., $T(k) = \#$) in all memory addresses, satisfying $|k| > M$.

$\mathcal{P} = \{p_1, p_2, \ldots, p_{|\mathcal{I}|}\}$ is a finite set of rational numbers, contained in $\mathbb{Q} \cap [0, 1]$, such that $|\mathcal{P}| = |\mathcal{I}|$, where $|\mathcal{I}|$ is the number of instructions in $\mathcal{I}$.

v: $\mathcal{I} \to \mathcal{P}$ is a bijective function. Let I be an instruction in $\mathcal{P}$. The purpose of v(I) is to help derive the likelihood of non-deterministically selecting instruction I as the next instruction to execute.

Non-deterministic machine 11.1 can be used to execute two different instances of a procedure with a different sequence of machine instructions 100, as shown in FIG. 1A.

Machine Specification 11.2. Machine Configurations and Valid Computational Steps A machine configuration $\mathcal{M}$ is a triplet (q, k, $T_i$) where q is a machine state, k is an integer which is the current memory address being scanned and $T_i$ represents the memory. Consider machine configuration $\mathcal{M}_{i+1}=(r, l, T_{i+1})$. Per machine specification 11.1, then $$M_i \stackrel{I}{\mapsto} M_{i+1}$$

is a valid computational step if instruction I=(q, α, r, β, y) in $\mathcal{I}$ and memories $T_i$ and $T_{i+1}$ satisfy the following four conditions:

1. v(I)>0.
2. $T_i(k)=\alpha$.
3. $T_{i+1}(k)=\beta$ and $T_{i+1}(j)=T_i(j)$ for all j≠k.
4. l=k+y.

Symbol $\mathfrak{A}^+$ is the positive integers. Recall that $\mathbb{Q}$ represents the rational numbers. [0,1] is the closed interval of real numbers x such that 0≤x≤1. The expression x∉X means element x is NOT a member of X. For example, $$-1 \notin N, \frac{3}{127} \in \mathbb{Q} \text{ and } \frac{1+\sqrt{5}}{2} \notin \mathbb{Q}.$$

The symbol ∩ means intersection. Note $$\left\{-5, 0, \frac{3}{127}\right\} \cap \mathbb{Q} = \left\{-5, 0, \frac{3}{127}\right\} \text{ and } \left\{-5, 0, \frac{1+\sqrt{5}}{2}, \pi\right\} \cap \mathbb{Q} = \{-5, 0\}.$$

The purpose of machine procedure 4 is to describe how a non-deterministic machine selects a machine instruction from the collection $\mathcal{J}$ of machine instructions 100 as shown in FIG. 1A. This non-deterministic selection of the next instruction is based on the machine specification (i.e., function) v:$\mathcal{I} \to \mathcal{P}$ and one or more quantum random measurements, executed by random instructions 140. In our procedures, a line starting with;; is a comment. Procedure 4 can be implemented as a computing system (FIG. 2B) with input system 242, output system 240, memory system 246, random system 248, self-modifiable system 250 and processor system 252 with standard instructions 110, meta instructions 120, and random instructions 140 as shown in FIG. 1A. Combining procedure 4 and recognizing that the other parts of machine specification 11.1 are contained in the standard, meta, and random instructions, non-deterministic, self-modifiable (e.g., ex-machine) computation can execute the non-deterministic execution machine in machine specification 11.1.

Machine Specification 4. [1154]

```
; ; The instructions in J are indexed as {J₁, J₂, . . . , Jₘ}, where 𝒥 ⊂ 𝒾.
```

$$\text{set } \sigma = \sum_{i=1}^{m} v(J_i)$$

```
; ; The interval [0, 1) is subdivided into subintervals with rational
endpoints.
set i = 1
set x = 0
```

$$\text{set } \delta_i = \frac{v(J_1)}{\sigma}$$

```
while( i ≤ m )
{
    set Lᵢ = [x, x + δᵢ)
    increment i
```

$$\text{set } \delta_i = \frac{v(J_i)}{\sigma}$$

```
    update x to x + δ
}
```

$$\text{set } \delta = \frac{1}{2} \min\{\delta_1, \delta_2, \ldots, \delta_m\}$$

```
compute n > 0 so that 2⁻ⁿ < δ
using a non-deterministic generator, sample n bits b₁, b₂, . . . , bₙ
```

$$\text{set } x = \sum_{i=1}^{n} b_i \, 2^{-i}$$

```
select instruction Jₖ such that x lies in interval Lₖ
```

In some embodiments, machine instructions (procedure) 5 can be implemented with standard instructions 110, meta instructions 120, and random instructions 140, as shown in FIG. 1A. Random instructions 140 take random measurements 130, while executing. In some embodiments, quantum random measurements 130 are measured with spin-1 source (e.g., electrons), followed by a $S_z$ splitter and an $S_x$ splitter as shown in FIG. 5C. In other embodiments, random measurements 130 are measured with a randomness generator 552, as shown in FIG. 5B. In some embodiments, the source of the quantum events is photons, as shown in FIG. 6A, FIG. 6B, and FIG. 6C.

In some embodiments, machine instructions non-deterministically selected may be represented in a C programming language syntax. In some embodiments, some of the instructions non-deterministically selected to execute have the C syntax such as x=1; or z=x*y;. In some embodiments, one of the instructions selected may be a loop with a body of machine instructions such as:

```
for(i = 0; i < 100; i++)
{
    . . . /* body of machine instructions, expressed in C. */
}
```

In another embodiment, the instructions non-deterministically selected can be executed at the hardware level, using the VHDL hardware description language.

In some embodiments, a random instruction may measure a random bit, called random_bit and then non-deterministically execute according to the following code:

```
if (random_bit == 1)
    C_function_1( );
else if (random_bit == 0)
    C_function_2( );
```

In other embodiments, the machine instructions may have a programming language syntax such as JAVA, Go Haskell, C++, RISC machine instructions, JAVA virtual machine, Ruby, LISP, or a hardware language such as VHDL.
Machine Specification 5. [1157]

```
; ; |F| is the number of final states in F = {f_1, f_2, ..., f_|F|}.
; ; q_0 is an initial machine state and q_0 ∉ F
; ; The symbols s_1, s_2, ... s_|F| are the final state scores.
; ; Final state score s_i tallies how many times final state f_i is reached.
; ; a_i is the alphabet symbol stored at memory address i before the inner
loop is entered.
; ; ε is the reliability threshold. ε ∈ ℚ such that 0 < ε < 1 and is usually
very small.
; ; r is the variable that stores the current reliability value.
for each q in Q
    for each a in A
    {
        store in J_{q,a} all instructions I in I ∩ (Q × A × Q × A ×
        {-1, 0, +1}) where instruction I's 1st coordinate is q, I's 2nd
        coordinate is a and v(I) > 0
    }
; ; Initialize each score to 0 before entering the outer loop.
set s_1 = 0  set s_2 = 0  ...  set s_|F| = 0
; ; Initialize n = c where c > 1. The procedure works independent of c.
set n = |Q| |A|
set r = 1 + ε
while ( r ≥ ε )
{   ; ; When 0 ≤ i < m, T(i) = a_i and T(k) = # whenever k < 0 or k ≥
m.
    store word a_0 a_1 ... a_{m-1} in memory
    start reading memory address k = 0
```

```
    initialize machine state q = q_0
    set j = 1
    set r = 1 / ⌈log_2(n)⌉
    set d = 1       ;; d is the membership degree of the random instructions
    selected.
    set d_max = 0
    while ( j ≤ n AND q ∉ F )
    {
        Set a = T(k), where k is the current memory address being read.
        randomly select instruction I_j from J_{q,a} by executing procedure 4
        Per definition 11.1 execute instruction I_j = {q, α_j, r_j, β_j, y}, which
        updates state q = r_j, writes β_j in memory address k and moves to
        memory address k to y + k.
        set d equal to d * v(I_j)
        if new machine state q is a final state f_i
        {
            set σ = ∑_{l=1}^{|F|} s_l   set γ_i = s_i/σ   set κ_i = (s_i+1)/(σ+1)   set δ_i = |κ_i - γ_i| if δ_i > r set r = δ_i
            if d > d_max set d_max = d
            increment score s_i
        }
        increment j
    }
    increment n
}
```

In machine instructions (procedure) 5, the ex-machine that implements the pseudocode executes a particular non-deterministic machine a finite number of times and if a final state is reached, the procedure increments the corresponding final state score. After the final state scores have been tallied such that they converge inside the reliability interval (0, ε), then the ex-machine execution is completed and the ex-machine halts.
Machine Specification 6. [1159]

```
INPUT: Machine is in state q_0 and the memory is initialized to ... ## α_0 α_1 ... α_{m-1} ## ...
for each q in Q
    for each α in A
    {
        store in J_{q,a} all instructions I in I ∩ (Q × A × Q × A × {-1,0, +1}) where
        instruction I's 1st coordinate is q, I's 2nd coordinate is α and v(I) > 0
    }
;; Initialize n = N where N > 1.
set n = N
set l = 1
while ( l ≤ r )
{
    ;; When 0 ≤ i < m, T(i) = α_i and T(k) = # whenever k < 0 or k ≥ m.
    store word α_0 α_1 ... α_{m-1} in memory
    start scanning memory address k = 0
    initialize machine state q = q_0
    set j = 1
    set d = 1 # d is the membership degree of the random instructions selected.
    set d_max = 0
    while ( j ≤ n AND q ∉ F )
    {
        Set α = T(k), where k is the current memory address being scanned.
        randomly select instruction I_j from J_{q,a} by executing procedure 4.
        Per specification 11.1 execute instruction I_j = {q, α_j, r_j, β_j, x}, which updates state
        q = r_j, writes β_j in tape square k and moves to memory address k to x + k.
        set d equal to d*v(I_j).
        if new machine state q is a final state f_i
        {
            if d > d_max set d_max = d
        }
        increment j
    }
}
```

-continued

```
    increment l
}
OUTPUT: d_max
```

Machine specification 6 is useful for executing a computational procedure so that each instance of the procedure executes a different sequence of instructions and in a different order. This unpredictability of the execution of instructions makes it difficult for an adversary to comprehend the computation. Machine specification 6 can be executed with a finite sequence of standard, meta and random instructions as shown in FIG. 1A.

In the following analysis, the likelihood of procedure (machine instructions) 5 finding the maximum is estimated. Machine Computation Property 11.1. For each x, let $v_x = v(I_x)$. Consider the acceptable computational path $$\mathcal{M}_0 \overset{I_{j_1}}{\mapsto} \mathcal{M}_1 \overset{I_{j_2}}{\mapsto} \mathcal{M}_2 \ldots \mathcal{M}_{N-1} \overset{I_{j_N}}{\mapsto} \mathcal{M}_N$$

such that machine configuration $\mathcal{M}_N$ is in final state $q_f$ and $p = v_{j_1} * v_{j_2} * \ldots * v_{j_N}$ is a maximum. The expected number of times that inner loop in procedure 6 executes acceptable path $$\mathcal{M}_0 \overset{I_{j_1}}{\mapsto} \mathcal{M}_1 \overset{I_{j_2}}{\mapsto} \mathcal{M}_2 \ldots \mathcal{M}_{N-1} \overset{I_{j_N}}{\mapsto} \mathcal{M}_N$$

is 0 when n<N and at least rp when n≥N.

Proof. When n<N, it is impossible for the inner loop to execute the path $$\mathcal{M}_0 \overset{I_{j_1}}{\mapsto} \mathcal{M}_1 \overset{I_{j_2}}{\mapsto} \mathcal{M}_2 \ldots \mathcal{M}_{N-1} \overset{I_{j_N}}{\mapsto} \mathcal{M}_N,$$

so the expected number of times is 0. When n=N, the independence of each random sample that selects instruction $I_{ji}$ and the fact that $$\mathcal{M}_0 \overset{I_{j_1}}{\mapsto} \mathcal{M}_1 \overset{I_{j_2}}{\mapsto} \mathcal{M}_2 \ldots \mathcal{M}_{N-1} \overset{I_{j_N}}{\mapsto} \mathcal{M}_N$$

is an acceptable path implies that the probability of executing this computational path is $p = v_{j_1} * v_{j_2} * \ldots * v_{j_N}$. When n>N, the probability of executing this path is still p because the inner loop exits if the final state in $\mathcal{M}_N$ is reached. □

12 MACHINE LEARNING WITH SELF-MODIFICATION AND RANDOMNESS

In this section, we describe the inventions of using self-modification and randomness to advance machine learning procedures. In the prior art, machine learning procedures are implemented with algorithms that are computationally equivalent to a Turing machine algorithm [5, 14, 15, 24]. As was shown in sections 7 and 8, machine computation that adds randomness and self-modification to the standard digital computer instructions has more computing capability than a standard digital computer. This capability enables more advanced machine learning procedures where in some embodiments meta instructions 120 and random instructions 140 improve the machine learning procedure.

In the prior art, some machine learning algorithms use multi-layer methods of building functions, based on the use of weighted sums of sigmoidal functions (FIG. 8A) or some other nonlinear function that are fed into the next layer. For example, see FIG. 8C, where each node has a sigmoidal function. In our embodiments, $$g(x) = \frac{2}{\pi} \arctan(x)$$

is our prototypical sigmoidal function 810, as shown in FIG. 8A. First, it is important to observe that the prior art—not understanding that computation is capable of computing Turing incomputable languages—only uses a Turing machine algorithm for its machine learning methods. This may be at least part of the reason why machine learning algorithms work well up to a certain amount of training and then suddenly hits a wall in terms of the tasks that a machine learning algorithm can perform.

When the nonlinear functions are sigmoidal functions 810, we will call this a neural network, as shown in FIG. 8C. In the prior art, the learning algorithm for multi-layer methods is a type of gradient descent: the weights in each weighted sum of the neural network are adjusted according to an error function that is computed according to how well the neural network is able to classify or predict examples on the training data set. The gradient descent is computed with respect to the error function computed on the training data set, where the gradient descent adjusts the weights to reduce the error in the direction of the gradient. In the prior art, the gradient descent methods such as backpropagation [11] are Turing machine algorithms.

In our embodiments, our almost step functions will generally be piecewise linear approximations of the form $g_{a,b,c}(x) = \exp(-b(x-a)^c)$, where b and c are parameters that adjust the width of where the step function maps that interval to 1 and a translates the center of the step function. In FIG. 8B, the center of the almost step function is located at x=0 and b=2 and c=20. If we choose $c=b^2$, then we can form 10 different almost step functions with b values in {1/100, 1/10, 1, 2, 4, 10, 100, 1000, 10^4} so that rare events can be localized or almost all events of a certain type are ignored. For embodiments with more flexibility with b and c independent of each other, we can choose a, b and c vary randomly, executed with random instructions. The derivative of a piecewise linear approximation of $g_{a,b,c}(x) = \exp(-b(x-a)^c)$ exists everywhere when we take the average of the slopes at the vertices of the approximation. We start with almost step functions because of the following theorem from real analysis. For any Lebesgue measurable function $f: [0, 1] \to \mathbb{R}$ and for any $\epsilon > 0$, there exists a finite sum of step function $$\sum_{j=1}^{n} \chi_j(x)$$

such that $$|\sum_{j=1}^{n} \chi_j(x) - f(x)| < \epsilon$$

on a set of Lebesgue measure greater than $1-\epsilon$.

In some embodiments, our machine learning procedure, comprised of standard, random and meta instructions, starts with a gradient descent methods that can be used on networks of almost step and sigmoidal functions. The meta instructions can be used to modify our initial gradient descent procedure and also modify how the gradient descent is understanding the differential geometry of our network of nonlinear functions. In some embodiments, the self-modification of the initial gradient descent will depend upon differential forms, curvature tensors, and the curvature of saddle points so that standard instructions 940, meta instructions 930 and random instructions 920 can reason about the performance of machine learning procedure 950 that is evolving, based on its training data set. Meta instructions 930 and random instructions 920 help self-modify machine learning procedure, based on the reasoning that depends upon the geometric concepts of differential forms, curvature tensors, and the curvature of saddle points. How the machine learning procedure evolves will sometimes depend upon the idiosyncracies of a particular data set where the training is performed upon.

In some embodiments, we use almost step functions 820, shown in our FIG. 8B, that are a piecewise linear approximation of $g_{a,b,c}(x)=\exp(-b(x-a)^c)$. In some embodiments, we use almost step functions 820 and sigmoidal functions 810 in our machine learning procedure, or a compositional function at node, that is composed of weighted sum of almost step functions and sigmoidal functions. In an embodiment, the building of arbitrary compositional functions executes standard instructions 110, random instructions, and meta instructions so there is no algorithmic constraint on how these compositional functions are constructed. In embodiments, we call this a network of nonlinear functions 850, so that our non-algorithmic method of building function composition is distinguished from the prior art that uses neural networks 830 containing only sigmoidal functions or a network of one type of nonlinear function.

In some embodiments, two subscripts indicate the layer and reference the particular nonlinear function 850 at that location. In an embodiment, there are n different nonlinear functions that we use at each node of the network and they are named $\mathfrak{F} = \{f_1(x), f_2(x), \ldots f_n(x)\}$. In FIG. 8C, n=1, where $$f_1(x) = \frac{2}{\pi} \arctan(x).$$

In. FIG. 8D, n=2, where $$f_1(x) = g(x) = \frac{2}{\pi}$$

arctan(x) and $$f_2(x) = \chi(x) = e^{-(cx)^{c^2}}.$$

The use of multi-layer algorithmic machine learning is based on weighted sigmoidal functions 810, or some other non-linear function that looks like a hockey stick constructed from two linear pieces.

In a machine learning procedure 950 embodiment that uses standard instructions 940, random instructions 920 and meta instructions 930, as shown in FIG. 8E, Each function $g_{i,j}(x)$ 850 is selected from $\mathfrak{F}$ and is located at a node, that is in the jth column of layer i. Let $n_i$ be the number of nodes in layer i. In an embodiment, a weighted linear sum from layer i to nonlinear function $g_{i+1,l}(x)$ in the next layer i+1 is $$\sum_{j=1}^{n_i}$$

$\omega_{i,j,l} \, g_{i+1,j}$, as shown in FIG. 8E.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

REFERENCES

[1] John Bell. On the Einstein Podolsky Rosen Paradox. Physics. 1, 1964, pp. 195-200.
[2] Neil Bohr. Can Quantum-Mechanical Description of Physical Reality be Considered Complete? Physical Review. 48, Oct. 15, 1935, pp. 696-702
[3] Louis de Broglie. Recherches sur la theorie des quanta. Ph.D. Thesis. Paris, 1924.
[4] A.A. Abbott, C.S. Calude, J. Conder, and K. Svozil. Strong Kochen-Specker theorem and incomputability quantum randomness. Phys. Rev. A 86, 062109, 2012, pp. 1-11
[5] Martin Davis. Computability and Unsolvability. Dover Publications, New York, 1982.
[6] David Deutsch. Quantum Theory, the Church-Turing Principle and the Universal Quantum Computer. Proc. London Math. Soc. Series A. 400, No. 1818, 1985, pp. 97-117.
[7] Antony Eagle. Randomness Is Unpredictability. British Journal of Philosophy of Science. 56, 2005, pp. 749-790.
[8] Albert Einstein, Boris Podolsky and Nathan Rosen. Can Quantum-Mechanical Description of Physical Reality Be Considered Complete? Physical Review. 47, 1935, pp. 777-780.
[9] William Feller. An Introduction to Probability Theory and Its Applications, Volume 1, Third Edition. John Wiley & Sons, New York, 1968, pp. 202-211.
[10] Michael R. Carey and David S. Johnson. Computers and Intractability: A Guide to the Theory of NP-Completeness. W.H. Freeman, 1979.
[11] John Hertz, Anders Krogh and Richard G. Palmer. Introduction To The Theory of Neural Computation. Addison-Wesley Publishing Company. Redwood City, Calif., 1991, pp. 115-121.
[12] Brian Kernighan and Dennis Ritchie. The C Programming Language. 2nd Edition, Prentice Hall, 1988.

[13] Simon Kochen and E. P. Specker. The Problem of Hidden Variables in Quantum Mechanics. Journal of Mathematics and Mechanics. Vol. 17, No. 1, 1967, pp. 5987.

[14] Harry R. Lewis and Christos H. Papadimitriou. Elements Of The Theory Of Computation. Prentice-Hall, 1981.

[15] Marvin Minsky. Computation: Finite and Infinite Machines (1st edition). Englewood Cliffs, N.J. Prentice-Hall, Inc, 1967.

[16] Pratap Misra and Per Enge. Global Positioning System: Signals, Measurements, and Performance. Revised 2nd Edition, Ganga-Jamuna Press, 2011.

[17] David A. Patterson and John L. Hennessy. Computer Architecture: A Quantitative Approach. 5th Edition, Morgan Kaufmann, 2011.

[18] H.L. Royden. Real Analysis. Prentice-Hall Inc., 1988.

[19] Alfred A. Schmitt. The State Complexity of Turing Machines. Information and Control. 17, 1970, pp. 217-225.

[20] Claude Shannon. Communication Theory of Secrecy Systems. netlab.cs.edu/wiki/files/shannon1949.pdf. 1949.

[21] Hartley Rogers, Jr. Theory of Recursive Functions and Effective Computability. MIT Press, 1987.

[22] Andre Stefanov, Nicolas Gisin, Olivier Guinnard, Laurent Guinnard and Hugo Zbinden. Optical quantum random number generator. Journal of Modern Optics. 1362-3044, 47, 4, 2000, pp. 595598. http://arxiv.org/pdf/quantph/9907006

[23] H. E. Sturgis, and J. C. Shepherdson. Computability of Recursive Functions. J. Assoc. Comput. Mach. 10, 1963, pp. 217-255.

[24] Alan M. Turing. On computable numbers, with an application to the Entscheidungsproblem. Proc. London Math. Soc. Series 2 42 (Parts 3 and 4), 230265 (1936). A correction, ibid. 43, 1937, pp. 544546.

[25] VHSIC Hardware Description Language. 2019. https://en.m.wikipedia.org/wiki/VHDL

[26] M. Wahl, M. Leifgen, M. Berlin, T. Rohlickel, Hans-Jurgen Rahn, and O. Benson. An ultrafast quantum random number generator with provably bounded output bias based on photon arrival time measurements. Applied Physics Letters. 98, 171105, 2011.

[27] Jie Yang, Jinlu Liu, Qi Su, Zhengyu Li, Fan Fan, Bingjie Xu and Hong Guo. A 5.4 Gbps real time quantum random number generator with compact implementation. Optics Express. 24(24), 2016, pp. 27475-27481.

[28] D. Zamboni (editor). Proc. of the 5th Intl. Conf. on Detection of Intrusions and Malware LNCS. Springer. July 2008.

The invention claimed is:

1. A computing system for verifying program correctness comprising:
    the machine having a processor system, memory system, and input system;
    the machine receiving a computer program and the program's initial configuration as input;
    the machine mapping the computer program to finite set of affine maps;
    the machine computing that the execution of the computer program with its initial configuration enters the program's halting attractor after a finite number of execution steps;
    wherein entering the halting attractor verifies the correctness of the computer program.

2. The system of claim 1 wherein the machine verifying the program correctness is computed, by executing a finite number of standard instructions, meta instructions and random instructions.

3. The system of claim 2 wherein the execution of a random instruction measures one or more quantum events.

4. The system of claim 2 wherein the execution of a random instruction measures the behavior of photons.

5. The system of claim 4 further comprising: a phototransistor or photodiode absorbing said photons.

6. The system of claim 4 further comprising: a light emitting diode emitting said photons.

7. A system for verifying program correctness comprising:
    the machine having a processor system, memory system, and input system;
    the machine receiving a computer program and the program's initial configuration as input;
    the machine mapping the computer program to a finite set of affine maps;
    the machine computing that the execution of the computer program with its initial configuration never enters the program's halting attractor;
    wherein never entering the halting attractor verifies the correctness of the computer program.

8. The system of claim 7 wherein the machine verifying the program correctness can be computed, by executing a finite number of standard instructions, meta instructions and random instructions.

9. The system of claim 8 wherein the execution of a random instruction measures one or more quantum events.

10. The system of claim 8 wherein the execution of a random instruction measures the behavior of photons.

11. The system of claim 10 further comprising: a phototransistor or photodiode absorbing said photons.

12. A machine for verifying program correctness comprising:
    the machine having a processor system, memory system, and input system;
    the machine receiving a computer program and the program's initial configuration as input;
    the machine mapping the computer program to finite set of affine maps;
    the machine computing that the execution of the computer program with its initial configuration enters the program's halting attractor after a finite number of execution steps;
    wherein entering the halting attractor verifies the correctness of the computer program.

13. The machine of claim 12 wherein the machine verifying the program correctness is computed, by executing a finite number of standard instructions, meta instructions and random instructions.

14. The machine of claim 13 wherein the execution of a random instruction measures one or more quantum events.

15. The machine of claim 14 further comprising: a spin-1 source of quantum events.

16. The machine of claim 13 wherein the execution of a random instruction measures the behavior of photons.

17. The machine of claim 16 further comprising: a phototransistor or photodiode absorbing said photons.

18. A machine for verifying program correctness comprising:
    the machine having a processor system, memory system, and input system;
    the machine receiving a computer program and the program's initial configuration as input;

the machine mapping the computer program to a finite set of affine maps;

the machine computing that the execution of the computer program with its initial configuration never enters the program's halting attractor;

wherein never entering the halting attractor verifies the correctness of the computer program.

19. The machine of claim 18 wherein the machine verifying the program correctness can be computed, by executing a finite number of standard instructions, meta instructions and random instructions.

20. The machine of claim 19 wherein the execution of a random instruction measures one or more quantum events.

21. The machine of claim 20 further comprising: a spin-1 source.

22. The machine of claim 19 wherein the execution of a random instruction measures the behavior of photons.

* * * * *